(12) United States Patent
Milbar et al.

(10) Patent No.: US 9,467,255 B2
(45) Date of Patent: Oct. 11, 2016

(54) SYSTEMS AND METHODS FOR DIGITAL RADIO BROADCAST WITH CROSS PLATFORM RECEPTION

(71) Applicant: iBiquity Digital Corporation, Columbia, MD (US)

(72) Inventors: Marek Milbar, Huntingdon Valley, PA (US); Ashruf S. El-Dinary, Clarksville, MD (US); Jason K. Carlock, Rochester Hills, MI (US); Jeffrey Jury, Ellicott City, MD (US); Jeffrey R. Detweiler, Ellicott City, MD (US); Timothy L. Tenniswood, Grand Blanc, MI (US); James DeRidder, Fenton, MI (US)

(73) Assignee: iBiquity Digital Corporation, Columbia, MD (US)

( * ) Notice: Subject to any disclaimer, the term of this patent is extended or adjusted under 35 U.S.C. 154(b) by 101 days.

(21) Appl. No.: 14/580,920

(22) Filed: Dec. 23, 2014

(65) Prior Publication Data
US 2016/0182192 A1    Jun. 23, 2016

(51) Int. Cl.
*H04L 1/00* (2006.01)
*H04L 1/08* (2006.01)
*H04H 20/72* (2008.01)

(52) U.S. Cl.
CPC .............. *H04L 1/08* (2013.01); *H04H 20/72* (2013.01); *H04H 2201/18* (2013.01)

(58) Field of Classification Search
CPC ....... H04L 1/08; H04L 12/189; H04L 12/18; H04L 45/16; H04L 2012/5607; H04H 20/71; H04H 20/72; H04H 2201/18
See application file for complete search history.

(56) References Cited

U.S. PATENT DOCUMENTS

| | | | |
|---|---|---|---|
| 6,845,230 B2 | 1/2005 | Syed | |
| 7,721,337 B2 | 5/2010 | Syed | |
| 8,111,716 B2 * | 2/2012 | Iannuzzelli | H04H 20/30 370/389 |
| 8,417,179 B2 * | 4/2013 | Watanabe | H04B 1/1646 455/3.01 |
| 2001/0012277 A1 | 8/2001 | Campanella | |
| 2003/0070172 A1 | 4/2003 | Matsuzaki et al. | |
| 2003/0083977 A1 | 5/2003 | Syed | |
| 2003/0084108 A1 | 5/2003 | Syed | |
| 2003/0135464 A1 | 7/2003 | Mourad et al. | |
| 2005/0003808 A1 | 1/2005 | Bates et al. | |
| 2006/0242153 A1 | 10/2006 | Newberry et al. | |
| 2008/0152039 A1 | 6/2008 | Shah et al. | |
| 2010/0229205 A1 | 9/2010 | Hakusui | |
| 2012/0099514 A1 | 4/2012 | Bianchetti et al. | |

OTHER PUBLICATIONS

Baek et al., Field trials and evaluations of in-band digital radio technologies: HD radio and DRM+, Sep. 2013, IEEE Trans. on broadcasting, vol. 59, No. 3, pp. 401-410.*
Mendenhall et al., Boradcasting harnesses the digital age, Dec. 2011, Microwaves & RF (retireved from google.com on May 26, 2016), pp. 1 to 8.*
Kroeger et al., AM digital data service system study report, Dec. 2010, iBiquity digital corporation Rev. 01.14 (retrieved from google.come on May 26, 2016), pp. 1 to 49.*
Patent Cooperation Treaty, International Search Report and Written Opinion of the International Searching Authority, PCT/US15/67356, mailed Mar. 17, 2016.

* cited by examiner

*Primary Examiner* — Shelly A Chase
(74) *Attorney, Agent, or Firm* — Jones Day

(57) ABSTRACT

Systems and methods are described for rendering content at a digital radio broadcast receiver system. A digital radio broadcast signal comprises data for rendering content at the digital radio broadcast receiver. The digital radio broadcast signal is processed to determine whether the data from the digital radio broadcast transmission contains a data error. A portion of the data containing the data error is identified. A download request is transmitted to a computing system, where the download request requests duplicate data for the portion of the data containing the data error. The duplicate data is received at the digital radio broadcast receiver for the portion of the data containing the error via other wireless communication other than the digital radio broadcast. The duplicate data is processed to provide an uninterrupted rendering of the content.

54 Claims, 26 Drawing Sheets

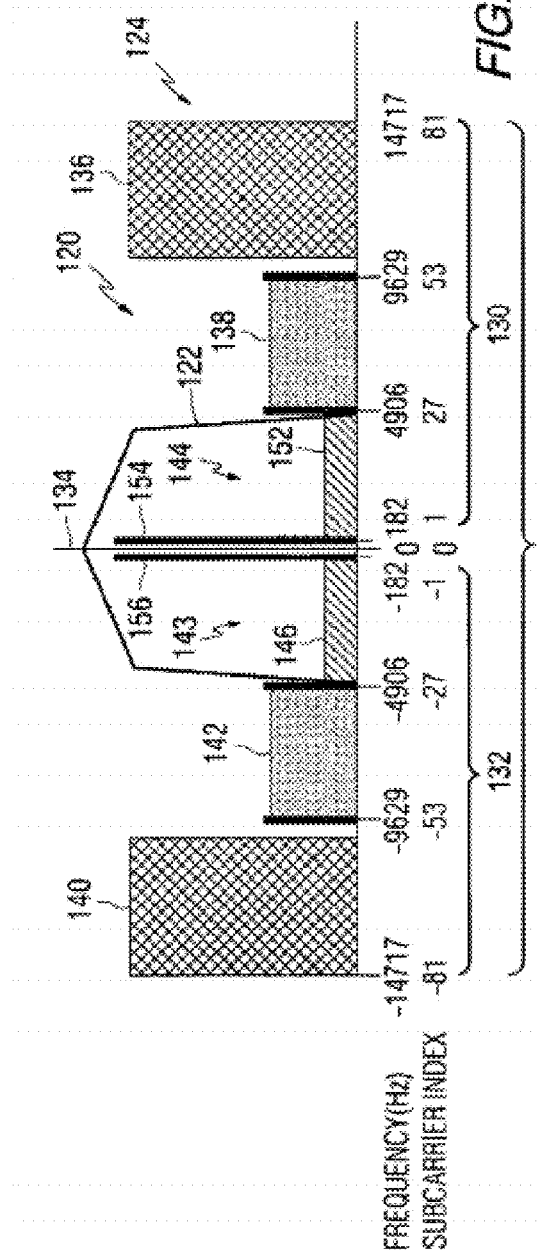
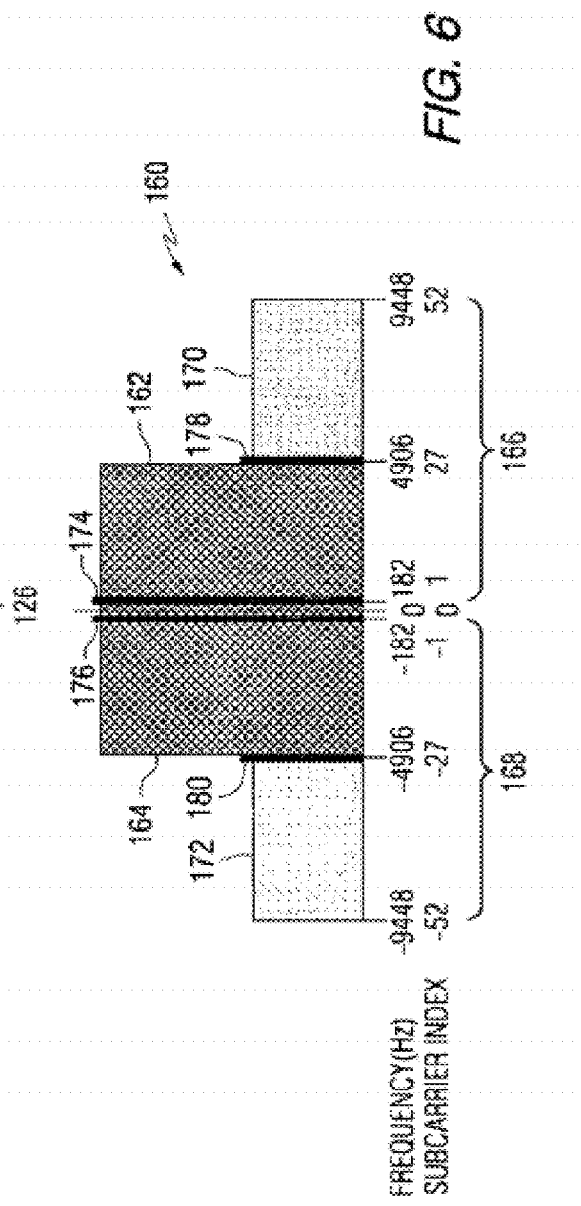
FIG. 5
FIG. 6

SYSTEMS AND METHODS FOR DIGITAL RADIO BROADCAST WITH CROSS PLATFORM RECEPTION

FIELD

The technology described in this patent document relates generally to digital radio broadcasting and more particularly to systems and methods for providing an uninterrupted rendering of content at a digital radio broadcast receiver.

BACKGROUND

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception. One feature of digital transmission systems is the inherent ability to simultaneously transmit both digitized audio and data. Thus the technology also allows for wireless data services from AM and FM radio stations. The broadcast signals can include metadata, such as the artist name, song title, or station call letters. Special messages about events, traffic, and weather can also be included. For example, traffic information, weather forecasts, news, and sports scores can all be scrolled across a radio receiver's display while the user listens to a radio station.

IBOC digital radio broadcasting technology can provide digital quality audio, superior to existing analog broadcasting formats. Because each IBOC digital radio broadcasting signal is transmitted within the spectral mask of an existing AM or FM channel allocation, it requires no new spectral allocations. IBOC digital radio broadcasting promotes economy of spectrum while enabling broadcasters to supply digital quality audio to the present base of listeners.

Multicasting, the ability to deliver several audio programs or services over one channel in the AM or FM spectrum, enables stations to broadcast multiple services and supplemental programs on any of the sub-channels of the main frequency. For example, multiple data services can include alternative music formats, local traffic, weather, news, and sports. The supplemental services and programs can be accessed in the same manner as the traditional station frequency using tuning or seeking functions. For example, if the analog modulated signal is centered at 94.1 MHz, the same broadcast in IBOC can include supplemental services 94.1-2, and 94.1-3. Highly specialized supplemental programming can be delivered to tightly targeted audiences, creating more opportunities for advertisers to integrate their brand with program content. As used herein, multicasting includes the transmission of one or more programs in a single digital radio broadcasting channel or on a single digital radio broadcasting signal. Multicast content can include a main program service (MPS), supplemental program services (SPS), program service data (PSD), and/or other broadcast data.

National Radio Systems Committee, a standard-setting organization sponsored by the National Association of Broadcasters and the Consumer Electronics Association, adopted an IBOC standard, designated NRSC-5, in September 2005. NRSC-5 and its updates, the disclosure of which are incorporated herein by reference, set forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC. iBiquity's HD Radio technology is an implementation of the NRSC-5 IBOC standard.

Other types of digital radio broadcasting systems include satellite systems such as Satellite Digital Audio Radio Service (SDARS, e.g., XM Radio, Sirius), Digital Audio Radio Service (DARS, e.g., WorldSpace), and terrestrial systems such as Digital Radio Mondiale (DRM), Eureka 147 (branded as DAB Digital Audio Broadcasting), DAB Version 2, and FMeXtra. As used herein, the phrase "digital radio broadcasting" encompasses digital audio broadcasting including in-band on-channel broadcasting, as well as other digital terrestrial broadcasting and satellite broadcasting.

Digital radio broadcast signals are subject to intermittent fades or blockages that result in problems with signal quality for signals received at a digital radio broadcast receiver system. Further, there are some blockages that sufficiently obscure the broadcast signal from the receiver for periods of time, and thereby produce a gap in the reception of the broadcast signal.

SUMMARY

The present inventors have observed a need for systems and methods for mitigating the effect of the signal quality problems described above. Embodiments of the present disclosure are directed to systems and methods that may satisfy this need. The present disclosure is directed to a computer-implemented method, system, and non-transitory computer-readable storage medium for rendering content at a digital radio broadcast receiver system. In an example computer-implemented method for rendering content at a digital radio broadcast receiver system, a digital radio broadcast signal is received via digital radio broadcast transmission, the digital radio broadcast signal comprising data in a specified format for rendering content at the digital radio broadcast receiver. The digital radio broadcast signal is processed to determine whether the data from the digital radio broadcast transmission contains a data error, and a portion of the data containing the data error is identified. A notification is transmitted to a computing system, where the notification is effective to cause the processing of duplicate data for the portion of the data containing the data error. The duplicate data is received at the digital radio broadcast receiver for the portion of the data containing the error via other wireless communication other than the digital radio broadcast transmission based on the notification. The duplicate data comprises the data in the specified format of the digital radio broadcast signal transmitted by the digital radio broadcast transmitter system. The duplicate data is selected instead of selecting the portion of the data that contains the data error to provide corrected data, and the corrected data is processed at the digital radio broadcast receiver to provide an uninterrupted rendering of the content.

A digital radio broadcast receiver system configured to render content includes a processing system and a memory coupled to the processing system. The processing system is configured to execute steps. In executing the steps, a digital radio broadcast signal is received via digital radio broadcast transmission, the digital radio broadcast signal comprising data in a specified format for rendering content at the digital radio broadcast receiver. The digital radio broadcast signal is processed to determine whether the data from the digital radio broadcast transmission contains a data error, and a portion of the data containing the data error is identified. A notification is transmitted to a computing system, where the notification is effective to cause the processing of duplicate data for the portion of the data containing the data error. The duplicate data is received at the digital radio broadcast receiver for the portion of the data containing the error via other wireless communication other than the digital radio broadcast transmission based on the notification. The duplicate data comprises the data in the specified format of the digital radio broadcast signal transmitted by the digital radio broadcast transmitter system. The duplicate data is selected instead of selecting the portion of the data that contains the data error to provide corrected data, and the corrected data is processed at the digital radio broadcast receiver to provide an uninterrupted rendering of the content.

In an example non-transitory computer-readable storage medium for rendering content at a digital radio broadcast receiver system, the computer-readable storage medium includes computer-executable instructions which, when executed, cause a processing system to execute steps. In executing the steps, a digital radio broadcast signal is received via digital radio broadcast transmission, the digital radio broadcast signal comprising data in a specified format for rendering content at the digital radio broadcast receiver. The digital radio broadcast signal is processed to determine whether the data from the digital radio broadcast transmission contains a data error, and a portion of the data containing the data error is identified. A notification is transmitted to a computing system, where the notification is effective to cause the processing of duplicate data for the portion of the data containing the data error. The duplicate data is received at the digital radio broadcast receiver for the portion of the data containing the error via other wireless communication other than the digital radio broadcast transmission based on the notification. The duplicate data comprises the data in the specified format of the digital radio broadcast signal transmitted by the digital radio broadcast transmitter system. The duplicate data is selected instead of selecting the portion of the data that contains the data error to provide corrected data, and the corrected data is processed at the digital radio broadcast receiver to provide an uninterrupted rendering of the content.

In an embodiment of the computer-implemented method, system, and non-transitory computer-readable storage medium described herein, the content to be rendered at the digital radio broadcast receiver system comprises an audio program. In this embodiment, the data from the digital radio broadcast transmission is audio data, and the digital radio broadcast signal may include program data identifying the audio program. Further, in this embodiment, the duplicate data may be received without receiving data via the other wireless communication for the entire audio program. In another embodiment of the computer-implemented method, system, and non-transitory computer-readable storage medium described herein, the content to be rendered at the digital radio broadcast receiver system comprises one or more data services (e.g., local traffic information, weather forecasts, news, sports scores, finance information, etc., that may be rendered at a display device of the receiver system, for example).

In an example computer-implemented method for rendering content at a digital radio broadcast receiver system, a digital radio broadcast signal is received via digital radio broadcast transmission. The digital radio broadcast signal comprises data in a specified format for rendering content at the digital radio broadcast receiver. The digital radio broadcast signal is processed to determine whether the data from the digital radio broadcast transmission contains a data error. A first notification is transmitted to a computing system, where the notification is effective to cause the processing of duplicate data to be transmitted via other wireless communication other than the digital radio broadcast transmission for rendering the content. The duplicate data permits the content to be rendered without the data error. The duplicate data is received at the digital radio broadcast receiver without the error via the other wireless communication based on the first notification. The duplicate data comprises the data in the specified format of the digital radio broadcast signal transmitted by the digital radio broadcast transmitter system. The duplicate data received via the other wireless communication without the error for rendering at the receiver is selected instead of selecting the data received by digital radio broadcast transmission that contains the data error so as to provide corrected data. The corrected data is processed at the digital radio broadcast receiver to provide an uninterrupted rendering of the content.

In an example non-transitory computer-readable storage medium for rendering content at a digital radio broadcast receiver system, the computer-readable storage medium includes computer-executable instructions which, when executed, cause a processing system to execute steps. In executing the steps, a digital radio broadcast signal is received via digital radio broadcast transmission. The digital radio broadcast signal comprises data in a specified format for rendering content at the digital radio broadcast receiver. The digital radio broadcast signal is processed to determine whether the data from the digital radio broadcast transmission contains a data error. A first notification is transmitted to a computing system, where the notification is effective to cause the processing of duplicate data to be transmitted via other wireless communication other than the digital radio broadcast transmission for rendering the content. The duplicate data permits the content to be rendered without the data error. The duplicate data is received at the digital radio broadcast receiver without the error via the other wireless communication based on the first notification. The duplicate data comprises the data in the specified format of the digital radio broadcast signal transmitted by the digital radio broadcast transmitter system. The duplicate data received via the other wireless communication without the error for rendering at the receiver is selected instead of selecting the data received by digital radio broadcast transmission that contains the data error so as to provide corrected data. The corrected data is processed at the digital radio broadcast receiver to provide an uninterrupted rendering of the content.

In an example non-transitory computer-readable storage medium for rendering content at a digital radio broadcast receiver system, the computer-readable storage medium includes computer-executable instructions which, when executed, cause a processing system to execute steps. In executing the steps, a digital radio broadcast signal is received via digital radio broadcast transmission. The digital radio broadcast signal comprises data in a specified format for rendering content at the digital radio broadcast receiver. The digital radio broadcast signal is processed to determine whether the data from the digital radio broadcast transmission contains a data error. A first notification is transmitted to a computing system, where the notification is effective to cause the processing of duplicate data to be transmitted via other wireless communication other than the digital radio broadcast transmission for rendering the content. The duplicate data permits the content to be rendered without the data error. The duplicate data is received at the digital radio broadcast receiver without the error via the other wireless communication based on the first notification. The duplicate data comprises the data in the specified format of the digital radio broadcast signal transmitted by the digital radio broadcast transmitter system. The duplicate data received via the other wireless communication without the error for rendering at the receiver is selected instead of selecting the data received by digital radio broadcast transmission that contains the data error so as to provide corrected data. The corrected data is processed at the digital radio broadcast receiver to provide an uninterrupted rendering of the content.

In an example computer-implemented method for communicating data from a digital radio broadcast transmission system to a digital radio broadcast receiver system, encoded data is received at a digital radio broadcast transmitter system. A data structure based on the encoded data is generated, where contents of the data structure include data configured to be rendered by a digital radio broadcast receiver. The data structure is encapsulated in a file, the file having a format that allows the file to be transferred via an Internet protocol. The file is transmitted to a computing system using the Internet protocol, and the computing system stores the file in a non-transitory computer-readable storage medium. A digital radio broadcast signal including the data structure is broadcasted via digital radio broadcast transmission for reception at the digital radio broadcast receiver. A first notification is received from the digital radio broadcast receiver, the first notification being indicative that the encoded data from the digital radio broadcast transmission contains a data error. The file is sent to the digital radio broadcast receiver via wireless transmission other than digital radio broadcast transmission to provide duplicate data in place of the encoded data of the digital radio broadcast transmission that contains the data error.

An example digital radio broadcast transmission system includes a computing system and a digital radio broadcast transmitter system including a processing system. The digital radio broadcast transmission system further includes a memory coupled to the processing system, where the processing system is configured to execute steps. In executing the steps, encoded data is received at a digital radio broadcast transmitter system. A data structure is generated based on the encoded data, where contents of the data structure include data configured to be rendered by a digital radio broadcast receiver. The data structure is encapsulated in a file, the file having a format that allows the file to be transferred via an Internet protocol. The file is transmitted to the computing system using the Internet protocol, and the computing system stores the file in a non-transitory computer-readable storage medium. A digital radio broadcast signal including the data structure is broadcasted via digital radio broadcast transmission for receipt at the digital radio broadcast receiver. The computing system is configured to receive a first notification from the digital radio broadcast receiver, the first notification being indicative that the encoded data from the digital radio broadcast transmission contains a data error. The computing system is configured to process the file for transmission to the digital radio broadcast receiver via other wireless communication other than the digital radio broadcast transmission to provide duplicate data in place of the encoded data of the digital radio broadcast transmission that contains the data error.

An example article of manufacture includes a non-transitory computer readable storage medium having computer program instructions for communicating data from a digital radio broadcast transmission system to a digital radio broadcast receiver system. The instructions include first instructions which when executed are adapted to cause a processing system of a digital radio broadcast transmitter system to execute steps. In executing the steps, encoded data is received at a digital radio broadcast transmitter system. A data structure is generated based on the encoded data, where contents of the data structure include data configured to be rendered by a digital radio broadcast receiver. The data structure is encapsulated in a file, the file having a format that allows the file to be transferred via an Internet protocol. The file is transmitted to a computing system using the Internet protocol, and the computing system stores the file in a non-transitory computer-readable storage medium. A digital radio broadcast signal including the data structure is broadcasted via digital radio broadcast transmission for receipt at the digital radio broadcast receiver. The instructions further include second instructions which when executed are adapted to cause the computing system to execute second steps. In executing the second steps, a first notification is received from the digital radio broadcast receiver, the first notification being indicative that the encoded data from the digital radio broadcast transmission contains a data error. Further, in executing the second steps, the file is processed for transmission to the digital radio broadcast receiver via other wireless communication other than the digital radio broadcast transmission to provide duplicate data in place of the encoded data of the digital radio broadcast transmission that contains the data error.

BRIEF DESCRIPTION OF THE DRAWINGS

These and other features, aspects, and advantages of the present disclosure will become better understood with regard to the following description, appended claims, and accompanying drawings wherein:

FIG. 5 is a schematic representation of a hybrid AM IBOC waveform;

FIG. 6 is a schematic representation of an all-digital AM IBOC waveform;

DETAILED DESCRIPTION

Digital radio broadcast signals received at a digital radio broadcast receiver may include data containing one or more errors. The present inventors have developed novel systems and methods to mitigate the effect of these errors. Certain aspects of the systems and methods are implemented at a transmitter side, while other aspects are implemented at a receiver side. The approaches described herein may be used in providing an uninterrupted rendering of content (e.g., any one of audio, video, text, still images, multimedia, etc., or a combination thereof) at the digital radio broadcast receiver.

Exemplary Digital Radio Broadcasting System

FIGS. 1-7 and the accompanying description herein provide a general description of an exemplary IBOC system, exemplary broadcasting equipment structure and operation, and exemplary receiver structure and operation. FIGS. 8-22 and the accompanying description herein provide a detailed description of exemplary approaches for providing an uninterrupted rendering of content of a digital radio broadcast receiver. Whereas aspects of the disclosure are presented in the context of an exemplary IBOC system, it should be understood that the present disclosure is not limited to IBOC systems and that the teachings herein are applicable to other forms of digital radio broadcasting as well.

As referred to herein, a service is any analog or digital medium for communicating content via radio frequency broadcast. For example, in an IBOC radio signal, the analog modulated signal, the digital main program service, and the digital supplemental program services could all be considered services. Other examples of services can include conditionally accessed programs (CAs), which are programs that require a specific access code and can be both audio and/or data such as, for example, a broadcast of a game, concert, or traffic update service, and data services, such as traffic data, multimedia and other files, and service information guides (SIGs).

Additionally, as referred to herein, media content is any substantive information or creative material, including, for example, audio, video, text, image, or metadata, that is suitable for processing by a processing system to be rendered, displayed, played back, and/or used by a human.

Figure 1:
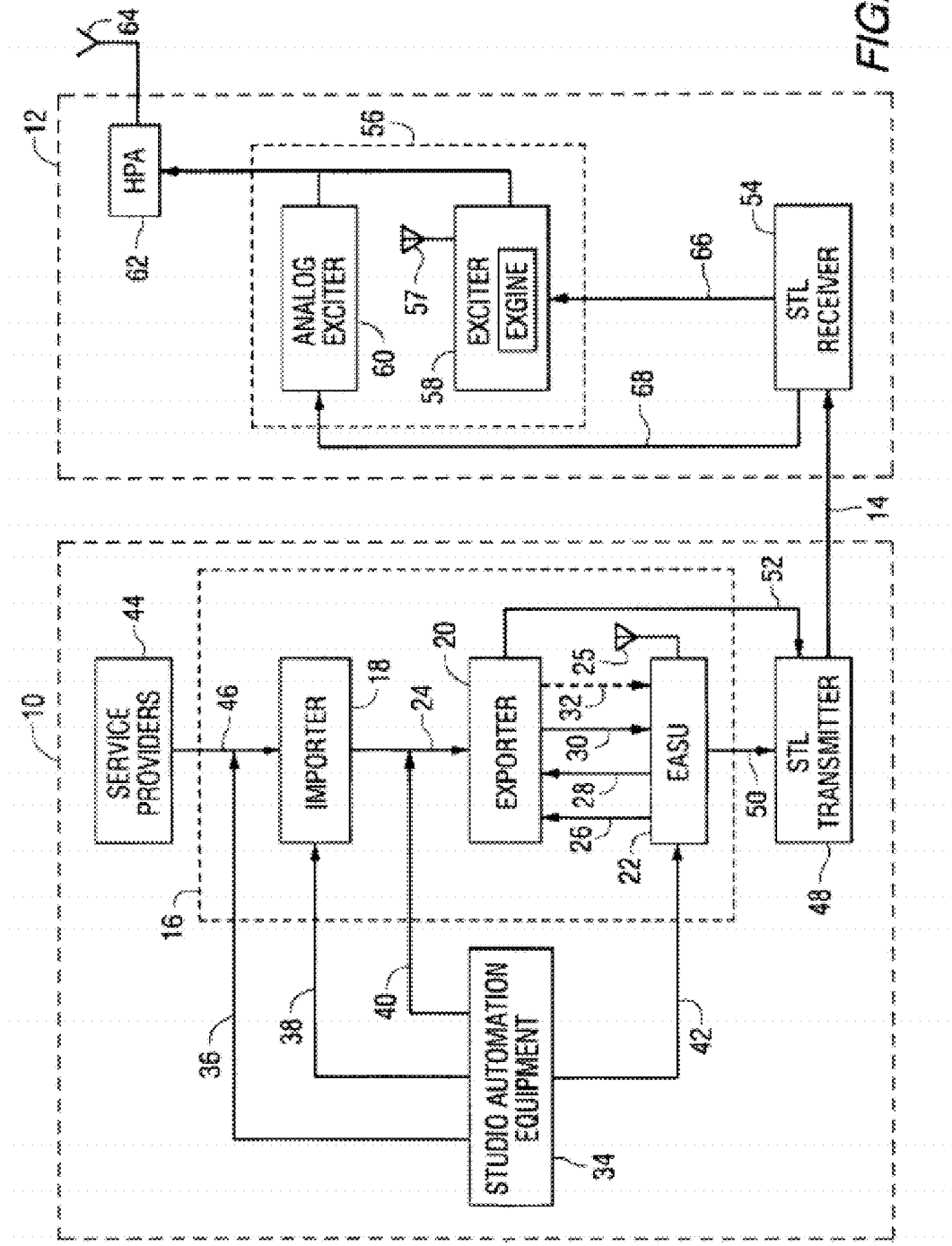
FIG. 1 illustrates a block diagram that provides an overview of a broadcasting system in accordance with certain embodiments.

Referring to the drawings, FIG. 1 is a functional block diagram of exemplary relevant components of a studio site 10, an FM transmitter site 12, and a studio transmitter link (STL) 14 that can be used to broadcast an FM IBOC digital radio broadcasting signal. The studio site includes, among other things, studio automation equipment 34, an Ensemble Operations Center (EOC) 16 that includes an importer 18, an exporter 20, and an exciter auxiliary service unit (EASU) 22. An STL transmitter 48 links the EOC with the transmitter site. The transmitter site includes an STL receiver 54, an exciter 56 that includes an exciter engine (exgine) subsystem 58, and an analog exciter 60. While in FIG. 1 the exporter is resident at a radio station's studio site and the exciter is located at the transmission site, these elements may be co-located at the transmission site.

At the studio site, the studio automation equipment supplies main program service (MPS) audio 42 to the EASU, MPS data 40 to the exporter, supplemental program service (SPS) audio 38 to the importer, and SPS data 36 to the importer 18. MPS audio serves as the main audio programming source. In hybrid modes, it preserves the existing analog radio programming formats in both the analog and digital transmissions. MPS data or SPS data, also known as program service data (PSD), includes information such as music title, artist, album name, etc. Supplemental program service can include supplementary audio content as well as program service data.

The importer 18 contains hardware and software for supplying advanced application services (AAS). AAS can include any type of data that is not classified as MPS, SPS, or Station Information Service (SIS). SIS provides station information, such as call sign, absolute time, position correlated to GPS, etc. Examples of AAS include data services for electronic program guides, navigation maps, real-time traffic and weather information, multimedia applications, other audio services, and other data content. The content for AAS can be supplied by service providers 44, which provide service data 46 to the importer via an application program interface (API). The service providers may be a broadcaster located at the studio site or externally sourced third-party providers of services and content. The importer can establish session connections between multiple service providers. The importer encodes and multiplexes service data 46, SPS audio 38, and SPS data 36 to produce exporter link data 24, which is output to the exporter via a data link. The importer 18 also encodes a SIG, in which it typically identifies and describes available services. For example, the SIG may include data identifying the genre of the services available on the current frequency (e.g., the genre of MPS audio and any SPS audio).

The importer 18 can use a data transport mechanism, which may be referred to herein as a radio link subsystem (RLS), to provide packet encapsulation, varying levels of quality of service (e.g., varying degrees of forward error correction and interleaving), and bandwidth management functions. The RLS uses High-Level Data Link Control (HDLC) type framing for encapsulating the packets. HDLC is known to one of skill in the art and is described in ISO/IEC 13239:2002 Information technology—Telecommunications and information exchange between systems—High-level data link control (HDLC) procedures. HDLC framing includes a beginning frame delimiter (e.g., '0x7E')

and an ending frame delimiter (e.g., '0x7E'). The RLS header includes a logical address (e.g., port number), a control field for sequence numbers and other information (e.g., packet 1 of 2, 2 of 2 etc.), the payload (e.g., the index file), and a checksum (e.g., a CRC). For bandwidth management, the importer 18 typically assigns logical addresses (e.g. ports) to AAS data based on, for example, the number and type of services being configured at any given studio site 10. RLS is described in more detail in U.S. Pat. No. 7,305,043, which is incorporated herein by reference in its entirety.

Due to receiver implementation choices, RLS packets can be limited in size to about 8192 bytes, but other sizes could be used. Therefore data may be prepared for transmission according to two primary data segmentation modes—packet mode and byte-streaming mode—for transmitting objects larger than the maximum packet size. In packet mode the importer 18 may include a large object transfer (LOT) client (e.g. a software client that executes on the same computer processing system as the importer 18 or on a different processing system such as a remote processing system) to segment a "large" object (for example, a sizable image file) into fragments no larger than the chosen RLS packet size. In typical embodiments objects may range in size up to 4,294, 967,295 bytes. At the transmitter, the LOT client writes packets to an RLS port for broadcast to the receiver. At the receiver, the LOT client reads packets from the RLS port of the same number. The LOT client may process data associated with many RLS ports (e.g., typically up to 32 ports) simultaneously, both at the receiver and the transmitter.

The LOT client operates by sending a large object in several messages, each of which is no longer than the maximum packet size. To accomplish this, the transmitter assigns an integer called a LotID to each object broadcast via the LOT protocol. All messages for the same object will use the same LotID. The choice of LotID is arbitrary except that no two objects being broadcast concurrently on the same RLS port may have the same LotID. In some implementations, it may be advantageous to exhaust all possible LotID values before a value is reused.

When transmitting data over-the-air, there may be some packet loss due to the probabilistic nature of the radio propagation environment. The LOT client addresses this issue by allowing the transmitter to repeat the transmission of an entire object. Once an object has been received correctly, the receiver can ignore any remaining repetitions. All repetitions will use the same LotID. Additionally, the transmitter may interleave messages for different objects on the same RLS port so long as each object on the port has been assigned a unique LotID.

The LOT client divides a large object into messages, which are further subdivided into fragments. Preferably all the fragments in a message, excepting the last fragment, are a fixed length such as 256 bytes. The last fragment may be any length that is less than the fixed length (e.g., less than 256 bytes). Fragments are numbered consecutively starting from zero. However, in some embodiments an object may have a zero-length object—the messages would contain only descriptive information about the object.

The LOT client typically uses two types of messages—a full header message, and a fragment header message. Each message includes a header followed by fragments of the object. The full header message contains the information to reassemble the object from the fragments plus descriptive information about the object. By comparison, the fragment header message contains only the reassembly information. The LOT client of the receiver (e.g. a software and/or hardware application that typically executes within the data processors 232 and 288 of FIGS. 7 and 9, respectively, or any other suitable processing system) distinguishes between the two types of messages by a header-length field (e.g. field name "hdrLen"). Each message can contain any suitable number of fragments of the object identified by the LotID in the header as long as the maximum RLS packet length is not exceeded. There is no requirement that all messages for an object contain the same number of fragments. Table 1 below illustrates exemplary field names and their corresponding descriptions for a full header message. Fragment header messages typically include only the hdrLen, repeat, LotID, and position fields.

TABLE 1

| FIELD NAME | FIELD DESCRIPTION |
| --- | --- |
| hdrLen | Size of the header in bytes, including the hdrLen field. Typically ranges from 24-255 bytes. |
| Repeat | Number of object repetitions remaining. Typically ranges from 0 to 255. All messages for the same repetition of the object use the same repeat value. When repeating an object, the transmitter broadcasts all messages having repeat = R before broadcasting any messages having repeat = R − 1. A value of 0 typically means the object will not be repeated again. |
| LotID | Arbitrary identifier assigned by the transmitter to the object. Typically range from 0 to 65,535. All messages for the same object use the same LotID value. |
| Position | The byte offset in the reassembled object of the first fragment in the message equals 256*position. Equivalent to "fragment number". |
| Version | Version of the LOT protocol |
| discardTime | Year, month, day, hour, and minute after which the object may be discarded at the receiver. Expressed in Coordinated Universal Time (UTC). |
| fileSize | Total size of the object in bytes. |
| mime Hash | MIME hash describing the type of object |
| filename | File name associated with the object |

Full header and fragment header messages may be sent in any ratio provided that at least one full header message is broadcast for each object. Bandwidth efficiency will typically be increased by minimizing the number of full header messages; however, this may increase the time necessary for the receiver to determine whether an object is of interest based on the descriptive information that is only present in the full header. Therefore there is typically a trade between efficient use of broadcast bandwidth and efficient receiver processing and reception of desired LOT files.

In byte-streaming mode, as in packet mode, each data service is allocated a specific bandwidth by the radio station operators based on the limits of the digital radio broadcast modem frames. The importer 18 then receives data messages of arbitrary size from the data services. The data bytes received from each service are then placed in a byte bucket (e.g. a queue) and HDLC frames are constructed based on the bandwidth allocated to each service. For example, each service may have its own HDLC frame that will be just the right size to fit into a modem frame. For example, assume that there are two data services, service #1 and service #2. Service #1 has been allocated 1024 bytes, and service #2 512 b Now assume that service #1 sends message A having 2048 bytes, and service #2 sends message B also having 2048 bytes. Thus the first modem frame will contain two HDLC frames; a 1024 byte frame containing N bytes of message A and a 512 byte HDLC frame containing M bytes of message B. N & M are determined by how many HDLC escape characters are needed and the size of the RLS header information. If no escape characters are needed then N=1015 and M=503 assuming a 9 byte RLS header. If the messages contain nothing but HDLC framing bytes (i.e. 0x7E) then N=503 and M=247, again assuming a 9 byte RLS header containing no escape characters. Also, if data service #1 does not send a new message (call it message AA) then its unused bandwidth may be given to service #2 so its HDLC frame will be larger than its allocated bandwidth of 512 bytes.

The exporter 20 contains the hardware and software necessary to supply the main program service and SIS for broadcasting. The exporter accepts digital MPS audio 26 over an audio interface and compresses the audio. The exporter also multiplexes MPS data 40, exporter link data 24, and the compressed digital MPS audio to produce exciter link data 52. In addition, the exporter accepts analog MPS audio 28 over its audio interface and applies a pre-programmed delay to it to produce a delayed analog MPS audio signal 30. This analog audio can be broadcast as a backup channel for hybrid IBOC digital radio broadcasts. The delay compensates for the system delay of the digital MPS audio, allowing receivers to blend between the digital and analog program without a shift in time. In an AM transmission system, the delayed MPS audio signal 30 is converted by the exporter to a mono signal and sent directly to the STL as part of the exciter link data 52.

The EASU 22 accepts MPS audio 42 from the studio automation equipment, rate converts it to the proper system clock, and outputs two copies of the signal, one digital (26) and one analog (28). The EASU includes a GPS receiver that is connected to an antenna 25. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational. The bypassed audio 32 can be fed directly into the STL transmitter, eliminating a dead-air event.

STL transmitter 48 receives delayed analog MPS audio 50 and exciter link data 52. It outputs exciter link data and delayed analog MPS audio over STL link 14, which may be either unidirectional or bidirectional. The STL link may be a digital microwave or Ethernet link, for example, and may use the standard User Datagram Protocol or the standard TCP/IP.

The transmitter site includes an STL receiver 54, an exciter engine (exgine) 56 and an analog exciter 60. The STL receiver 54 receives exciter link data, including audio and data signals as well as command and control messages, over the STL link 14. The exciter link data is passed to the exciter 56, which produces the IBOC digital radio broadcasting waveform. The exciter includes a host processor, digital up-converter, RF up-converter, and exgine subsystem 58. The exgine accepts exciter link data and modulates the digital portion of the IBOC digital radio broadcasting waveform. The digital up-converter of exciter 56 converts from digital-to-analog the baseband portion of the exgine output. The digital-to-analog conversion is based on a GPS clock, common to that of the exporter's GPS-based clock derived from the EASU. Thus, the exciter 56 includes a GPS unit and antenna 57. An alternative method for synchronizing the exporter and exciter clocks can be found in U.S. Pat. No. 7,512,175, the disclosure of which is hereby incorporated by reference. The RF up-converter of the exciter up-converts the analog signal to the proper in-band channel frequency. The up-converted signal is then passed to the high power amplifier 62 and antenna 64 for broadcast. In an AM transmission system, the exgine subsystem coherently adds the backup analog MPS audio to the digital waveform in the hybrid mode; thus, the AM transmission system does not include the analog exciter 60. In addition, in an AM transmission system, the exciter 56 produces phase and magnitude information and the analog signal is output directly to the high power amplifier.

IBOC digital radio broadcasting signals can be transmitted in both AM and FM radio bands, using a variety of waveforms. The waveforms include an FM hybrid IBOC digital radio broadcasting waveform, an FM all-digital IBOC digital radio broadcasting waveform, an AM hybrid IBOC digital radio broadcasting waveform, and an AM all-digital IBOC digital radio broadcasting waveform.

Figure 2:
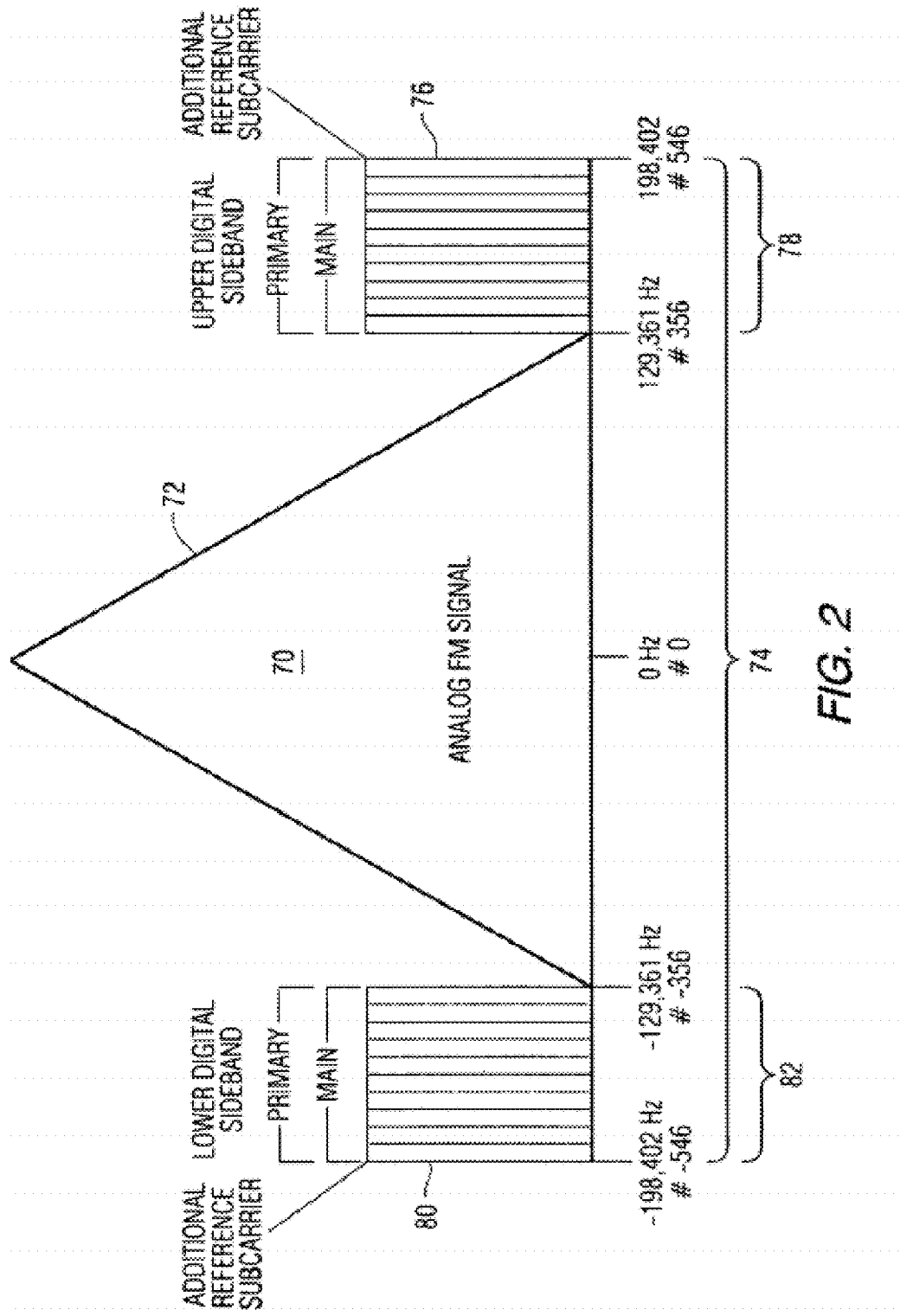
FIG. 2 is a schematic representation of a hybrid FM IBOC waveform.

FIG. 2 is a schematic representation of a hybrid FM IBOC waveform 70. The waveform includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform includes an analog FM-modulated signal, plus digitally modulated primary main subcarriers. The subcarriers are located at evenly spaced frequency locations. The subcarrier locations are numbered from −546 to +546. In the waveform of FIG. 2, the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

Figure 3:
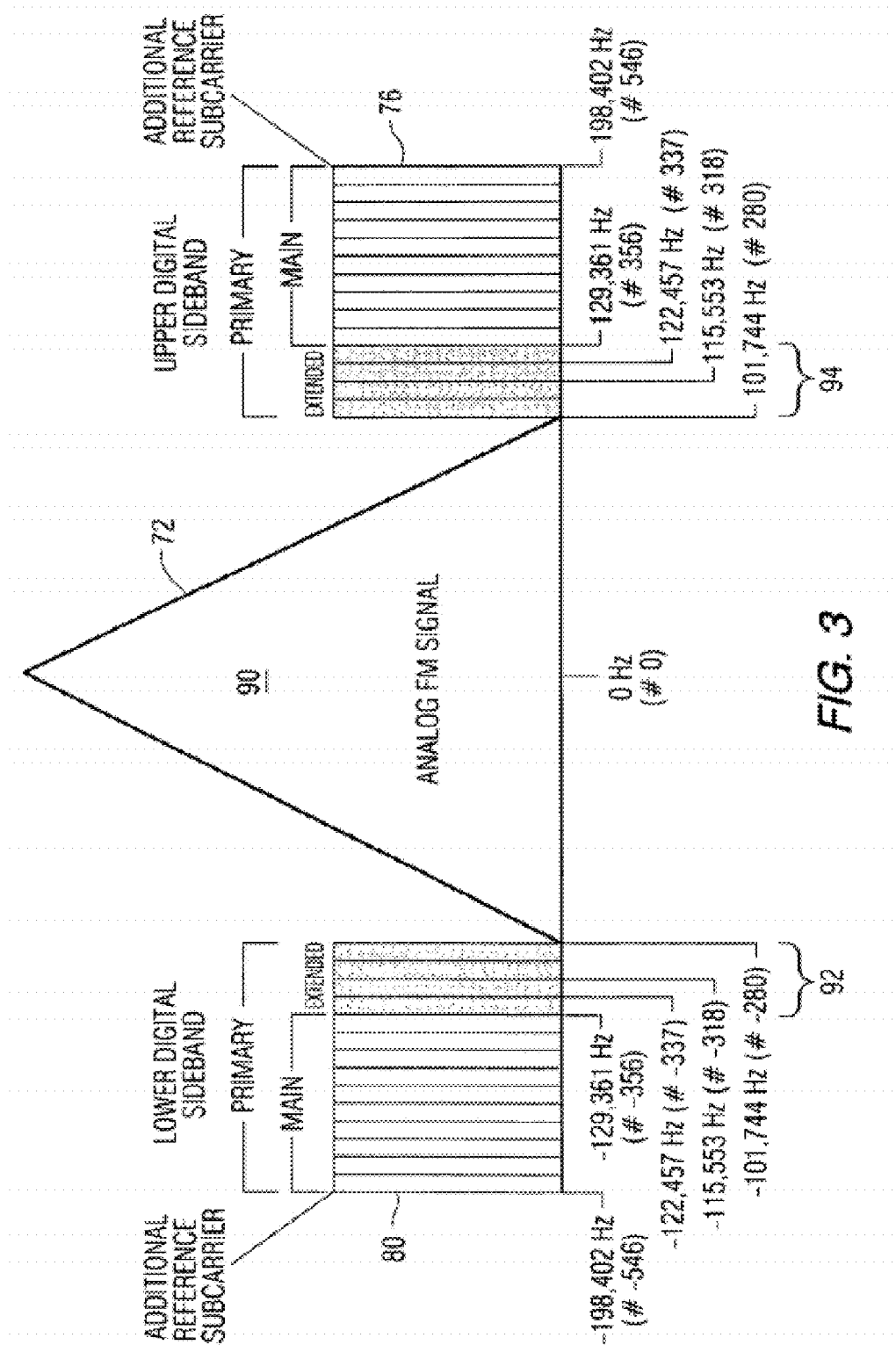
FIG. 3 is a schematic representation of an extended hybrid FM IBOC waveform.

FIG. 3 is a schematic representation of an extended hybrid FM IBOC waveform 90. The extended hybrid waveform is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus digitally modulated primary main subcarriers (subcarriers +356 to +546 and −356 to −546) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 4:
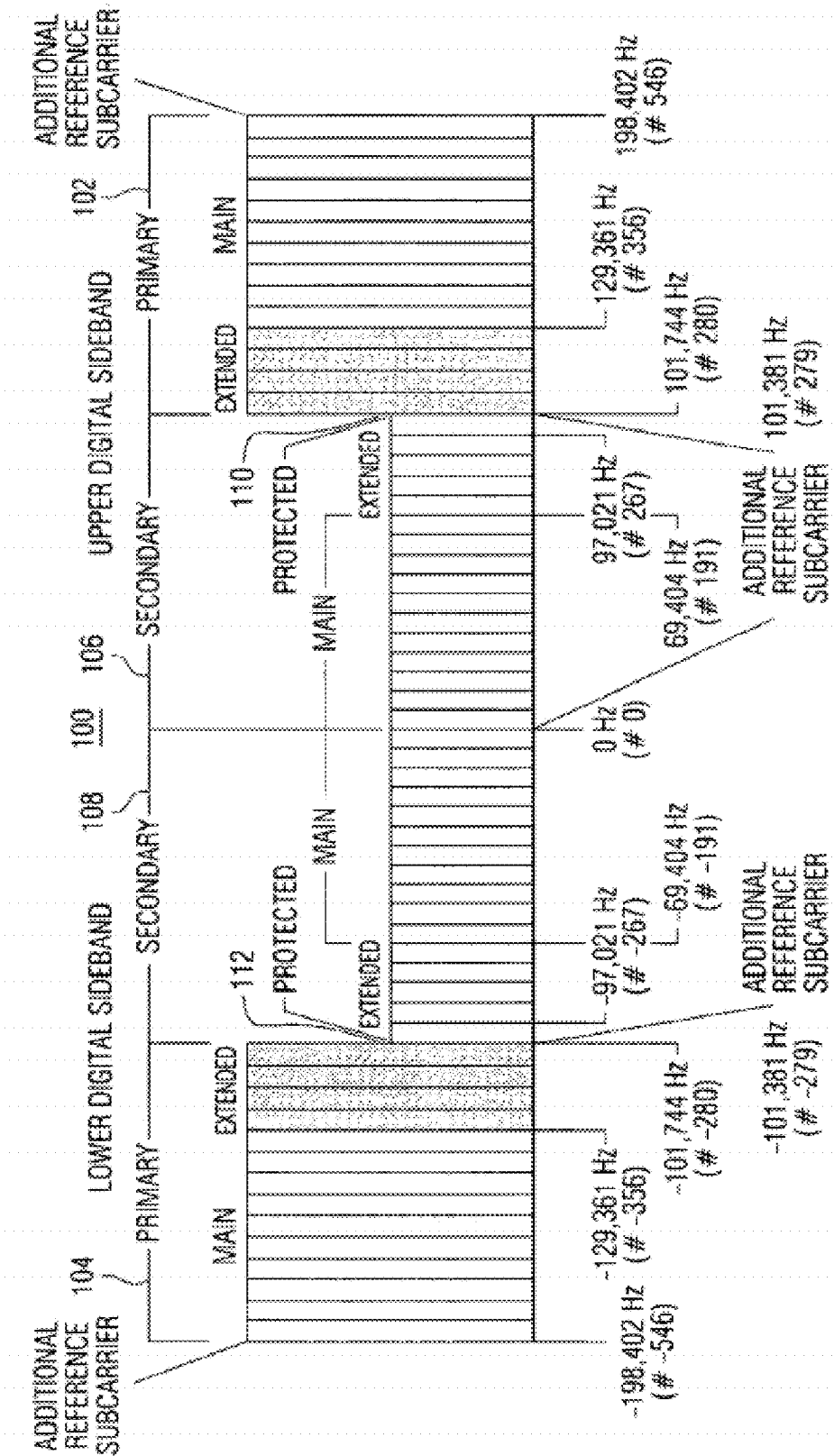
FIG. 4 is a schematic representation of an all-digital FM IBOC waveform.

FIG. 4 is a schematic representation of an all-digital FM IBOC waveform 100. The all-digital waveform is constructed by disabling the analog signal, fully extending the bandwidth of the primary digital sidebands 102, 104, and adding lower-power secondary sidebands 106, 108 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten secondary main (SM) and four secondary extended (SX) frequency partitions. Unlike the primary sidebands, however, the secondary main frequency partitions are mapped nearer to the channel center with the extended frequency partitions farther from the center.

Each secondary sideband also supports a small secondary protected (SP) region 110, 112 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each secondary main sideband spans subcarriers 1 through 190 or −1 through −190. The upper secondary extended sideband includes subcarriers 191 through 266, and the upper secondary protected sideband includes subcarriers 267 through 278, plus additional reference subcarrier 279. The lower secondary extended sideband includes subcarriers −191 through −266, and the lower secondary protected sideband includes subcarriers −267 through −278, plus additional reference subcarrier −279. The over-the-air frequency span of the entire all-digital spectrum is 396,803 Hz. The amplitude of each subcarrier can be scaled by an amplitude scale factor. Any one of the four may be selected for application to the secondary sidebands.

In each of the waveforms, the digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM signal in the hybrid waveform. The power level of each sideband is appreciably below the over-the-air power in the analog FM signal. The analog signal may be monophonic or stereophonic, and may include subsidiary communications authorization (SCA) channels.

In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband.

In the all-digital waveform, the analog signal is removed and the bandwidth of the primary digital sidebands is fully extended as in the extended hybrid waveform. In addition, this waveform allows lower-power digital secondary sidebands to be transmitted in the spectrum vacated by the analog FM signal.

FIG. 5 is a schematic representation of an AM hybrid IBOC digital radio broadcasting waveform 120. The hybrid format includes the conventional AM analog signal 122 (bandlimited to about ±5 kHz) along with a nearly 30 kHz wide digital radio broadcasting signal 124. The spectrum is contained within a channel 126 having a bandwidth of about 30 kHz. The channel is divided into upper 130 and lower 132 frequency bands. The upper band extends from the center frequency of the channel to about +15 kHz from the center frequency. The lower band extends from the center frequency to about −15 kHz from the center frequency.

The AM hybrid IBOC digital radio broadcasting signal format in one example comprises the analog modulated carrier signal 134 plus OFDM subcarrier locations spanning the upper and lower bands. Coded digital information representative of the audio or data signals to be transmitted (program material), is transmitted on the subcarriers. The symbol rate is less than the subcarrier spacing due to a guard time between symbols.

As shown in FIG. 5, the upper band is divided into a primary section 136, a secondary section 138, and a tertiary section 144. The lower band is divided into a primary section 140, a secondary section 142, and a tertiary section 143. For the purpose of this explanation, the tertiary sections 143 and 144 can be considered to include a plurality of groups of subcarriers labeled 146 and 152 in FIG. 5. Subcarriers within the tertiary sections that are positioned near the center of the channel are referred to as inner subcarriers, and subcarriers within the tertiary sections that are positioned farther from the center of the channel are referred to as outer subcarriers. The groups of subcarriers 146 and 152 in the tertiary sections have substantially constant power levels. FIG. 5 also shows two reference subcarriers 154 and 156 for system control, whose levels are fixed at a value that is different from the other sidebands.

The power of subcarriers in the digital sidebands is significantly below the over-the-air power in the analog AM signal. The level of each OFDM subcarrier within a given primary or secondary section is fixed at a constant value. Primary or secondary sections may be scaled relative to each other. In addition, status and control information is transmitted on reference subcarriers located on either side of the main carrier. A separate logical channel, such as an IBOC Data Service (IDS) channel can be transmitted in individual subcarriers just above and below the frequency edges of the upper and lower secondary sidebands. The power level of each primary OFDM subcarrier is fixed relative to the unmodulated main analog carrier. However, the power level of the secondary subcarriers, logical channel subcarriers, and tertiary subcarriers is adjustable.

Using the modulation format of FIG. 5, the analog modulated carrier and the digitally modulated subcarriers are transmitted within the channel mask specified for standard AM broadcasting in the United States. The hybrid system uses the analog AM signal for tuning and backup.

FIG. 6 is a schematic representation of the subcarrier assignments for an all-digital AM IBOC digital radio broadcasting waveform. The all-digital AM IBOC digital radio broadcasting signal 160 includes first and second groups 162 and 164 of evenly spaced subcarriers, referred to as the primary subcarriers, that are positioned in upper and lower bands 166 and 168. Third and fourth groups 170 and 172 of subcarriers, referred to as secondary subcarriers, are also positioned in upper and lower bands 166 and 168. Two reference subcarriers 174 and 176 of the third group lie closest to the center of the channel. Subcarriers 178 and 180 can be used to transmit IBOC Data Service (IDS).

Figure 7:
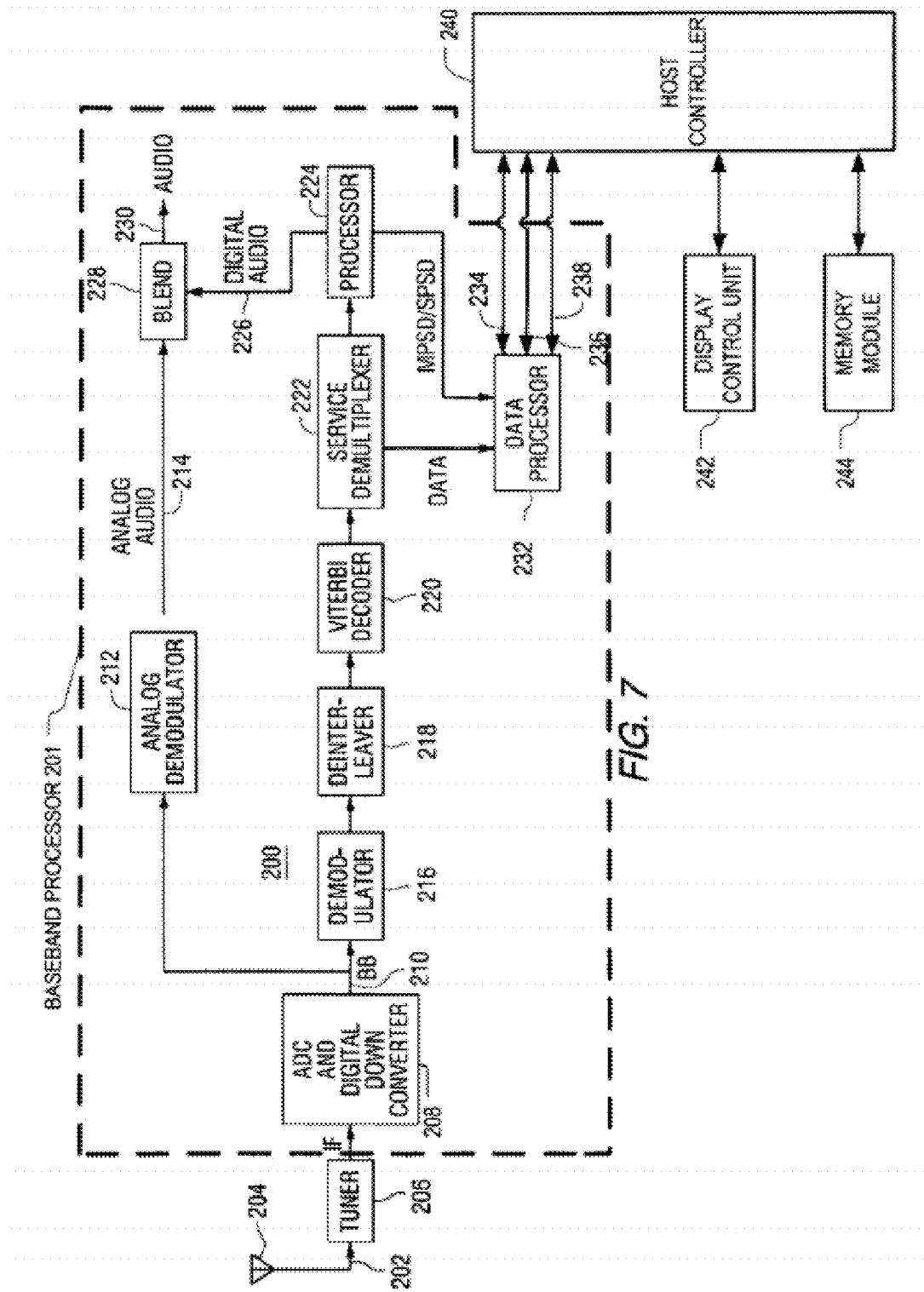
FIG. 7 is a functional block diagram of an IBOC digital radio broadcasting receiver in accordance with certain embodiments.

FIG. 7 is a simplified functional block diagram of the relevant components of an exemplary IBOC digital radio broadcasting receiver 200. While only certain components of the receiver 200 are shown for exemplary purposes, it should be apparent that the receiver may comprise a number of additional components and may be distributed among a number of separate enclosures having tuners and front-ends, speakers, remote controls, various input/output devices, etc. The receiver 200 has a tuner 206 that includes an input 202 connected to an antenna 204. The receiver also includes a baseband processor 201 that includes a digital down converter 208 for producing a baseband signal on line 210. An analog demodulator 212 demodulates the analog modulated portion of the baseband signal to produce an analog audio signal on line 214. A digital demodulator 216 demodulates the digitally modulated portion of the baseband signal. Then the digital signal is deinterleaved by a deinterleaver 218, and decoded by a Viterbi decoder 220. A service demultiplexer 222 separates main and supplemental program signals from data signals. A processor 224 processes the program signals to produce a digital audio signal on line 226. The analog and main digital audio signals are blended as shown in block 228, or a supplemental digital audio signal is passed through, to produce an audio output on line 230. A data processor 232 processes the data signals and produces data output signals on lines 234, 236 and 238. The data lines 234, 236, and 238 may be multiplexed together onto a suitable bus such as an inter-integrated circuit ($I^2C$), serial peripheral interface (SPI), universal asynchronous receiver/transmitter (UART), or universal serial bus (USB). The data signals can include, for example, SIS, MPS data, SPS data, and one or more AAS.

The host controller 240 receives and processes the data signals (e.g., the SIS, MPSD, SPSD, and AAS signals). The host controller 240 comprises a microcontroller that is coupled to the display control unit (DCU) 242 and memory module 244. Any suitable microcontroller could be used such as an 8-bit reduced instruction set computer (RISC) microcontroller, an advanced RISC machine 32-bit microcontroller or any other suitable microcontroller. Additionally, a portion or all of the functions of the host controller 240 could be performed in a baseband processor (e.g., the processor 224 and/or data processor 232). The DCU 242 comprises any suitable I/O processor that controls the display, which may be any suitable visual display such as an LCD or LED display. In certain embodiments, the DCU 242 may also control user input components via touch-screen display. In certain embodiments the host controller 240 may also control user input from a keyboard, dials, knobs or other suitable inputs. The memory module 244 may include any suitable data storage medium such as RAM, Flash ROM (e.g., an SD memory card), and/or a hard disk drive. In certain embodiments, the memory module 244 may be included in an external component that communicates with the host controller 240 such as a remote control.

The following describes exemplary processes for providing an uninterrupted rendering of content at a digital radio broadcast receiver. As described in detail below, certain aspects of these processes are carried out at the transmitter side, while other aspects are carried out at the receiver side. In general, the approaches described herein utilize cross-medium reception techniques, whereby same content is delivered to the digital radio broadcast receiver over two parallel paths. The two parallel paths may comprise two different communication platforms, such as over-the-air digital radio broadcast transmission and wireless Internet. By default, data from a primary communication platform is selected for rendering at the receiver, unless this data contains an error. When such an error is detected, data from a secondary communication medium is selected and rendered. The data from the secondary medium provides corrected, error-free data for providing an uninterrupted rendering of content at the receiver. Although the description below primarily describes the use of this approach for rendering audio, it should be understood that the systems and methods described herein apply to the rendering of any type of content (e.g., any one of audio, video, text, still images, multimedia, etc., or a combination thereof).

Figure 8:
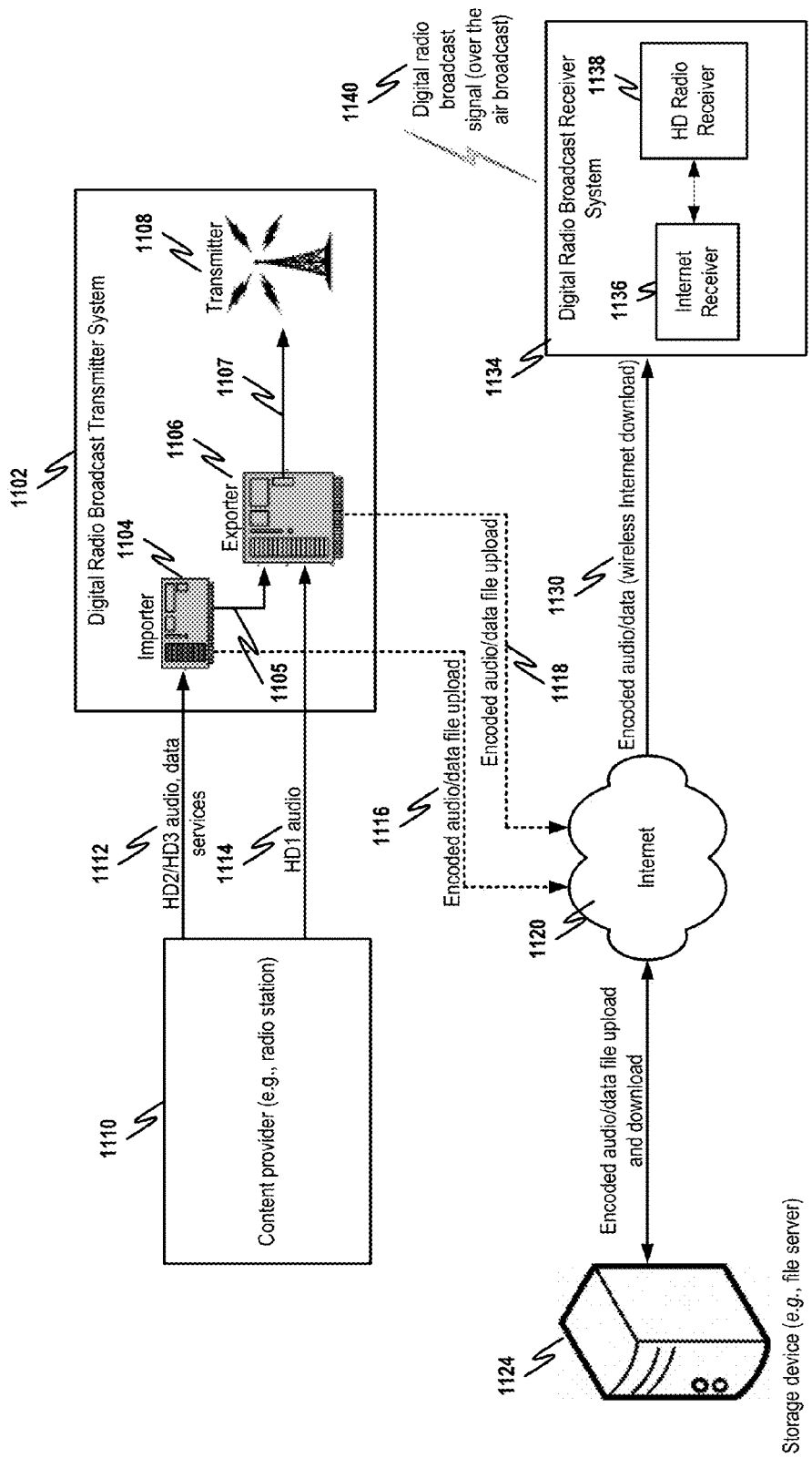
FIG. 8 is a block diagram depicting an example system for providing duplicate data to a digital radio broadcast receiver system via multiple different communication platforms.

FIG. 8 is a block diagram depicting an example system for providing duplicate data to a digital radio broadcast receiver system 1134 via multiple, e.g., two different communication platforms. As described in further detail below, a first communication platform may be an over-the-air digital radio broadcast transmission, and a second communication medium may be wireless Internet. In FIG. 8, to facilitate the providing of content via the first communication platform, a digital radio broadcast transmitter system 1102 includes exemplary components that can be used to broadcast an over-the-air, digital radio broadcast signal 1140 to the digital radio broadcast receiver system 1134. The transmitter system 1102 may include an importer 1104, an exporter 1106, and a transmitter 1108, among other components. The importer 1104, exporter 1106, and transmitter 1108 may be similar to the importer 18, exporter 20, and transmitter 12 of FIG. 1, described above.

A content provider 1110 may supply HD1 audio 1114 to the exporter 1106. The HD1 audio 1114 may be encoded audio configured to be broadcast over-the-air by the transmitter system 1102. The HD1 audio 1114 may include, for example, main program service (MPS) audio and MPS data (e.g., program service data (PSD)) as described in greater detail above with reference to FIG. 1. The content provider 1110 may also supply HD2/HD3 audio and data services 1112 to the importer 1104, which processes and forwards such audio and data services to the exporter 1106. The HD2/HD3 audio may be encoded audio that includes supplemental program service (SPS) audio, and SPS data (e.g., program service data (PSD)). The data services may include other audio, video, text, still images, multimedia, etc., or a combination thereof. The content provider 1110 that supplies the audio and data 1112, 1114 to the importer 1104 and exporter 1106 may be operated, for example, by a radio station. The content provider 1110 may generate the audio and data 1112, 1114 based on a non-transitory computer-readable storage medium (e.g., a hard drive or memory device) for storing audio, a radio station studio link for receiving a live feed from a studio, and a data services interface for receiving data from data clients. Such components used by the content provider 1110 are known to those of ordinary skill in the art.

The importer 1104 may contain hardware and/or software for producing exporter link data 1105, which is output to the exporter 1106 via a data link. To produce the exporter link data 1105, the importer 1104 may encode and multiplex various data (e.g., AAS data, HD2/HD3 audio, and SPS data services, etc.). The importer 1104 may also encode a SIG (service information guide) that identifies and describes available services and provides various other services (e.g., access keys, component priorities data, etc.). The exporter 1106 may contain the hardware and/or software necessary to supply audio and data to the transmitter 1108 for broadcasting. Specifically, the exporter 1106 may receive the HD1 audio 1114 from the content provider 1110 and compress the audio 1114. The exporter 1106 may further multiplex the compressed audio and the exporter link data 1105 to produce exciter link data 1107. The exciter link data 1107 is received at the transmitter 1108, which may utilize an exciter to produce a digital radio broadcasting waveform. The digital radio broadcasting waveform may undergo various processing (e.g., upconversion, amplification, etc.) before being passed to an antenna for broadcast.

The over-the-air digital radio broadcast signal 1140 including audio and/or data may be broadcasted from the antenna of the transmitter 1108 and received by the digital radio broadcast receiver system 1134. In the example of FIG. 8, the digital radio broadcast receiver system 1134 comprises a device or system that includes hardware and/or software for accessing the Internet 1120 and hardware and/or software for receiving the digital radio broadcast signal 1140. Thus, the digital radio broadcast receiver system 1134 may include both an Internet receiver 1136 and an HD Radio receiver 1138, as illustrated in FIG. 8. As described in greater detail below, the Internet receiver 1136 and the HD Radio receiver 1138 are used in implementing a cross-platform reception technique, whereby at least some of the same content and the same data structure is delivered to the receiver system 1134 over two parallel paths. In an example, the receiver system 1134 may comprise a handheld device that includes hardware and/or software for implementing both the Internet receiver 1136 and the HD Radio receiver 1138, e.g., a wireless 3G or 4G chipset and HD Radio chipset and associated antenna systems, e.g., a tablet or mobile phone. In another example, the receiver system 1134 may comprise i) an automotive receiver (e.g., a receiver included in an automobile) that includes the HD Radio receiver 1138, and ii) a mobile phone that includes the Internet receiver 1136. In this example, the automotive receiver and the mobile phone may be connected via a physical link (e.g. a cable, etc.) or a wireless link (e.g., Bluetooth, etc.) and may work together to implement the receiver-side processes described herein. In yet another example, the receive system may comprise an automotive receiver, a home receiver that includes a wireless 3G or 4G chipset and HD Radio chipset and associated antenna systems.

Digital radio broadcast signals may be subject to intermittent fades or blockages in certain conditions that may result in disruption or degradation of signal strength for signals received at the digital radio broadcast receiver system 1134. These phenomena can result in errors or temporary loss in the broadcast signal 1140 received at the receiver system 1134, preventing the signal data from being decoded and recovered properly. Such signal disruptions may produce noticeable gaps in the reception of the digital broadcast signal. Where available, analog audio received contemporaneously can be automatically blended to fill the gap for MPS audio, but not for SPS audio and not for data services. To further mitigate the effects of such signal disruptions and/or gaps in the reception of the digital broadcast signal, the system of FIG. 8 employs the aforementioned cross-platform reception technique for delivering duplicate data over two parallel paths. Specifically, the system of FIG. 8 uses the digital radio broadcast transmission to deliver the broadcast signal 1140 to the receiver system 1134 and further permits receiver system 1134 to receive duplicate data 1130 via a second communication platform that is different from the digital radio broadcast transmission. The duplicate data 1130 received via the second communication platform may be data that is the same as data included in the broadcast signal 1140. The receiver system 1134 can process the received broadcast signal 1140 to determine whether the data of the broadcast transmission contains a data error (e.g., a decoding error that prevents the data from being decoded properly, without errors). If the data of the received broadcast signal 1140 contains such a data error, the duplicate data 1130 received via the second communication platform may be rendered in place of rendering the data from the broadcast signal 1140. The duplicate data 1130 from the second communication platform thus acts as a "gap filler" when the data from the broadcast signal 1140 includes errors or is unavailable.

In an example of the gap-filling system described herein, signals associated with the unique HD Radio broadcasting data structures including audio data are received by the receiver system 1134 over the two communication platforms, where the first platform is over-the-air, digital radio broadcast transmission and the second platform is wireless Internet, and the data of the broadcast signal 1140 are inspected individually for errors. If a data unit, e.g., a HD Radio modem frame or a HD Radio modem block, from the broadcast signal 1140 does not contain an error, then this data unit is selected and rendered at the receiver 1134. In this case, a corresponding data unit (i.e., a frame or a block corresponding to a data structure including audio data that is the same as that included in the over-the-air data structure) received via the wireless Internet is not used. Conversely, if the data unit from the broadcast signal 1140 does contain an error, then the corresponding data unit received via the wireless Internet is selected and rendered at the receiver 1134. The two communication platforms thus function as parallel paths for delivering same audio data to the receiver system 1134, with the audio data of the wireless Internet acting as a piece-by-piece backup source of data in instances where the data of the broadcast signal 1140 contains errors. In situations where both the over-the-air broadcast signal and the Internet connectivity are disrupted, data previously stored at the receiver system 1134, or analog data received contemporaneously, may be rendered to prevent a dead-air event.

As explained above, the second communication platform used in delivering the duplicate data 1130 to the receiver 1134 may be wireless Internet (e.g., WiFi, mobile telecommunications technologies such as 3G, 4G, etc.). To implement the delivery of the duplicate data 1130 in this manner, the importer 1104 and exporter 1106 may upload a multiplicity of files 1116, 1118, respectively, wherein each file contains a data structure, to a storage device 1124 via the Internet 1120. The files 1116, 1118 include data structures that are generated based on the encoded audio and data 1112, 1114 received from the content provider 1110. Thus, the data included in the uploaded files 1116, 1118 originates from the content provider 1110 and is based on the audio and data 1112, 1114 that are intended to be broadcast over-the-air by the transmitter 1102. The storage device 1124 may be a file server associated with an Internet Protocol (IP) address. In an example, all encoded and then formatted in a unique HD Radio broadcast structure audio data that is broadcast via the transmitter system 1102 is also uploaded from the transmitter system 1102 to the storage device 1124. The file server 1124 makes this audio data (in a form of multiple files wherein each file contains a unique HD Radio broadcast structure) available for downloading by the receiver system 1134 (e.g., via wireless Internet communication).

Figure 9:
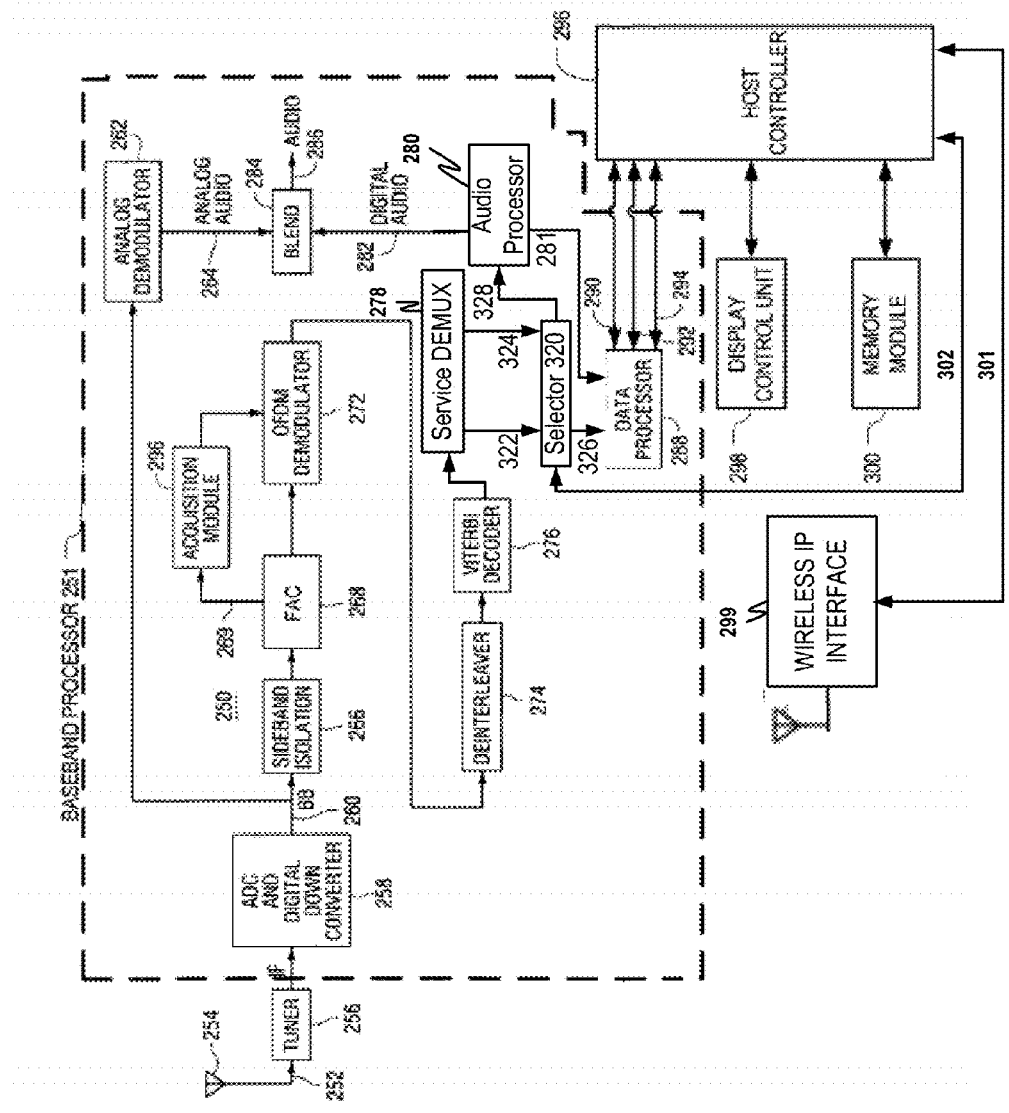
FIG. 9 is a simplified functional block diagram of the relevant components of an exemplary FM IBOC digital radio broadcasting receiver.

FIG. 9 is a simplified functional block diagram of the relevant components of an exemplary IBOC digital radio broadcasting receiver 250. While only certain components of the receiver 250 are shown for exemplary purposes, it should be apparent that the receiver may comprise a number of additional components and may be distributed among a number of separate enclosures having tuners and front-ends, speakers, remote controls, various input/output devices, etc. The exemplary receiver includes a tuner 256 that has an input 252 connected to an antenna 254. The receiver also includes a baseband processor 251. The IF signal from the tuner 256 is provided to an analog-to-digital converter and digital down converter 258 to produce a baseband signal at output 260 comprising a series of complex signal samples. The signal samples are complex in that each sample comprises a "real" component and an "imaginary" component. An analog demodulator 262 demodulates the analog modulated portion of the baseband signal to produce an analog audio signal on line 264. The digitally modulated portion of the sampled baseband signal is next filtered by isolation filter 266, which has a pass-band frequency response comprising the collective set of subcarriers $f_1$-$f_n$ present in the received OFDM signal. First adjacent canceller (FAC) 268 suppresses the effects of a first-adjacent interferer. Complex signal 269 is routed to the input of acquisition module 296, which acquires or recovers OFDM symbol timing offset or error and carrier frequency offset or error from the received OFDM symbols as represented in received complex signal 269. Acquisition module 296 develops a symbol timing offset $\Delta t$ and carrier frequency offset $\Delta f$, as well as status and control information. The signal is then demodulated (block 272) to demodulate the digitally modulated portion of the baseband signal. Then the digital signal is deinterleaved by a deinterleaver 274, and decoded by a Viterbi decoder 276. A service demultiplexer 278 separates main and supplemental program signals from data signals.

The exemplary baseband processor 251 of FIG. 9 also includes a selector 320. In FIG. 9, the service demultiplexer 278 sends a data signal 322 and an audio signal 324 to the selector 320. The data signals 322, 324 include data received at the baseband processor 251 over-the-air via a digital radio broadcast transmission for data structures representing the received content. The selector 320 may also receive corresponding data via a wireless IP interface 299 of the receiver system, which is managed by the host controller 296. As illustrated in FIG. 9, the wireless IP interface 299 and the host controller 296 are coupled via a line 301, and data transmitted between the wireless IP interface 299 and the host controller 296 is sent over this line 301. The selector 320 analyzes the data from the primary platform, e.g., the HD Radio platform, for errors by analyzing quality measures as explained later herein. If the selector 320 determines that the data received via the primary platform satisfies desired quality criteria, the selector 320 selects that data to be passed on for rendering. If the selector 320 determines that the data received via the primary platform (e.g., HD Radio transmission) does not satisfy desired quality criteria, the selector 320 selects data received via the secondary platform (e.g., wireless Internet transmission) for rendering. In some examples, the selector 320 may make a request to the file server 1124, e.g., via the wireless IP interface 299 at or coupled to the receiver 1134, which communicates with the host controller 296, to send a request for data of one or more data units (e.g., frames) at issue via the secondary platform after determining that the corresponding one or more data units (e.g., frames) received via the primary platform do not satisfy desired quality criteria. To initiate the request to the file server 1124, the selector 320 may transmit request information to the host controller 296 via a line 302. The selector 320 thus selects between the data received over-the-air and the data received via the wireless IP interface. Based on the selections made by the selector 320, the selector 320 sends data structures including main and supplemental program signals via signal 328 to audio processor 280. The audio processor 280 processes the main and supplemental program signals to produce a digital audio signal on line 282 and MPSD/SPSD 281. The analog and main digital audio signals are blended as shown in block 284, or the supplemental program signal is passed through, to produce an audio output on line 286. Based on the selections made by the selector 320, the selector 320 also sends data structures including data signals via signal 326 to data processor 288. It will be appreciated that the selector 320 described with reference to FIG. 9 could also be inserted into the receiver of FIG. 7 along with a wireless IP interface 299 and utilized in performing selection functions similar to those described herein with reference to FIG. 9. The data processor 288 processes the data signals and produces data output signals on lines 290, 292 and 294. The data lines 290, 292 and 294 may be multiplexed together onto a suitable bus such as an I²C, SPI, UART, or USB. The data signals can include, for example, SIS, MPS data, SPS data, and one or more AAS.

The host controller 296 receives and processes the data signals (e.g., SIS, MPS data, SPS data, and AAS). The host controller 296 comprises a microcontroller that is coupled to the DCU 298 and memory module 300. Any suitable microcontroller could be used such as an 8-bit RISC microcontroller, an advanced RISC machine 32-bit microcontroller or any other suitable microcontroller. Additionally, a portion or all of the functions of the host controller 296 could be performed in a baseband processor (e.g., the processor 280 and/or data processor 288). The DCU 298 comprises any suitable I/O processor that controls the display, which may be any suitable visual display such as an LCD or LED display. In certain embodiments, the DCU 298 may also control user input components via a touch-screen display. In certain embodiments the host controller 296 may also control user input from a keyboard, dials, knobs or other suitable inputs. The memory module 300 may include any suitable data storage medium such as RAM, Flash ROM (e.g., an SD memory card), and/or a hard disk drive. In certain embodiments, the memory module 300 may be included in an external component that communicates with the host controller 296 such as a remote control.

In practice, many of the signal processing functions shown in the receivers of FIGS. 7 and 9 can be implemented using one or more integrated circuits. For example, while in FIGS. 7 and 9 the signal processing block, host controller, DCU, and memory module are shown as separate components, the functions of two or more of these components could be combined in a single processor (e.g., a System on a Chip (SoC)).

Figure 10A:
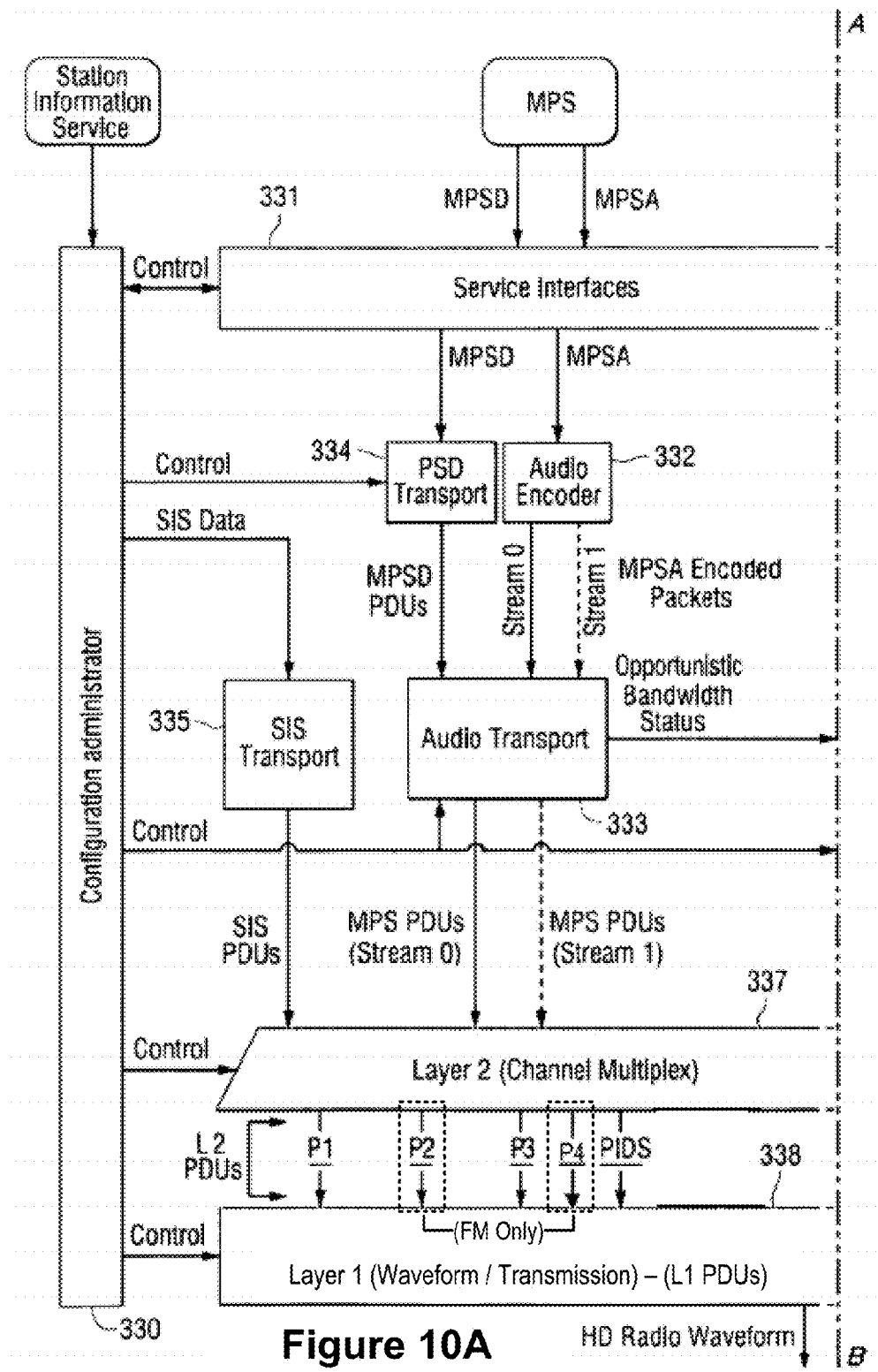
FIGS. 10A and 10B are diagrams of an IBOC digital radio broadcasting logical protocol stack from the transmitter perspective.
Figure 10B:
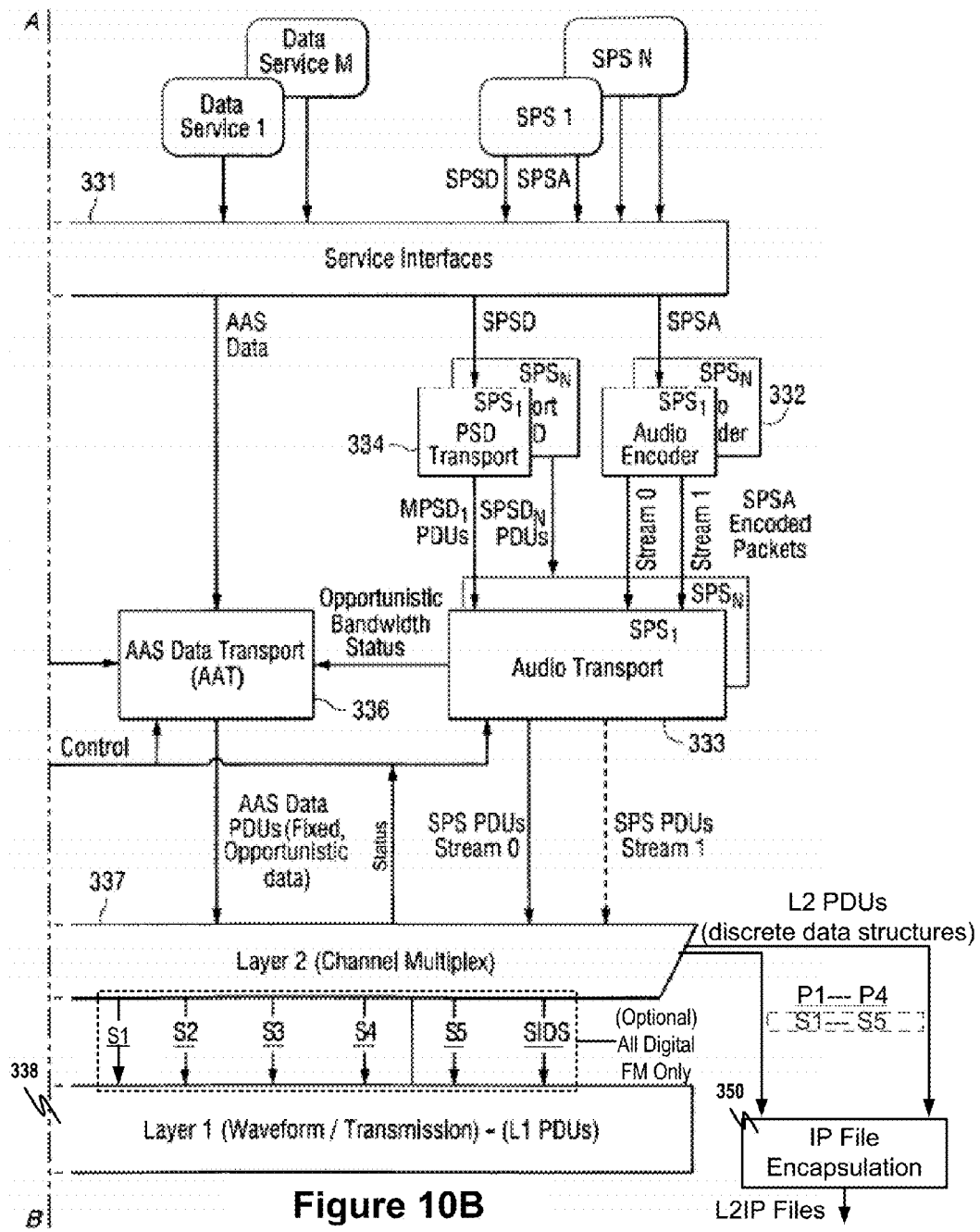

FIGS. 10A and 10B are diagrams of an exemplary IBOC digital radio broadcasting logical protocol stack from the transmitter perspective. From the receiver perspective, the logical stack will be traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIGS. 10A and 10B, there is a configuration administrator 330, which is a system function that supplies configuration and control information to the various entities within the protocol stack. The configuration/control information can include user defined settings, as well as information generated from within the system such as GPS time and position. The service interfaces 331 represent the interfaces for all services from service providers (not including the station itself). The service interface may be different for each of the various types of services. For example, for MPS audio and SPS audio, the service interface may be an audio card. For MPS data and SPS data the interfaces may be in the form of different APIs. For all other data services the interface is in the form of a single API. An audio encoder 332 encodes both MPS audio and SPS audio to produce core (Stream 0) and optional enhancement (Stream 1) streams of MPS and SPS audio encoded packets, which are passed to audio transport 333. Audio encoder 332 also relays unused capacity status to other parts of the system, thus allowing the inclusion of opportunistic data. MPS and SPS data is processed by PSD transport 334 to produce MPS and SPS data PDUs, which are passed to audio transport 333. Audio transport 333 receives encoded audio packets and PSD PDUs and outputs MPS and SPS PDUs containing both compressed audio and program service data. The SIS transport 335 receives SIS data from the configuration administrator and generates SIS PDUs. A SIS PDU can contain station identification and location information, indications regarding provided audio and data services, as well as absolute time and position correlated to GPS, as well as other information conveyed by the station. The AAS data transport 336 receives AAS data from the service interface, as well as opportunistic bandwidth data from the audio transport, and generates AAS data PDUs, which can be based on quality of service parameters. The audio transport and data transport functions are collectively referred to as Layer 4 of the protocol stack and the corresponding transport PDUs are referred to as Layer 4 PDUs or L4 PDUs. Layer 2, which is the channel multiplex layer, (337) receives transport PDUs from the SIS transport, AAS data transport, and audio transport, and formats them into Layer 2 PDUs. A Layer 2 PDU includes protocol control information and a payload, which can be audio, data, or a combination of audio and data. Layer 2 PDUs are routed through the correct logical channels to Layer 1 (338), wherein a logical channel is a signal path that conducts L1 PDUs through Layer 1 with a specified grade of service, and possibly mapped into a predefined collection of subcarriers.

Layer 2 and Layer 1 data in an IBOC system can be considered to be temporally divided into frames (e.g., modem frames). In typical embodiments, each modem frame has a frame duration ($T_f$) of approximately 1.486 seconds. Each modem frame is noted by and includes (in SIS) an absolute Layer 1 frame number (ALFN), which is a sequential number assigned to every Layer 1 frame that consequently applies to Layer 2. This ALFN corresponds to the broadcast starting time of a modem frame. The start time of ALFN 0 was 00:00:00 Universal Coordinated Time (UTC) on Jan. 6, 1980 and each subsequent ALFN is incremented by one from the previous ALFN. Thus the present time can be calculated by multiplying the next frame's ALFN with $T_f$ and adding the over-the-air to the start time of ALFN 0.

There are multiple Layer 1 logical channels based on service mode, wherein a service mode is a specific configuration of operating parameters specifying throughput, performance level, and selected logical channels. The number of active Layer 1 logical channels and the characteristics defining them vary for each service mode. Status information is also passed between Layer 2 and Layer 1. Layer 1 converts the PDUs from Layer 2 and system control information into an AM or FM IBOC digital radio broadcasting waveform for transmission. Layer 1 processing can include scrambling, channel encoding, interleaving, OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

As described above, Layer 2 PDUs are routed through the correct logical channels to Layer 1 (338). Layer 2 PDUs are also routed to IP File Encapsulation 350. Specifically, FIG. 10B shows Layer 2 PDUs P1-P4 and S1-S5 being routed to IP File Encapsulation 350 in this example. These Layer 2 PDUs are discrete data structures, and in the IP File Encapsulation 350, each of the discrete data structures is encapsulated into a file. A file may include a single Layer 2 PDU data structure pertaining to a single logical channel, or the file may include multiple of the Layer 2 PDU data structures pertaining to multiple logical channels. The encapsulation of each discrete data structure into a file allows the data structure to be transferred via various Internet protocols (e.g., HTTP, HTTPS, FTP, WebDav, etc.). Thus, L2IP files output from the IP File Encapsulation 350 each have a format that allows for matching to Internet protocol delivery requirements.

Figure 11:
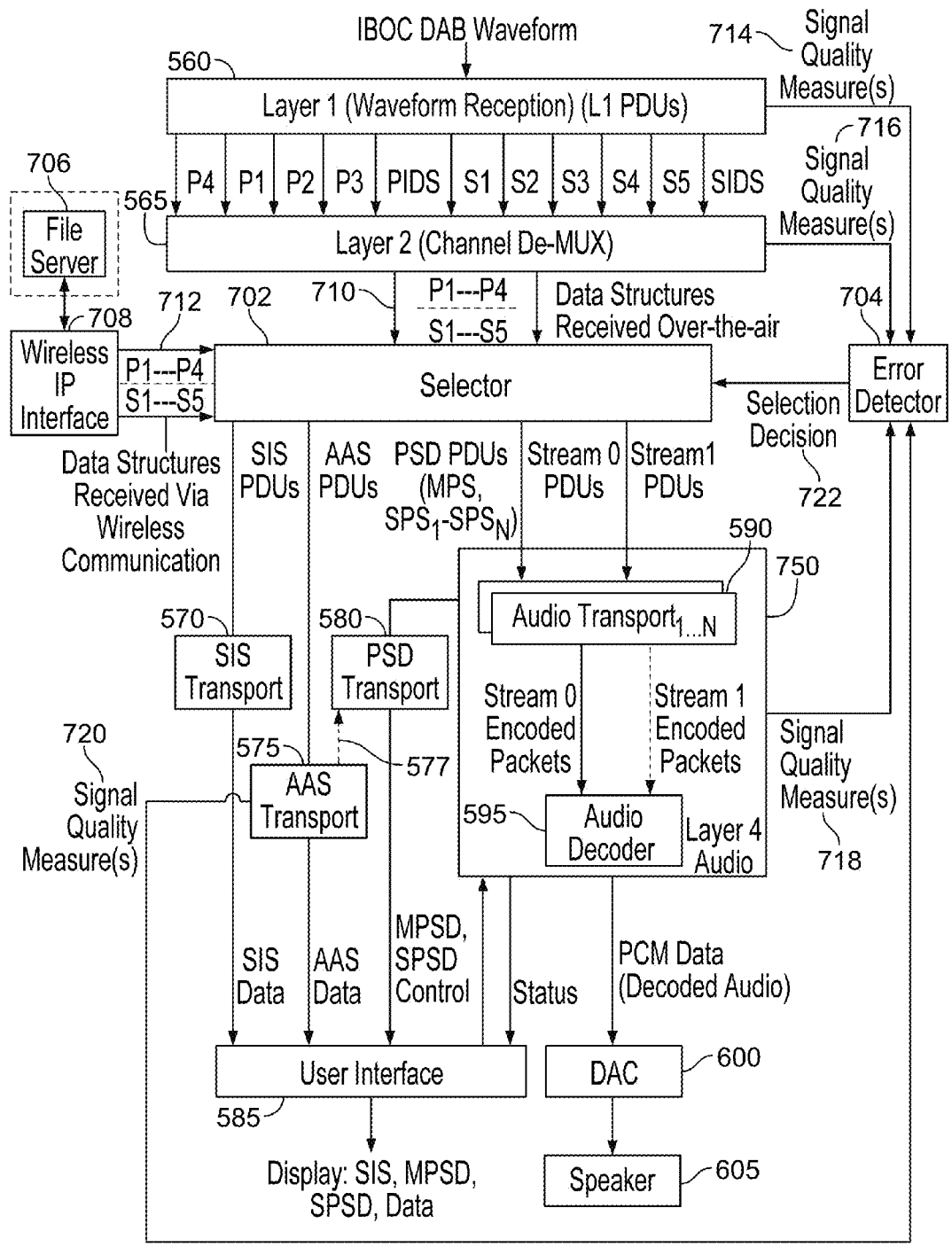
FIG. 11 shows a logical protocol stack from the receiver perspective.

FIG. 11 shows a diagrams of an exemplary IBOC digital radio broadcasting logical protocol stack from the receiver perspective. An IBOC waveform is received by the physical layer, Layer 1 (560), which demodulates the signal and processes it to separate the signal into logical channels. The number and kind of logical channels will depend on the service mode, and may include logical channels P1-P4, Primary IBOC Data Service Logical Channel (PIDS), S1-S5, and SIDS. Layer 1 produces L1 PDUs corresponding to the logical channels and sends the PDUs to Layer 2 (565). Layer 2 (565) sends Layer 2 PDUs P1-P4 and S1-S5 (710) to a selector 702. The Layer 2 PDUs 710 sent from Layer 2 (565) to the selector 702 are discrete data units received over-the-air via the broadcasted IBOC waveform.

The selector 702 also receives discrete data units P1-P4 and S1-S5 (712) from a wireless IP interface 708. The data units 712 received via the wireless IP interface 708 originate from a digital radio broadcast transmitter system. Specifically, in providing the data units 712 to the selector 702, the data units 712 are uploaded from the transmitter system to a file server 706. Aspects of this uploading are described below with reference to FIG. 12. Based on a notification transmitted through the wireless IP interface 708 to the file server 706, the discrete data units P1-P4 and S1-S5 (712) are downloaded from the file server 706 to the wireless IP interface 708. In this regard, the notification may effectively serve as a download request from the digital radio broadcast receiver (or from a connected communication device) that enables the discrete data units P1-P4 and S1-S5 (712) to be downloaded from the file server 706 to the wireless IP interface 708. In the present disclosure, the communication from the digital radio broadcast receiver (or from a connected communication device) may be referred to as a "download request" for convenience, but it should be understood that wherever the disclosure refers to a download request, that communication may be considered to be a notification that need not be formatted as a request for information or data. Rather, the notification may take a variety of forms and/or formats that are effective, e.g., to cause a processing of data applicable to context at hand. Thus, in the example of FIG. 11, the notification need not be formatted as a request for the discrete data units P1-P4 and S1-S5 (712) from the file server 706, and rather, the notification may be a communication that, when received and processed, causes the processing of the discrete data units P1-P4 and S1-S5 (712) (e.g., processing that enables these data units to be downloaded from the file server 706 to the wireless IP interface 708). It should be understood that the file server 706 is not part of the receiver system (as indicated by the dashed box surrounding the file server 706). The downloading of the data units 712 from the file server 706 to the wireless IP interface 708 may occur via a wireless Internet transmission that is different from the digital radio broadcast transmission used in transmitting the IBOC waveform to the receiver system. Aspects of the downloading of the data units 712 from the file server 706 to the receiver system are described below with reference to FIG. 13. After the downloading of the discrete data units P1-P4 and S1-S5 (712) to the wireless IP interface, the data units 712 may be provided to the selector 702.

The selector 702 is used to select between the data units 710 received over-the-air and the data units 712 received via the wireless IP interface 708. To perform this selection, the selector 702 receives three inputs: the data units 710 received over-the-air, the data units 712 received via the wireless IP interface 708, and selection decisions 722 from an error detector 704. Each of the over-the-air data units 710 is processed individually by the selector 702. If a selection decision 722 from the error detector 704 indicates that the over-the-air data unit does not contain an error, then the selector 702 selects the over-the-air data unit for further processing. In this case, a corresponding data unit from the wireless IP interface 708 is not used and may be deleted from the receiver system. If the selection decision 722 from the error detector 704 indicates that the over-the-air data unit contains an error, then the selector 702 selects the corresponding data unit from the wireless IP interface 708 for further processing. The over-the-air data unit containing the error is not used and may be deleted from the receiver system.

The selector 702 is driven by the selection decisions 722 provided by the error detector 704, with the selection decisions 722 being indicative of whether the over-the-air data units 710 contain errors. The error detector 704 may generate the selection decisions 722 based on signal quality measures 714, 716, 718, 720. As illustrated in FIG. 11, the error detector 704 is provided with the signal quality measures 714 from Layer 1 (560), the signal quality measures 716 from Layer 2 (565), the signal quality measures 718 from Layer 4 Audio 750, and the signal quality measures 720 from AAS Transport 575. To allow use of the signal quality measures 718, 720 in the error detector 704, a delay may be applied in the signal processing chain to allow use of these signal quality measures 718, 720 in generating the selection decision 722. Alternatively, no delay may be used, and instead, the signal quality measures 718, 720 for a given data unit may be applied in generating a selection decision for a future data unit. The signal quality measures 714, 716, 718 and 720 also allow the error detector 704 to predict errors (e.g., calculate a probability of errors in future data units). When the error detector 704 calculates that no errors are predicted for certain future over-the-air data units 710, then the receiver system may stop requests for downloading the data units 712 received via the wireless IP interface 708 from the file server 706, and the selection decision 722 allows the selector 702 to select the over-the-air data units 710. Similarly, when the error detector 704 predicts errors in future over-the-air data units 710, the system may start requesting or continue requesting for downloading the data units 712 received via the wireless IP interface 708 from the file server 706, and the selection decision 722 allows the selector 702 to select the data units 712 received via the wireless IP interface.

The signal quality measure 714 may be based on a digital signal quality metric (DSQM) determined in the Layer 1 (560). Exemplary digital signal quality metrics are described in U.S. Pat. Nos. 7,933,368 and 8,817,917, for example, which are incorporated herein by reference in their entireties. If the DSQM associated with a data unit received over-the-air is determined to be below a certain threshold level, then the signal quality measure 714 may indicate a Layer 1 error to the error detector 704. Based on the Layer 1 error, the error detector 704 may generate the selection decision 722 that results in the discarding of the over-the-air data unit and the selection of a corresponding data unit received from the file server 706.

The signal quality measure 716 may be based on Layer 2 Protocol Control Information (PCI). Layer 2 PCI is included as part of a Layer 2 PDU for every Layer 1 logical channel and is described in NRSC-5 Reference Document 1014s Rev. I (Layer 2 Channel Multiplex), dated Aug. 23, 2011, which is incorporated herein by reference in its entirety. As described below with reference to FIG. 20A, Layer 2 header bits are spread over a Layer 2 PDU based on spread parameters. Using the spread parameters for a given logical channel in a given Layer 1 service mode, the Layer 2 header bits may be collected and put into a continuous 24 (or 22) bit unit, denoted $S_{rcv}$. Correlation processes comparing the received sequence $S_{rcv}$ associated with an over-the-air data unit to expected sequences $CW_0$-$CW_7$ may be performed. The expected sequences $CW_0$-$CW_7$ are described in the NRSC-5 Reference Document 1014s Rev. I document. The correlation may be performed on the actual number of header bits, denoted $N_{hb}$, and may be defined as:

$$M_i = \text{Corr}[S_{rcv}, CW_i] = \sum_{n=0}^{Nhb} \overline{(S_{rcv}(n) \oplus CW_i(n))},$$

Based on the correlation processes, a sequence i is selected that provides a maximum $M_i$. The maximum $M_i$ value is compared to a threshold value $M_{thr}$. If the maximum $M_i$ value for the over-the-air data unit is at or above the threshold value $M_{thr}$, then the signal quality measure 716 may indicate to the error detector 704 that there is no Layer 2 error. Conversely, if the maximum $M_i$ for the over-the-air data unit is below the threshold value $M_{thr}$, then the signal quality measure 716 may indicate to the error detector 704 that there is a Layer 2 error, thus informing the error detector 704 that the over-the-air data unit contains an error. Based on the Layer 2 error, the error detector 704 may generate the selection decision 722 that results in the discarding of the over-the-air data structure and the selection of the corresponding data unit received from the file server 706.

The signal quality measures 718, 720 may be based on a Reed-Solomon (RS) codeword and cyclic redundancy check (CRC) bytes included in a Layer 4 PDU. The RS codeword and the CRC bytes for audio transport are described in NRSC-5 Reference Document 1017s Rev. G (HD Radio Air Interface Design Description Audio Transport), dated Aug. 23, 2011, and for AAS transport in NRSC-5 Reference Document 1019s Rev. G (HD Radio Air Interface Advanced Application Services Transport), dated Aug. 23, 2011, which are incorporated herein by reference in their entirety. The signal quality measures 718, 720 may be calculated as follows: for each PDU (i.e., each Layer 4 frame) for the currently decoded program, RS error correction is performed, and then the CRC byte is calculated for each packet. If any of these calculations results in an error, then the quality is below the usefulness level, and a Layer 4 error is flagged. The signal quality measures 718, 720 may indicate the Layer 4 error to the error detector 704. Based on the Layer 4 error, the error detector 704 may generate the selection decision 722 that results in the discarding of the over-the-air data unit associated with the Layer 4 frame having the error and the selection of the corresponding data unit received from the file server 706. In an example, the selector 702 is implemented via hardware and/or software in a baseband processor of the receiver system. In one embodiment, the selector 702 is implemented in software written in C code that is executed in the baseband processor.

The selector 702 may demultiplex the selected data structures P1-P4 and S1-S5 to produce SIS PDUs, AAS PDUs, and Stream 0 (core) audio PDUs and Stream 1 (optional enhanced) audio PDUs, as illustrated in FIG. 11. The SIS PDUs are then processed by the SIS transport 570 to produce SIS data, the AAS PDUs are processed by the AAS transport 575 to produce AAS data, and the PSD PDUs are processed by the PSD transport 580 to produce MPS data (MPSD) and any SPS data (SPSD). Encapsulated PSD data may also be included in AAS PDUs, thus processed by the AAS transport processor 575 and delivered on line 577 to PSD transport processor 580 for further processing and producing MPSD or SPSD. The SIS data, AAS data, MPSD and SPSD are then sent to a user interface 585. The SIS data, if requested by a user, can then be displayed. Likewise, MPSD, SPSD, and any text based or graphical AAS data can be displayed. The Stream 0 and Stream 1 PDUs are processed by Layer 4 Audio 750, comprised of audio transport 590 and audio decoder 595. There may be up to N audio transports corresponding to the number of programs received on the IBOC waveform. Each audio transport produces encoded MPS packets or SPS packets, corresponding to each of the received programs. Layer 4 receives control information from the user interface, including commands such as to store or play programs, and information related to seek or scan for radio stations broadcasting an all-digital or hybrid IBOC signal. Layer 4 750 also provides status information to the user interface.

Figure 12:
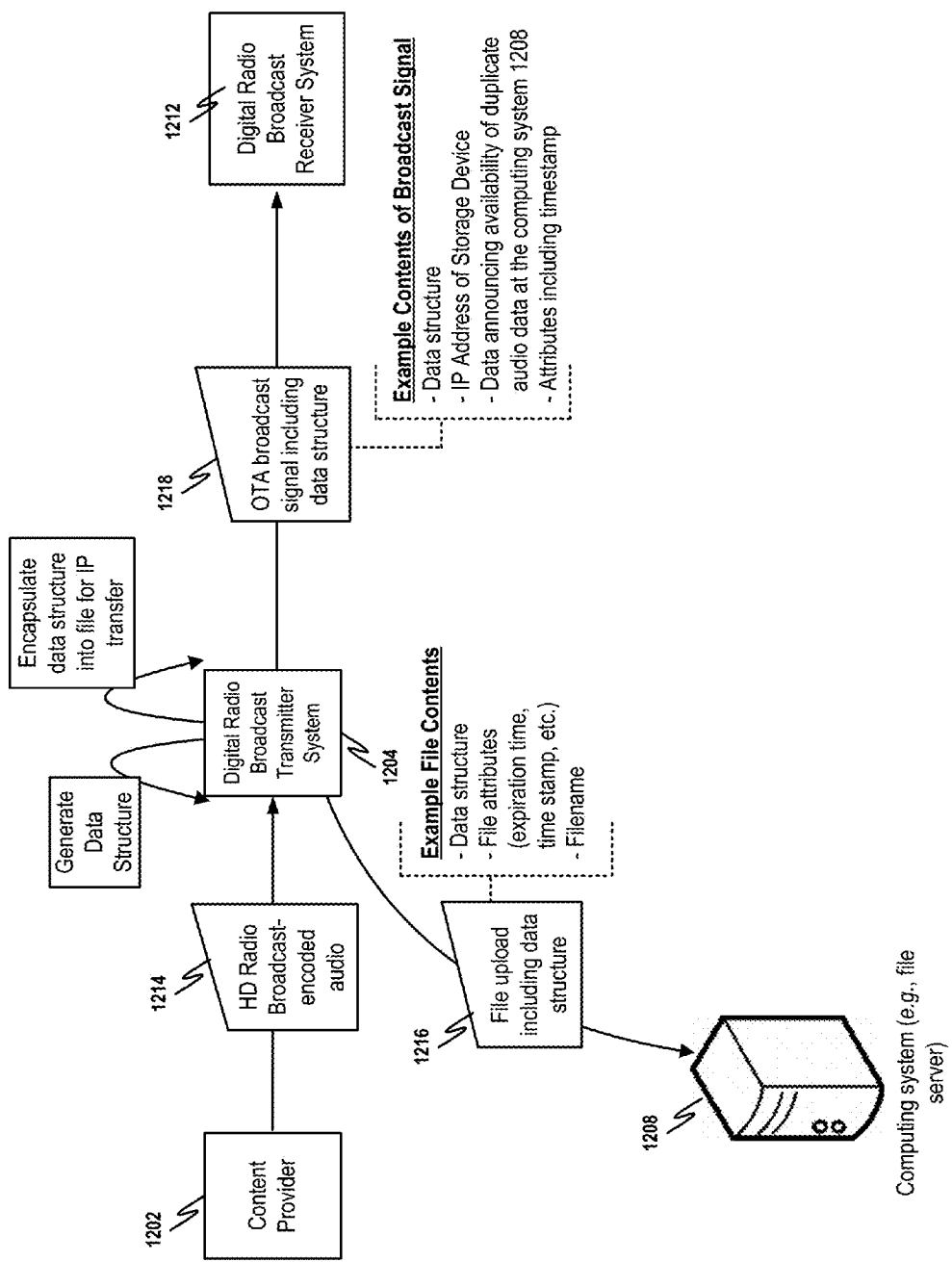
FIG. 12 is a block diagram depicting transmitter-side features of the systems and methods described herein.
Figure 13:
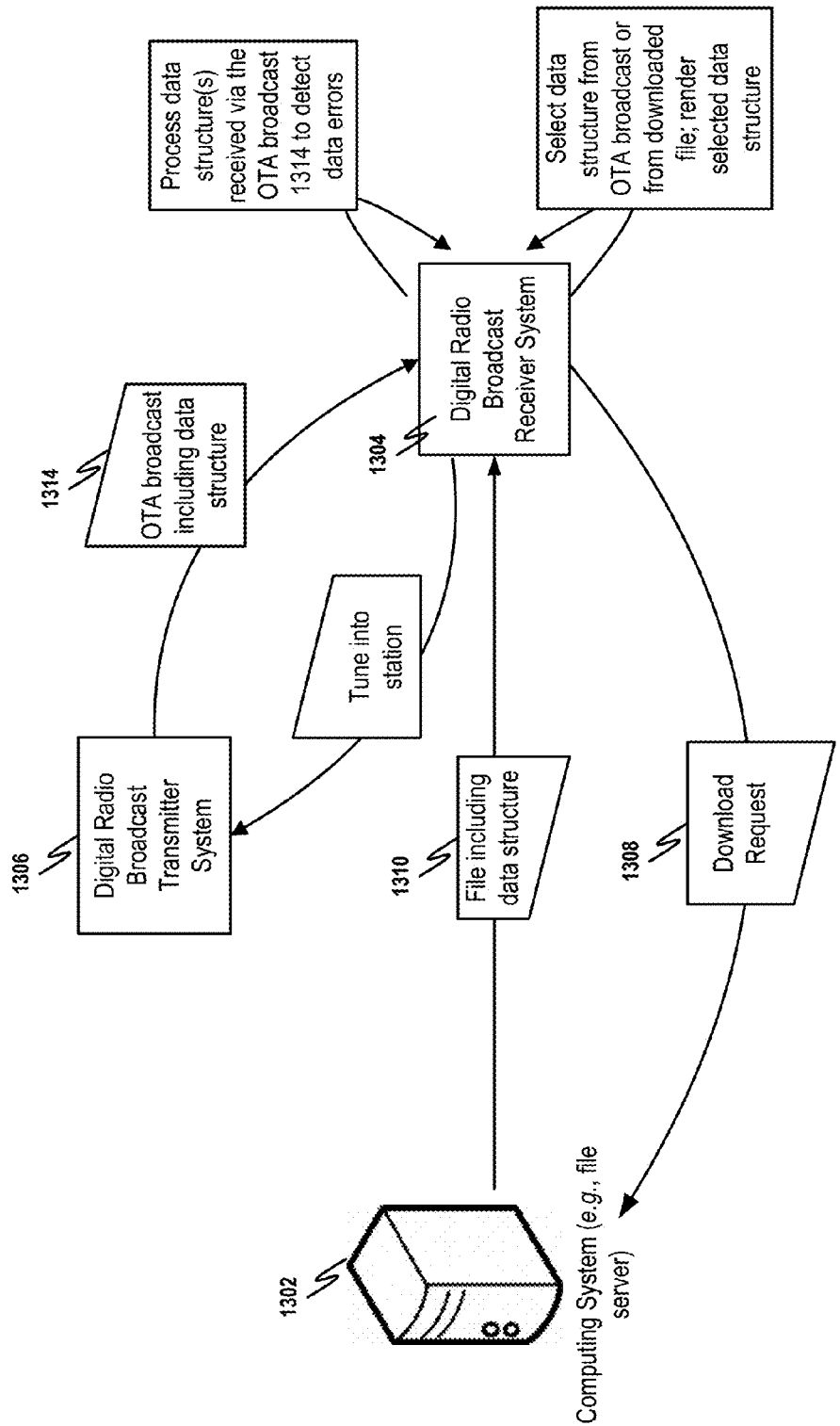
FIG. 13 is a block diagram depicting receiver-side features of the systems and methods described herein.

FIGS. 12 and 13 are block diagrams depicting features of the exemplary systems and methods described herein. FIG. 12 primarily illustrates functions performed at a transmitter side, and FIG. 13 primarily illustrates functions performed at a receiver side. In FIG. 12, a transmitter system 1204 receives HD Radio broadcast-encoded audio 1214 from a content provider 1202. The HD Radio broadcast-encoded audio 1214 may be referred to herein as "encoded audio." The encoded audio 1214 comprises audio data that is configured to be broadcast via a digital radio broadcast transmission and subsequently rendered at a broadcast receiver system. Although the example of FIG. 12 describes the processing of audio data from the content provider 1202, it should be understood that the systems and methods described herein may be applied to other types of content. Thus, in general, the content provider 1202 may transmit encoded content to the studio site 1204, where the encoded content may include data for rendering any one of video, text, still images, multimedia, audio, etc., or a combination thereof at a broadcast receiver. The cross-platform reception techniques described herein can be applied to any of these types of content to provide a gapless, uninterrupted rendering of content.

The transmitter system 1204 generates data units, e.g., PDUs, based on the encoded audio 1214. The contents of the data units include audio data configured to be rendered by a digital radio broadcast receiver. As described below, these data units are broadcast over-the-air via a digital radio broadcast transmission and also uploaded to a file server to facilitate downloading of the data units by a receiver system via a secondary platform. In an embodiment, a data unit is a Layer 2 Protocol Data Unit (PDU) described in greater detail below with reference to FIGS. 20A and 20B and also referred to herein as "data structure". A data structure generated based on the encoded audio 1214 is encapsulated into a file 1216. The encapsulation of the data structure into the file 1216 may be performed to facilitate the transferring of the resulting encoded data via an Internet protocol. Thus, the file 1216 may have a format that allows encoded data corresponding to the data structure to be transferred (e.g., uploaded, downloaded, etc.) via the Internet protocol. The file 1216 may encapsulate a single data structure or more than one data structure.

As illustrated in FIG. 12, the file 1216 encapsulating the data structure is transmitted to a computing system 1208. The computing system 1208 may be a file server or another device including a non-transitory computer-readable storage medium for storing the file 1216. The computing system 1208 is associated with an Internet Protocol (IP) address and may be operated by a broadcaster (e.g., the broadcaster that operates the content provider 1202 and/or transmitter system 1204) and/or a third party not associated with the broadcaster (e.g., an entity that offers Internet file-hosting). The computing system 1208 may host content for multiple broadcasters, or the computing system 1208 may host content for only a single corporation or a single broadcast radio station.

In an example, the storing of the file 1216 on the computing system 1208 comprises an uploading process whereby the file 1216 is uploaded from the transmitter system 1204 to the computing system 1208 over the Internet. The uploading of the file 1216 may utilize an Internet protocol such as Hypertext Transfer Protocol (HTTP), Hypertext Transfer Protocol Secure (HTTPS), File Transfer Protocol (FTP), File Transfer Protocol Secure (FTPS), or Web Distributed Authoring and Versioning (WebDAV), among others. In an example, an exporter of the transmitter system 1204 employs FTP/FTPS for file-by-file upload to the computing system 1208, and a channel multiplexer handler (Layer 2) employs FTP/FTPS for multiple file upload.

Figure 20A:
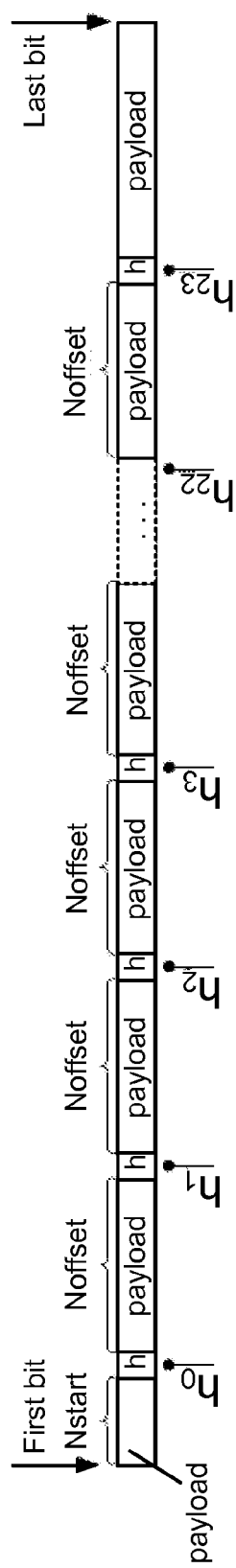
FIG. 20A illustrates an exemplary Layer 2 PDU including a header sequence and a payload.
Figure 20B:
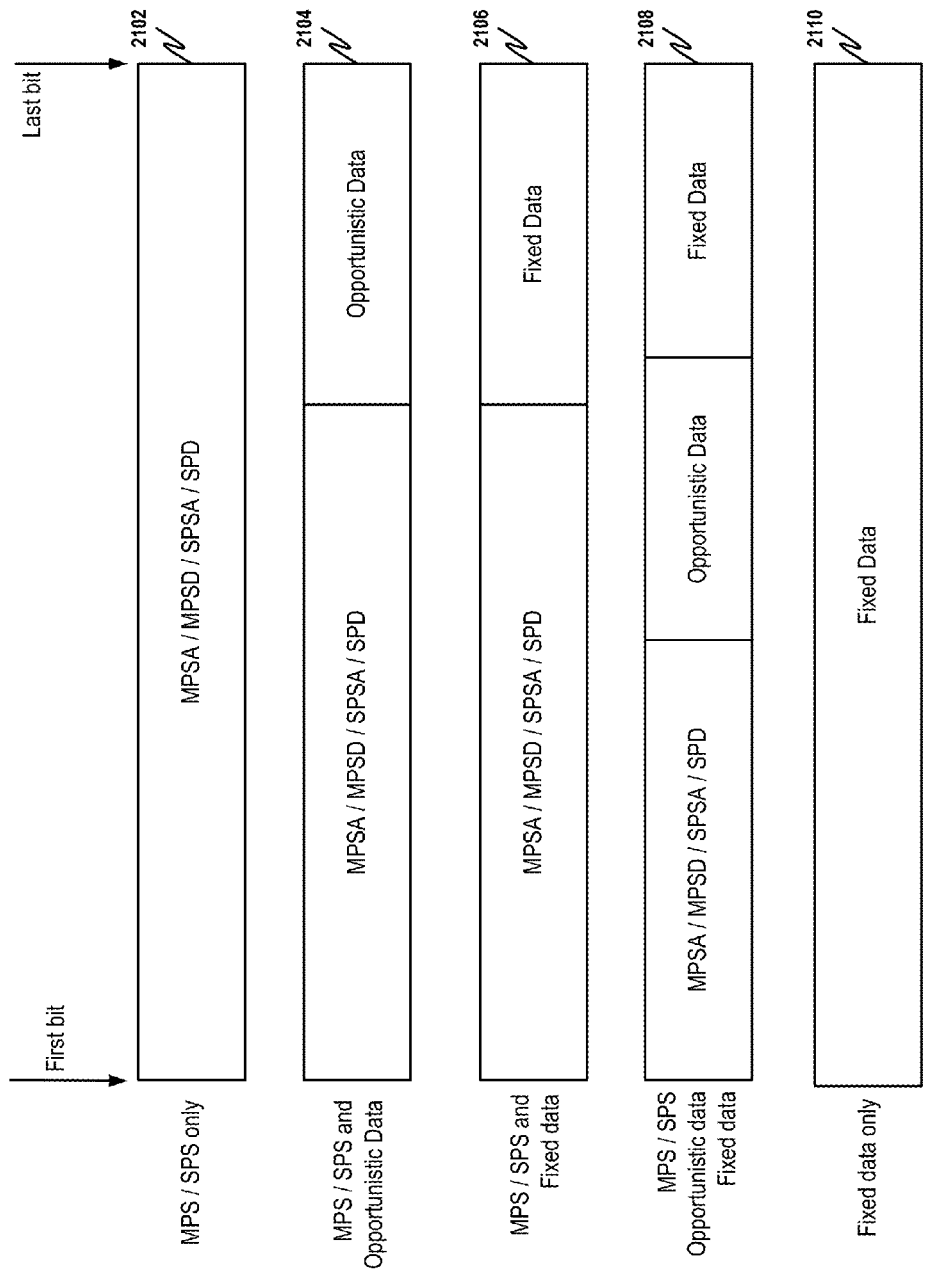
FIG. 20B shows example Layer 2 PDUs having different combinations of multiplexed content.

Both single service and "all services" files, as shown in FIG. 20B, may be uploaded from the transmitter system 1204 to the computing system 1208 for supporting various receiver scenarios. A single service file may include audio data for a single audio program or AAS data for a single data service, and an "all services" file may include data for all services (e.g., both audio and data services) generated by a station. A receiver system may be able to choose between receiving single service and "all services" files, for example, based on a download speed achievable at the receiver system, etc. (e.g., if download speeds are slow, a receiver system may choose to only download the single service files, rather than the larger "all services" files). In an example, each file includes two modem frames of content, which may be used to produce a "gap filler" for approximately three seconds of audio output. A single service file may have a size of approximately 12 kBytes for rendering HD2 audio at 32 kbps. An "all services" file may have a size of approximately 40 kBytes for rendering audio in system mode MP3. In general, the files uploaded to the computing system 1208 are limited in size to allow for fast handling of the files and minimum delay in uploading and downloading. A file structure for "all services" files may be nearly identical to a Layer 2 Protocol Data Unit (PDU), as described in further detail below. This may allow the Layer 2 PDU that is broadcast over-the-air to be reused in the file, with the file including only a minimal amount of added information (e.g., call-sign, timestamp, expiration time, etc.). A file structure for a single service file may be nearly identical to a Layer 4 PDU. This may allow the Layer 4 PDU that is broadcast over-the-air to be reused in the file, with the file including only a minimal amount of added information (e.g., call-sign, program or content ID, PDU count, expiration time, etc.).

The file 1216 uploaded to the computing system 1208 encapsulating the aforementioned data structure and also includes various naming attributes, a content ID, a call-sign for the station, an expiration time, and a time stamp. The content ID may be an identifier for the content included in the file 1216 (e.g., the content ID may indicate a name of an audio program, a date, etc.). The expiration time may indicate a time after which the file 1216 can be purged (e.g., deleted) from the computing system 1208. The time stamp may indicate a time at which a digital radio broadcast signal including the data structure is transmitted from the transmitter system 1204. Files are queued in the computing system 1208 based on the content ID, the time stamp and the expiration time. A receiver system 1212 may request the file based on attributes of the file: (1) file name or indexed name (any matching file) or multiple names; (2) content ID, where all matching files are sorted by future expiration time; or (3) call-sign, where all matching files are sorted by future expiration time.

The data structure that is encapsulated into the file 1216 and uploaded to the computing system 1208 is also broadcast over-the-air by the transmitter system 1204. Thus, the transmitter system 1204 broadcasts a digital radio broadcast signal 1218 including encoded data corresponding to the data structure for receipt at the receiver system 1212. In an embodiment, after the encapsulation of the data structure into the file 1216, the file 1216 is uploaded to the computing system 1208 contemporaneously with the broadcasting of the signal 1218 including the encoded data for the data structure. As illustrated in FIG. 12, the broadcast signal 1218 may include the encoded data for the data structure, the IP address or uniform resource locator (URL) of the computing system 1208, data announcing the availability of duplicate audio data at the computing system 1208 (e.g., an announcement of the availability of a service enabling the gap-filling described herein), and various attributes of the signal 1218 (e.g., a timestamp indicating a time at which the signal 1218 was broadcast). The receiver system 1212 may use the IP address or URL in transmitting a download request to the computing system 1208. The data announcing the availability of the gap-filling service may be included in SIS data of the broadcast signal 1218. The SIS data may indicate, among other things, whether "all services" files or single service files are available at the computing system 1208.

Service Information Guide (SIG) data of the broadcast signal 1218 provides detailed information on the gap-filling service. For example, when "all services" files are available from the computing system 1208, file names index for these files may be indicated in the SIG data. When single service files are available from the computing system 1208, file names index for specific audio programs may be indicated in the SIG data and/or PSD data received by the receiver. The SIG data may also include information on a file naming convention used for the files stored at the computing system 1208. In the systems and methods described herein, files stored at the computing system 1208 may utilize a default naming convention that is known to receivers. In requesting files from the computing system 1208, receivers may utilize the default naming convention. When files at the computing system 1208 have names that differ from the default naming convention, information on the different naming convention may be provided to the receiver via the SIG data.

The SIG data may also include the IP address or URL for the computing system 1208. A URL for a file or files associated with a specific audio program may be indicated in the audio program's PSD, with the URL being used by the receiver to download the file or files that are located on the computing system 1208. Receivers may also construct a table that associates URLs with station call-signs and use this table for downloading files associated with different stations from the computing system 1208. The URLs included in the table may be "placeholder" URLs that are not the actual URLs for the stations. Thus, a central registry (proxy) server may store pointers that associate the placeholder URLs with the actual URLs. A receiver that is missing URL data for a station may use the call-sign of the station to query the registry for the file server URL for the station.

FIG. 13 illustrates receiver-side functions that may be used in conjunction with the transmitter-side functions of FIG. 12 to facilitate an uninterrupted rendering of content at the receiver. In FIG. 13, a digital radio broadcast receiver system 1304 tunes into a station, where the station is associated with a digital radio broadcast transmitter system 1306. The transmitter system 1306 may be similar to the transmitter system 1204 of FIG. 12 and may perform functions similar to those performed by the transmitter system 1204. Based on the tuning into the station, the receiver system 1304 may begin to receive a broadcast signal 1314 from the transmitter system 1306. The broadcast signal 1314 may include encoded data for a plurality of enumerated data structures, with the encoded data for each of the data structures including audio data. The generation and broadcasting of the encoded data for these data structures is described above with reference to FIG. 12. The broadcast signal 1314 may also include a station identifier (e.g., within the Station Information Service (SIS) data) that is associated with the station.

Based on the station identifier, the receiver system 1304 may generate a download request 1308 that is transmitted to a computing system 1302. The download request 1308 may request from the computing system 1302 one or more files that are associated with the station to which the receiver system 1304 is tuned. Specifically, the download request 1308 may request duplicate audio data that is the same as audio data that is broadcasted from the transmitter system 1306. Based on the download request 1308, files may be downloaded wirelessly from the computing system 1302 to the receiver system 1304 using an Internet protocol, such as HyperText Transfer Protocol (HTTP), HyperText Transfer Protocol Secure (HTTPS), File Transfer Protocol (FTP) or File Transfer Protocol Secure (FTPS). In an embodiment, the receiver system 1304 may include a mobile phone, and the mobile phone may execute a mobile software application program (e.g., a mobile app). The transmitting of the download request and the receiving of the files may be performed based on user input received via the mobile software application program. The files downloaded based on the download request 1308 include individually encapsulated over-the-air broadcasting data structures (e.g., segmented content, with each file being a finite object). Each such individual file (e.g., a finite object) can be individually used by the receiver for gap-filling independently of the presence or absence of other files with encapsulated preceding or following data structure from the broadcasting system 1306, and therefore do not require download continuity and do not comprise a portion of a streaming content transfer.

The conditions under which the download request 1308 is transmitted may vary in different examples. In an example, the download request 1308 is sent shortly after tuning into the station or contemporaneously with the tuning into the station. In this example, the download request is sent without consideration as to whether the encoded data for the data structures of the broadcast signal 1314 include errors. Thus, for every data structure whose encoded data is received over-the-air from the transmitter system 1306, a corresponding file encapsulating a data structure including duplicate audio data is requested by the receiver system 1304 from the computing system 1302. The corresponding data received via the different communication platforms may arrive at the receiver system 1304 at nearly the same times. Each data unit of encoded data received over-the-air from the transmitter system 1306 is processed individually to determine if the data contains a data error. If the data contains the data error, corresponding data downloaded from the computing system 1302 is selected and rendered at the receiver system 1304. If the data received over-the-air from the transmitter system 1306 does not contain a data error, this data is selected and rendered. In this example, in rendering an audio program, audio data for the entire audio program may be received from both the transmitter system 1306 and the computing system 1302.

By contrast, in another example, the download request 1308 is transmitted only after a data error is detected in a data unit of the over-the-air broadcast 1314, and the download request 1308 requests only duplicate audio data for the portion of the broadcast signal 1314 containing the data error. To illustrate aspects of this example, reference is made to FIG. 13. In FIG. 13, the receiver system 1304 receives the broadcast signal 1314 that includes encoded data corresponding to a data structure. The data includes audio data for rendering a portion of an audio program at the receiver system 1304. The broadcast signal 1314 may also include program data identifying the audio program. The data of the broadcast signal 1314 is processed at the receiver system 1304 to determine whether the audio data included in a data unit contains a data error. If the data unit does not contain a data error, the data unit from the broadcast signal 1314 is selected and subsequently rendered at the receiver system 1304. If the data unit contains a data error, the download request 1308 is transmitted to the computing system 1302. The download request 1308 requests a file 1310 that includes a data unit corresponding to the over-the-air data determined to contain the data error. The file 1310 does not comprise a portion of a streaming or continuous content transfer between the computing system 1302 and the receiver system 1304. As illustrated in FIG. 13, the requested file 1310 including the data unit is received at the receiver system 1304 based on the download request 1308. The data unit of the file 1310 is selected instead of selecting the corresponding data unit from the broadcast signal 1314, and the selected data unit is subsequently rendered at the receiver system 1304. In this example, files are downloaded from the computing system 1302 only as needed to be used instead of data unit from the broadcast signal 1314 determined to contain errors. Thus, in rendering an audio program, audio data for the entire audio program is not downloaded from the computing system 1302 in this example.

In another example, the download request 1308 is transmitted only after a data error is predicted for future data unit of the over-the-air broadcast 1314, and the download request 1308 requests only duplicate audio data for the future portion of the broadcast signal 1314 containing the data error.

Figure 14:
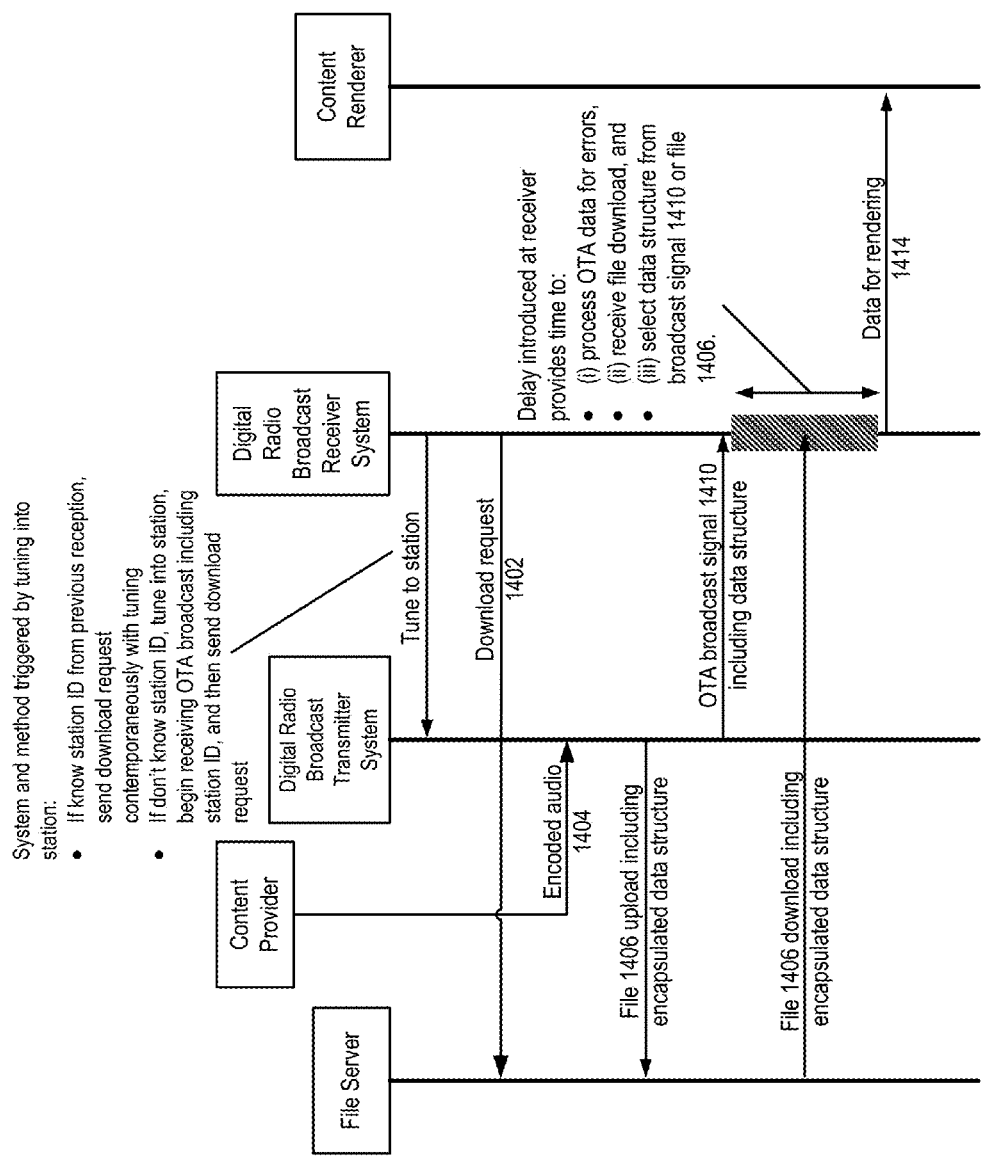
FIGS. 14-17 illustrate exemplary sequences of operations for providing an uninterrupted rendering of audio at a digital radio broadcast receiver system.

FIGS. 14-17 illustrate exemplary sequences of operations for providing an uninterrupted rendering of audio at a digital radio broadcast receiver system. Specifically, FIGS. 14-17 illustrate sequences of operations that may be employed in different embodiments of the systems and methods described herein. In FIG. 14, initially, a digital radio broadcast receiver system tunes into a radio station, where the radio station is associated with a digital radio broadcast transmitter system. In tuning into the station, if the receiver system knows the station identifier of the station from previous reception (e.g., the receiver system has SIS data for the station from previous reception), then the receiver system can transmit a download request 1402 to a file server contemporaneously with the tuning. The download request 1402 is based on the station identifier and requests one or more files associated with the station to which the receiver system is tuned. Conversely, if the receiver system does not already know the station identifier of the station at the time of the tuning, then the receiver system (i) tunes into the station, (ii) begins receiving a broadcast signal from the transmitter system based on the tuning, the broadcast signal including the station identifier, and (iii) then generates and transmits the download request 1402 that is based on the station identifier. In both of these examples, the download request 1402 is not transmitted prior to the tuning into the station. The tuning into the station may thus be a trigger for initiating the gap-filling approaches described herein.

In an example, the download request 1402 requests audio data that corresponds to a period of time in the future. For example, the download request 1402 may request files comprising audio data or other data for no more than the next sixty (60) seconds of a radio broadcast from the station. Although the illustration of FIG. 14 depicts a single file 1406 being downloaded by the receiver system following the transmitting of the download request 1402 to the file server, it should be understood that multiple files may be downloaded based on the single download request 1402. For example, if the download request 1402 requests audio data for the next maximum allowed sixty (60) seconds of the station's radio broadcast, and if each file includes audio data for rendering approximately 1.5 seconds of audio, then the single download request 1402 may result in forty (40) files being downloaded to the receiver system. The files are downloaded one-by-one when they become available. The download request 1402 may be renewed every thirty (30) seconds, for example, thus ensuring that the digital radio broadcast receiver system receives duplicate audio data or other data for all required (for gap-filling) audio data or other data that is broadcast over-the-air and received at the receiver system.

In an example, the download request 1402 is renewed by the receiver system every thirty (30) seconds for as long as the receiver system continues to receive an over-the-air signal from the transmitter. In this example, if the download request 1402 requests audio data for the next sixty (60) seconds of the radio broadcast, then the receiver system is capable of receiving duplicate audio data for filling at most a continuous sixty (60) second gap in the over-the-air signal. The system may thus implement a time-limited gap filler, where continuous gaps in the over-the-air signal longer than 60 seconds are not filled by duplicate audio data from the file server. The time-limited gap filler is not implemented using streaming data from the file server. Rather, the time-limited gap filler is implemented using the downloading of files (i.e., file-based segmented content, where each file is a finite object), as described herein, and the downloading of these files does not comprise a streaming content transfer. It should be understood that as referred to herein, a "gap" may comprise a portion of the over-the-air signal containing data errors or other signal quality problems. The gap may also comprise a period of time in which there are some blockages that sufficiently obscure the broadcast signal from the receiver for periods of time, thereby producing a gap in the reception of the broadcast signal.

The time-limited gap-filling, as described herein, occurs when the digital radio broadcast receiver is tuned to a digital radio broadcast transmitter and receives the over-the-air signal. When the receiver detects errors in data units from the over-the-air signal, it then may implement gap-filling using the downloaded files file-by-file (i.e., object-by-object). When the detection of errors in data units received over-the-air reaches a continuous period of 60 (sixty) seconds, the receiver terminates the over-the-air reception. Thus, the gap-filling is also terminated, and no additional download requests are sent and any remaining files arriving after the termination time are discarded. In this example, the time-limited gap-filling originates (i.e., being triggered by), continues and terminates based on the over-the-air reception of digital radio broadcast signal 1314, and does not depend on the availability of the duplicate data units on the file server 1302, and does not depend on the actual receiving of duplicate data units 1310 from the file server 1302. Thus the time-limited gap-filling does not implement and does not use streaming data from a file server.

In FIG. 14, the download request 1402 is transmitted from the receiver system to the file server without consideration as to whether the broadcast signal received from the transmitter system includes errors. Further, the download request 1402 may request files that do not yet exist at the file server. To illustrate this, FIG. 14 depicts encoded audio 1404 being communicated from a content provider (e.g., broadcast radio station, etc.) to the transmitter system after the download request 1402 is received at the file server. The encoded audio 1404 may be, for example, data from a live feed that is generated by the content provider at a time that is subsequent to the transmitting of the download request 1402 from the receiver system to the file server. Based on the encoded audio 1404, the transmitter system may generate data structures including audio data and other data configured to be rendered by the receiver system. The transmitter system encapsulates the data structure into the file 1406, with the file 1406 having a format that allows the file to be transferred via an Internet protocol. The file 1406 may encapsulate only a single data structure or may encapsulate multiple data structures.

The file 1406 encapsulating the data structure is uploaded from the transmitter system to the file server using the Internet protocol. As illustrated in FIG. 14, the transmitter system also broadcasts an over-the-air broadcast signal 1410 including encoded data for the same data structure for receipt at the receiver system. Although FIG. 14 depicts the uploading of the file 1406 to the file server as occurring before the broadcasting of the signal 1410, in other examples, this sequence may be reversed, or the uploading and the broadcasting may occur contemporaneously. In general, after the encapsulation of the data structure into the file 1406, the transmitter system may work in parallel on uploading the file 1406 and broadcasting the signal 1410. The exact sequence of the file uploading and the signal broadcasting may vary in different examples.

In the example of FIG. 14, audio data from the broadcast signal 1410 is not rendered immediately after its receipt at the receiver system. Rather, a predetermined delay is introduced at the receiver system, with the delay occurring between the receipt of the broadcast signal 1410 and the rendering of audio. As illustrated in FIG. 14, the file 1406 may be downloaded from the file server to the receiver system during the delay period, with the downloading of the file 1406 being based on the download request 1402. The delay period introduced at the receiver may prove useful in any situation in which receipt of the data structure via the file 1406 does not precede receipt of the same data structure via the broadcast signal 1410 at the receiver system. For example, in situations where (1) the upload speed for transferring the file 1406 from the transmitter system to the file server is slow or connectivity problems are experienced during the uploading, and/or (2) the download speed for transferring the file 1406 from the file server to the receiver system is slow or connectivity problems are experienced during the downloading, the data may be received via the broadcast signal 1410 before the corresponding data is received via the file 1406. In such situations, the delay introduced at the receiver system may allow implementation of the gap-filling feature by providing adequate time for (i) processing the data structure of the broadcast signal 1410 to determine whether the data structure contains a data error, (ii) receiving the file 1406 including the corresponding data structure, and (iii) selecting the data structure from the file 1406 or the broadcast signal 1410 based on the error determination.

At the conclusion of the delay period, data 1414 for rendering is communicated to a content render, where the data 1414 includes the data selected from the file 1406 or the broadcast signal 1410. Although the example of FIG. 14 illustrates the file 1406 being received at the receiver system following the receipt of the broadcast signal 1410, it should be understood that in other examples, receipt of the file 1406 may precede that of the broadcast signal 1410. In these other examples, the delay implemented at the receiver system may continue to be used despite the fact that it may not be necessary in achieving the gap-filling feature. In an example, the delay period may be approximately seven (7) seconds in duration.

Figure 15:
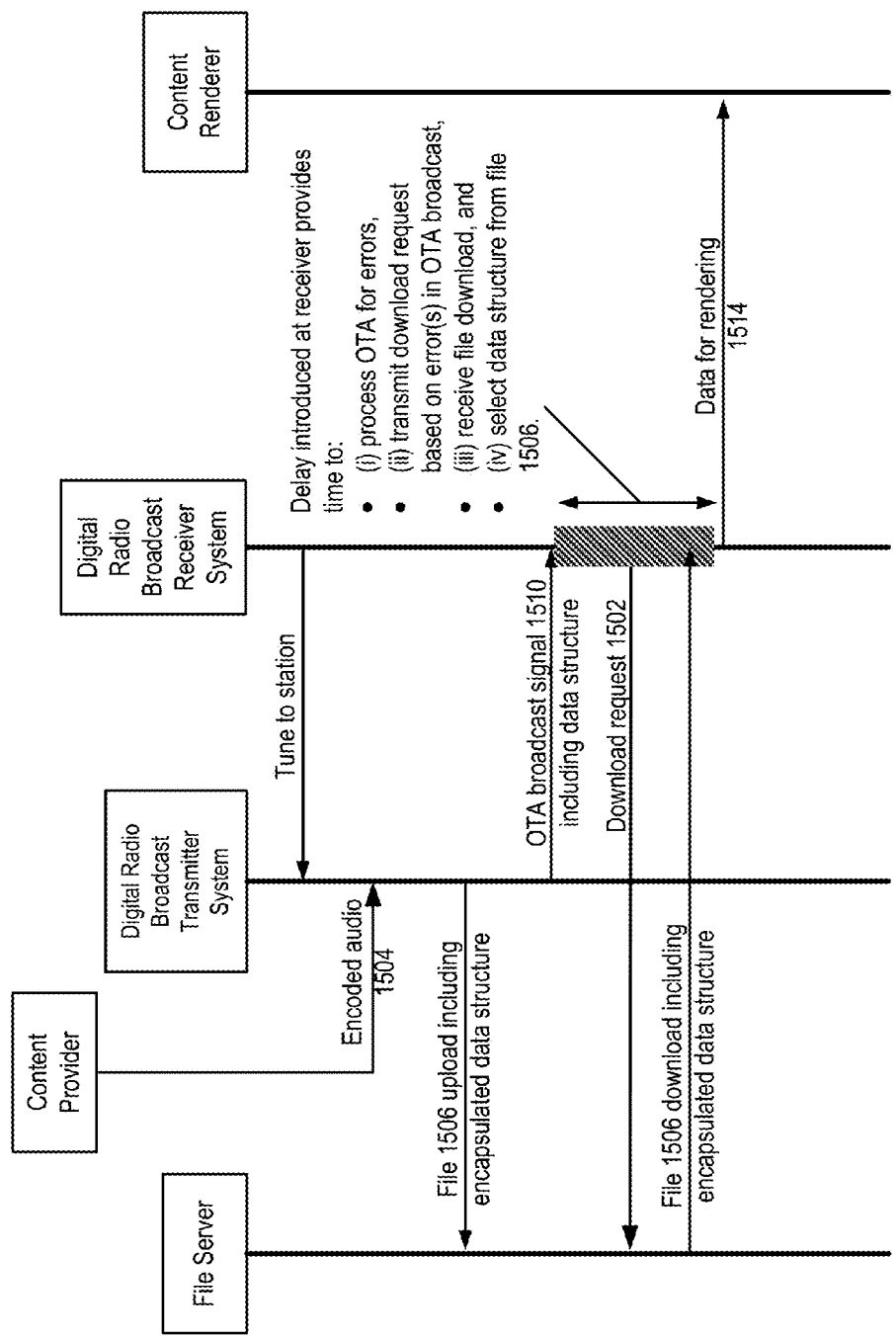

FIG. 15 illustrates another exemplary sequence of operations for providing an uninterrupted rendering of audio at a digital radio broadcast receiver system. The sequence of operations of FIG. 15 is similar to that of FIG. 14 because in both examples, a delay is introduced at the receiver, where the delay occurs between the receipt of the broadcast signal and the rendering of audio at the receiver. The sequence of operations of FIG. 15 varies from that of FIG. 14, however, because in FIG. 15, a download request 1502 is transmitted from the receiver system to the file server only after one or more errors are detected in the over-the-air broadcast signal.

As illustrated in FIG. 15, a receiver system tunes into a station that is associated with a transmitter system. Based on the tuning, the receiver system begins to receive a broadcast signal from the transmitter system. The transmitter system receives encoded audio 1504 from a content provider, generates a data structure based on the encoded audio 1504, and encapsulates the data structure into a file 1506. The file 1506 including the data structure is uploaded from the transmitter system to a file server, and the same data is included in a signal 1510 that is broadcast over-the-air by the transmitter system. As noted above with reference to FIG. 14, the exact sequence of the uploading and the broadcasting may vary in different examples, and the two processes may be conducted contemporaneously.

In the example of FIG. 15, the audio data of the broadcast signal 1510 is not rendered immediately after its receipt at the receiver system. Rather, a predetermined delay is introduced at the receiver system, where the delay occurs between the receipt of the broadcast signal 1510 and the rendering of audio at the receiver. The delay period may be, for example, 3-7 seconds in duration. The delay introduced at the receiver provides time to (i) process the encoded data corresponding to the data structure of the broadcast signal 1510 to determine if the data contains a data error; (ii) transmit a download request 1502 to the file server based on the detected data error, where the download request 1502 requests the file 1506 including the same data; (iii) download the file 1506 from the file server based on the download request; and (iv) select the data from the file 1506 instead of selecting the data from the broadcast signal 1510. At the conclusion of the delay period, data 1514 for rendering is communicated to a content renderer, where the data 1514 includes the data selected from the file 1506.

The use of the delay period as illustrated in FIG. 15 may be desirable, as it may allow implementation of the gap-filling feature without requiring that the receiver system download duplicate audio data for audio data or other data received by the receiver system over-the-air in which errors may be predicted (by using signal quality measures 714) but may not actually occur. Rather, the use of the delay period illustrated in FIG. 15 permits the receiver system to only download duplicate audio data or other data for portions of the broadcast signal 1510 containing errors.

Figure 16:
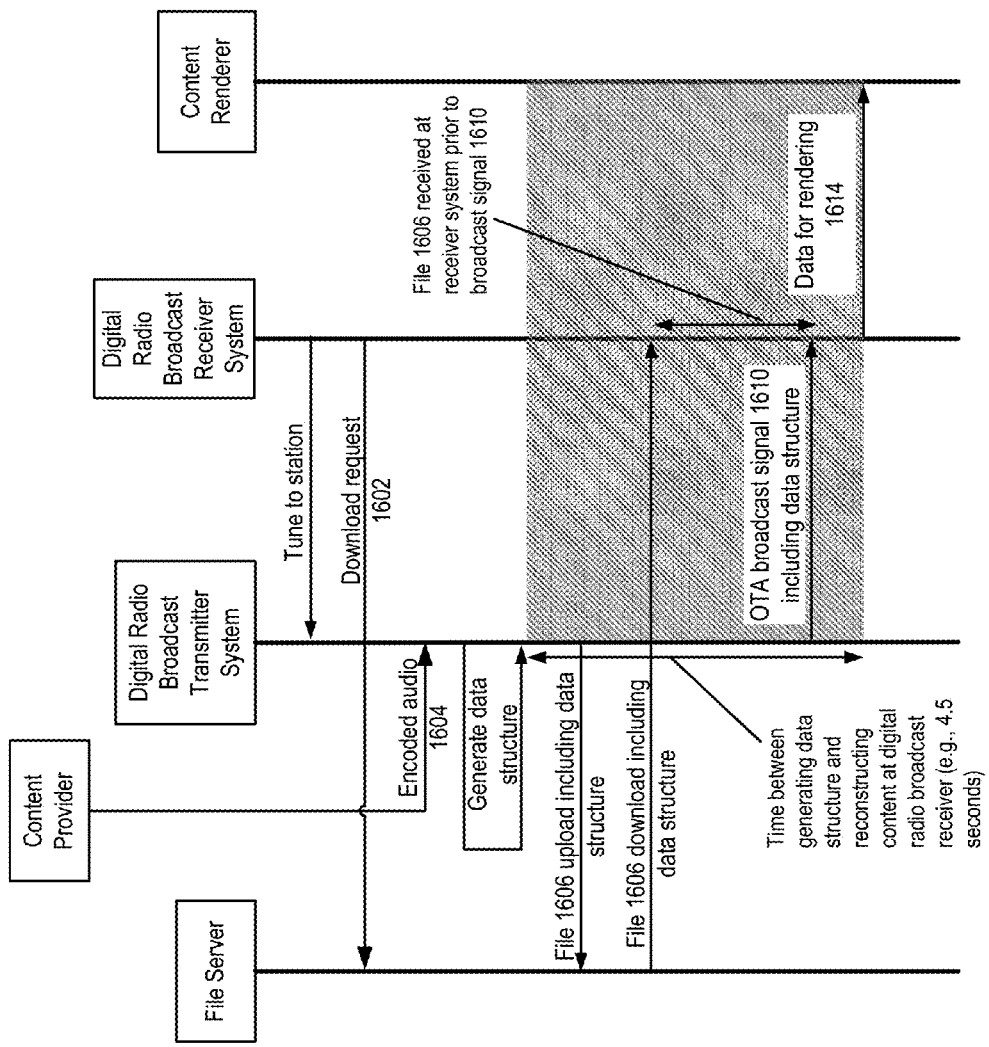

FIG. 16 illustrates another exemplary sequence of operations for providing an uninterrupted rendering of audio or other data at a digital radio broadcast receiver system. The sequence of operations of FIG. 16 varies from those of FIGS. 14 and 15 because in FIG. 16, a delay is not introduced at the receiver system. Rather, in FIG. 16, the gap-filling feature may be implemented based on differences in the processing requirements of the two communication platforms. As described above, in the approaches described herein, duplicate audio data is received by the receiver system over the two different communication platforms, where a first communication platform may be over-the-air, digital radio broadcast transmission, and the second communication platform may be wireless Internet. The two communication platforms function as parallel paths for delivering the same audio data or other data to the receiver system. In the example of FIG. 16, differences in the processing requirements of the two parallel paths may allow the wireless Internet platform to deliver audio data or other data to the receiver system prior to the over-the-air broadcast transmission platform. Thus, the gap-filling feature may be implemented by exploiting the fact that wireless Internet processes (e.g., uploading a file 1606 to a file server and downloading the file 1606 from the file server) may take less time than over-the-air broadcasting processes (e.g., processing data in an importer and exporter and generating exciter link data, demodulation process in the receiver, etc.).

In FIG. 16, initially, a digital radio broadcast receiver system tunes into a station that is associated with a transmitter system. Based on a station identifier (e.g., SIS data already known by the receiver system or SIS data received by the receiver system based on the tuning into the transmitter system), the receiver system transmits a download request 1602 to a file server. The download request 1602 requests one or more files associated with the station to which the receiver system is tuned. For example, as described above in reference to FIG. 14, the download request 1602 may request files including audio data for the next sixty (60) seconds of the station's broadcast. Encoded audio 1604 is transmitted from a content provider and received at the transmitter system. Based on the encoded audio 1604, the transmitter system generates a data structure that includes audio data configured to be rendered by the receiver system. The data structure is encapsulated into a file 1606 having a format that allows encoded data corresponding to the data structure to be transferred via an Internet protocol.

After the generation of the data structure, the transmitter system may work in parallel on uploading the data structure to the file server and preparing the same data structure to be encoded and broadcast over-the-air via a broadcast signal 1610. Preparing the data structure to be broadcast over-the-air may require various processing of the data structure, and this processing may result in an amount of time elapsing between the generation of the data structure and the broadcasting of the data structure over-the-air via the broadcast signal 1610. After the broadcast signal 1610 is received at the receiver system, additional time may elapse in demodulating and reconstructing the content of the broadcast signal 1610 at the receiver. Thus, as illustrated in FIG. 16, a delay period may exist between the generating of the data structure and the reconstruction of the content of the broadcast signal 1610 at the receiver. During this delay period, the file 1606 including the data structure may be i) uploaded from the transmitter system to the file server and encoded, and ii) downloaded from the file server to the receiver system.

At the receiver system, the data of the broadcast signal 1610 is processed to determine whether the data contains an error. If the data included in the broadcast signal 1610 does not contain an error, this data is selected for rendering at the receiver system, and the data included in the downloaded file 1606 is not rendered and is deleted from the receiver system. If the data included in the broadcast signal 1610 does contain an error, then the data of the downloaded file 1606 is selected for rendering at the receiver system. In the example of FIG. 16, no delay is introduced at the receiver system, and rather, the system exploits delays inherent in broadcasting the data structure via the over-the-air broadcast platform and reconstruction at the receiver. Data 1614 is delivered to a content renderer for rendering, where the data 1614 includes the selected data from either the file 1606 or the broadcast signal 1610.

Figure 17:
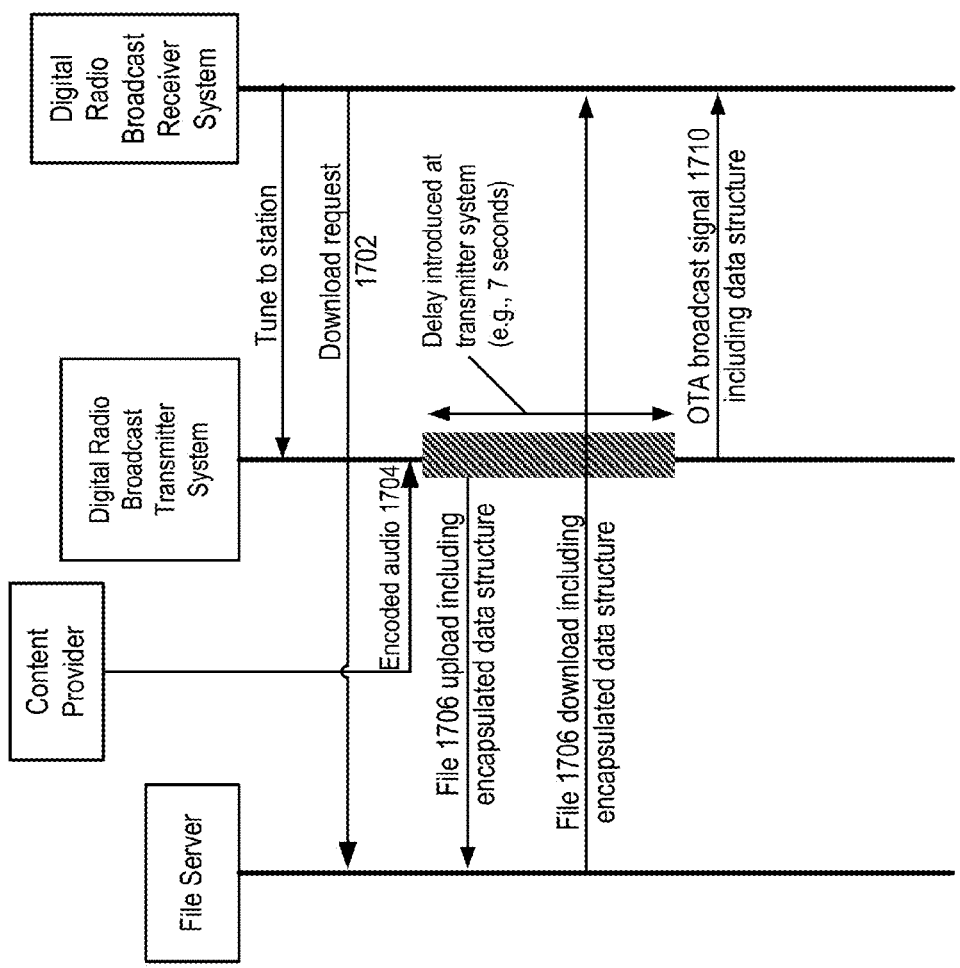

FIG. 17 depicts another exemplary sequence of operations for providing an uninterrupted rendering of content at a digital radio broadcast receiver system. As illustrated in FIG. 17, the receiver system tunes into a transmitter system and then transmits a download request 1702 to a file server. Encoded audio 1704 is transmitted from a content provider to the transmitter system, and a data structure including audio data is generated based on the encoded audio. The data structure is encapsulated into a file 1706 to allow encoded data corresponding to the data structure to be transferred over the Internet. These steps are similar to those described above with reference to FIGS. 14-16.

The example of FIG. 17 differs from those of FIGS. 14-16, however, because in FIG. 17, a delay period is introduced at the transmitter system. The delay period may cause the broadcasting of the data structure via the broadcast signal 1710 to be delayed for an amount of time. For example, if the broadcast signal 1710 including the data structure is normally broadcasted at a time "0 seconds," then a delay period of seven seconds results in the broadcast signal 1710 being broadcasted at a time "7 seconds." It should be understood that the delay period of FIG. 17 is intentionally introduced at the transmitter system and is not merely the result of processing delays incurred at the transmitter system. In an example, the delay period is introduced after the generation of the data structure or after the encapsulation of the data structure into the file 1706. The delay period may be approximately seven seconds in duration, for example.

During the delay period, the file 1706 may be uploaded from the transmitter system to the file server and also downloaded from the file server to the receiver system. Thus, the delay period delays the broadcasting of the data via the broadcast signal 1710 but does not delay the uploading and downloading of the file 1706. As illustrated in FIG. 17, the file 1706 including encoded data corresponding to the data structure is received at the receiver system prior to the receipt of the broadcast signal 1710 including encoded data corresponding to the data structure. After receipt of the broadcast signal 1710 at the receiver system, the data of the broadcast signal 1710 is processed to determine whether the data contains a data error. If no data error is detected, the data structure of the broadcast signal 1710 is selected and subsequently rendered. If a data error is detected, the data of the file 1706 is selected and subsequently rendered. In the example of FIG. 17, the data structure of the file 1706 is available for selection at this point in time by exploiting the delayed broadcasting of the signal 1710.

FIGS. 14, 15, and 17 illustrate the use of delays introduced at the transmitter or at the receiver. In situations where a radio program is pre-recorded (i.e., not a live feed), audio data for the entire radio program may be available for download from a file server to the receiver system in advance of the broadcasting of the radio program over-the-air. Thus, downloading of the radio program data (in the amount of no more than 60 (sixty) seconds) in advance may allow the gap-filling feature to be implemented without introducing a delay at the transmitter or receiver.

Figure 18:
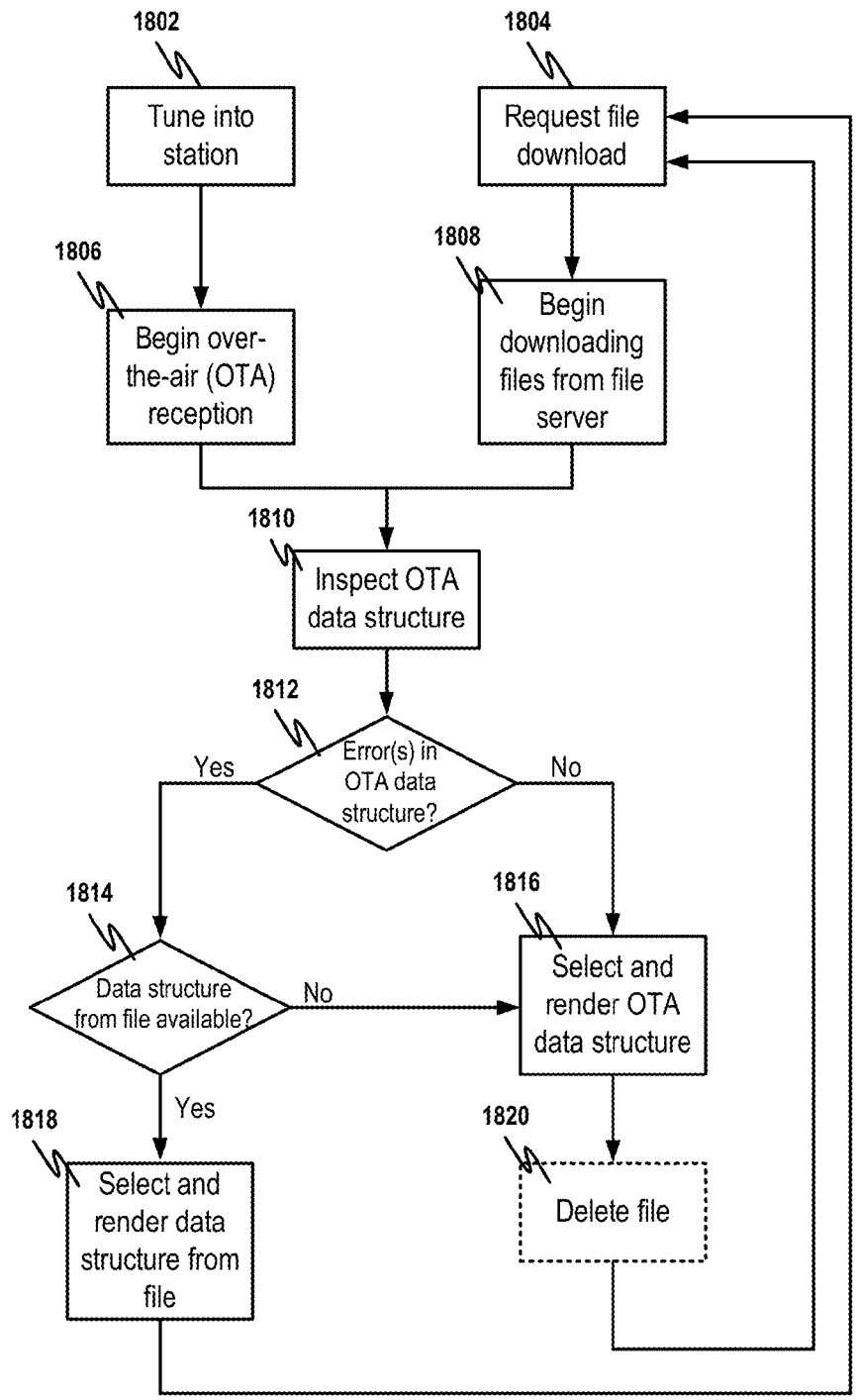
FIG. 18 depicts a flowchart illustrating steps of an exemplary method for providing an uninterrupted rendering of content at a digital radio broadcast receiver system.

FIG. 18 depicts a flowchart illustrating steps of an exemplary method for providing an uninterrupted rendering of content at a digital radio broadcast receiver system. At 1802, the receiver system tunes into a station that is associated with a transmitter system. Based on the tuning, at 1806, the receiver system begins to receive over-the-air digital radio broadcast signals from the transmitter system. At 1804, a download request is transmitted from the receiver system to a file server, where the download request requests one or more files associated with the station to which the receiver is tuned. The download request may be based on a station ID (e.g., Station Information Service (SIS) data) for the station. For example, the download request may include the station ID, and thus utilize the station ID in identifying the one or more files to be downloaded. In another example, the station ID is not included in the download request but is used in generation and/or transmission of the download request (e.g., the station ID may be used by the receiver system in determining an IP address of the file server containing the files associated with the station). Based on the download request, at 1808, the receiver system begins downloading files from the file server.

The transmitting of the download request and the downloading of files from the file server may be transparent to a user of the digital radio broadcast system. Thus, a user may have no knowledge that these steps are being performed, and use of the receiver system may be unchanged from the user's perspective. Similarly, the user may have no knowledge of other steps performed at the receiver (e.g., processing an over-the-air data for errors, selecting between data received over-the-air and data received via wireless Internet, etc.).

In an example, the download request is transmitted after the over-the-air reception begins. For example, if the receiver system does not know the station ID of the station from previous reception, then the receiver system tunes to the station and begins to receive an over-the-air signal from the station. The over-the-air signal from the station includes the station ID, and the receiver system subsequently uses the station ID in generating and/or transmitting the download request. In another example, the transmitting of the download request is performed contemporaneously with the tuning into the station. For example, if the receiver system knows the station ID of the station from previous reception, then the download request can be generated based on the known station ID and transmitted to the file server at the same time as the receiver system is tuning into the station.

At 1810, data of a received over-the-air broadcast signal is processed to determine if the data contains a data error. Although the over-the-air broadcast signal may include encoded data for a plurality of data structures, each of the over-the-air data units of encoded data is processed individually at 1810 to determine if the data contains a data error, for example. If it is determined at 1812 that the over-the-air data does not contain a data error, at 1816, the over-the-air data is selected and subsequently rendered at the receiver system. If a file including the same data was downloaded from the file server, at 1820, the file is deleted. The process may return to 1804, where a subsequent download request is transmitted from the receiver system to the file server 1810. In FIG. 18, the step 1820 is included in a dashed-line box to show that the step 1820 may not be performed in all instances. For example, if the step 1816 (i.e., selecting and rendering the over-the-air data structure) is reached via a determination 1814 (as described below), there is no file to delete, and the step 1820 is not performed.

If it is instead determined at 1812 that the over-the-air data contains a data error, a determination is made at 1814 as to whether a file including the same data is available at the receiver system. If such a file is available, at 1818, the data from the file is selected and subsequently rendered at the receiver system, and the process may then return to 1804, where a subsequent download request is transmitted from the receiver system to the file server 1810. The transition between rendering data received over-the-air and rendering data received via the files may be "seamless" and not detectable by a human user. Alternatively, a one-time audible (i.e., not seamless) transition may be used. If the file is not available, the process transitions to 1816, and the over-the-air data is selected and rendered, despite the fact that the over-the-air data were previously determined to contain a data error. As explained above, when the step 1816 is reached via the determination at 1814 that the data from the file is not available, the step 1820 (i.e., "delete file") is not performed. Although measures may be taken to help ensure that files including duplicate audio data are available as needed at the receiver system (e.g., by introducing delays at the transmitter side or the receiver side, etc.), the method of FIG. 18 addresses situations where such files are nevertheless unavailable. Such files may be unavailable, for example, due to problems incurred in uploading the files from the transmitter system to the file server, or due to problems incurred in downloading the files from the file server to the receiver system.

Figure 19:
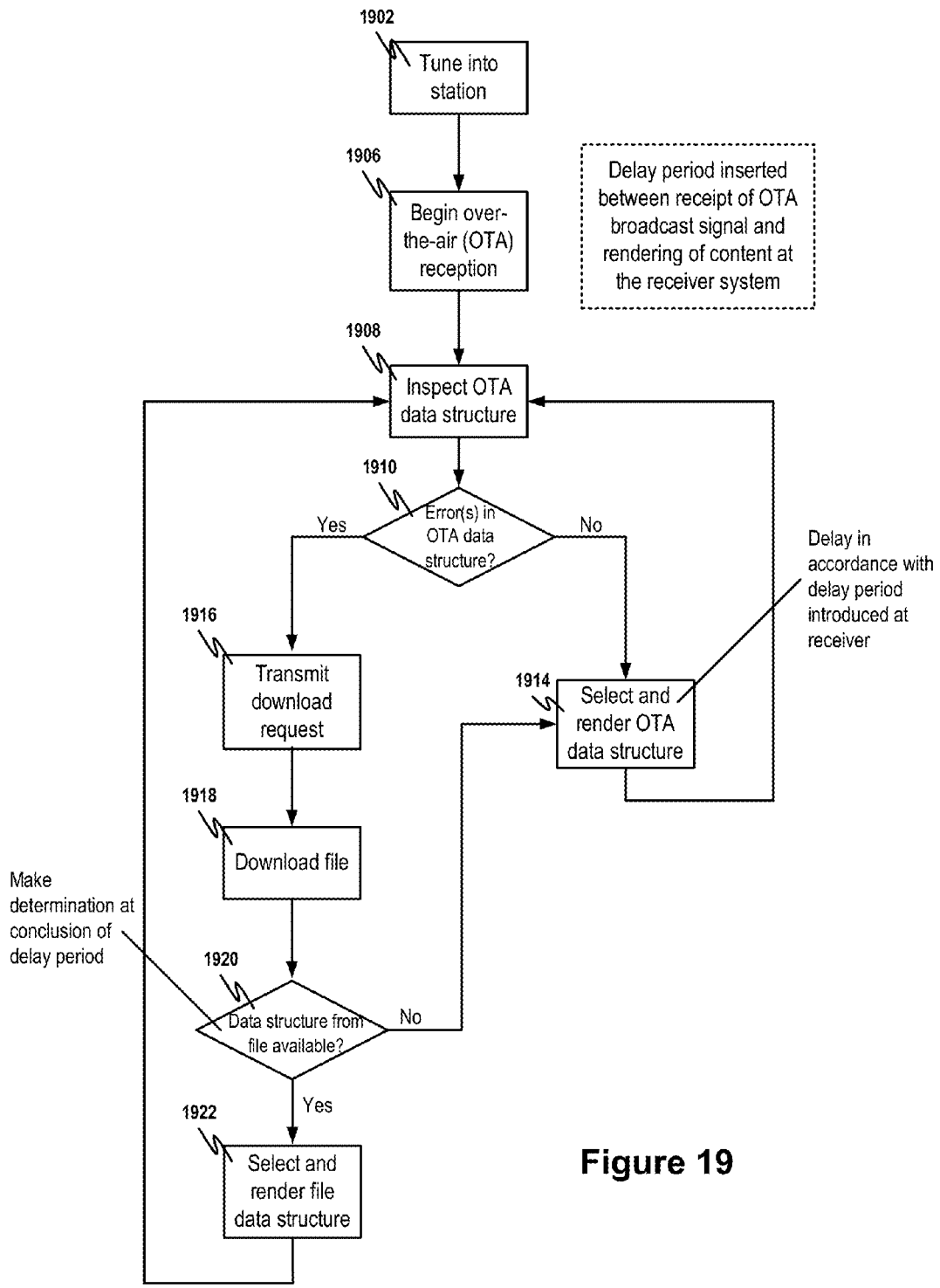
FIG. 19 depicts a flowchart illustrating steps of an exemplary method for providing an uninterrupted rendering of content at a digital radio broadcast receiver system.

FIG. 19 depicts a flowchart illustrating steps of an exemplary method for providing an uninterrupted rendering of content at a digital radio broadcast receiver system. At 1902, the receiver system tunes into a station associated with a digital radio broadcast transmitter. Based on the tuning, at 1906, the receiver system begins to receive over-the-air digital radio broadcast signals from the transmitter system. At 1908, a data unit of a received over-the-air broadcast signal is processed to determine if the data unit contains a data error.

If it is determined at 1910 that the data unit contains an error, at 1916, a download request is transmitted from the receiver system to a file server. The download request requests a file including a data unit that is the same as the over-the-air data unit determined to contain an error. At 1918, the receiver system attempts to download the file from the file server via a wireless Internet communication platform. A determination is made at 1920 as to whether the file including the data unit is available at the receiver system. If the file is available, at 1922, the data unit from the file is selected and subsequently rendered at the receiver system. If such a file is not available, the process transitions to 1914, and the data unit from the over-the-air broadcast signal is selected and rendered, despite the fact that this data unit was previously determined to contain a data error.

If it is instead determined at 1910 that the data unit from the received over-the-air broadcast signal does not contain an error, at 1914, the over-the-air data unit is selected and subsequently rendered at the receiver system. The process may return to 1908 for processing a subsequent over-the-air data unit.

To implement the method of FIG. 19, a delay is introduced at the receiver system between the receipt of the over-the-air data unit and the rendering of content. This type of delay was discussed above with reference to FIG. 15 and may provide time, for example, to process the over-the-air data unit at 1908, and if necessary, transmit the download request at 1916 and download the file at 1918. Thus, in situations where the over-the-air data unit contains a data error, the determination at 1920 may be made at the conclusion of the delay period, such that the receiver system has a maximum amount of time to download the duplicate data unit from the file server. In situations where the over-the-air data unit does not contain a data error, the selection and rendering of the over-the-air data unit at 1914 may be delayed in accordance with the delay period introduced at the receiver system.

FIG. 20A illustrates an exemplary Layer 2 PDU including a header sequence and a payload. The header sequence provides an indication as to what information is included in the payload portion of the Layer 2 PDU. In the example of FIG. 20A, twenty-four (24) header bits $h_0 \ldots h_{23}$ are included in the header sequence, and these bits are evenly spread over most of the Layer 2 PDU. The $h_0$ header bit is offset from the beginning of the Layer 2 PDU by $N_{start}$ bits, and each remaining header bit is separated from a previous header bit by $N_{offset}$ bits. $N_{offset}$ refers to the number of bits between each pair of header bits, exclusive of the header bits themselves. If the Layer 2 PDU length is an integral number of bytes, then the header length is 24 bits. If the Layer 2 PDU length is not an integral number of bytes, then the header is shortened to either 22 or 23 bits. If the header length is 22 bits, then $h_{22}$ and $h_{23}$ are not used. If the header length is 23 bits, then $h_{23}$ is not used.

The payload portion of the Layer 2 PDU can include audio, data, or a combination of audio and data. The payload may be quantified in units of bytes, and any excess payload that does not constitute a byte is located at the end of the payload. The IP File Encapsulation 350 of FIG. 10B may receive Layer 2 PDUs in the format shown in FIG. 20A and encapsulate each Layer 2 PDU into a file, as described above. The file may include a single Layer 2 PDU or multiple Layer 2 PDUs. Layer 2 PDUs are known to those of ordinary skill in the art and are described in further detail in NRSC-5 Reference Document 1014s Rev. I (Layer 2 Channel Multiplex), dated Aug. 23, 2011, which is incorporated herein by reference in its entirety.

FIG. 20B shows exemplary Layer 2 PDUs having different content. For example, as illustrated in FIG. 20B, a Layer 2 PDU can contain five different possible combinations of audio and data. A first Layer 2 PDU 2102 in FIG. 20B is audio-oriented and thus contains only main program service audio (MPS), supplemental program service audio (SPS), main program service data (MPSD), and supplemental program service data (SPSD). A second Layer 2 PDU 2104 contains a mixed-content payload that includes MPS and SPS audio and data and also opportunistic data. A third Layer 2 PDU 2106 contains a mixed-content payload that includes MPS and SPS audio and data and also fixed data. A fourth Layer 2 PDU 2108 contains MPS and SPS audio and data, opportunistic data, and fixed data. A fifth Layer 2 PDU 2110 has a payload that contains only fixed data. The opportunistic data and the fixed data may be used in multiplexing advanced application services (AAS) data into the Layer 2 PDU, where AAS data can include any type of data that is not classified as MPS, SPS, or SIS data. Fixed data is granted a fixed bandwidth allocation in the Layer 2 PDU by purposely scaling back the bandwidth allocation of the MPS. By contrast, opportunistic data makes use of any unused bandwidth in the Layer 2 PDU due to variability of both the MPS and SPS audio.

Figure 21:
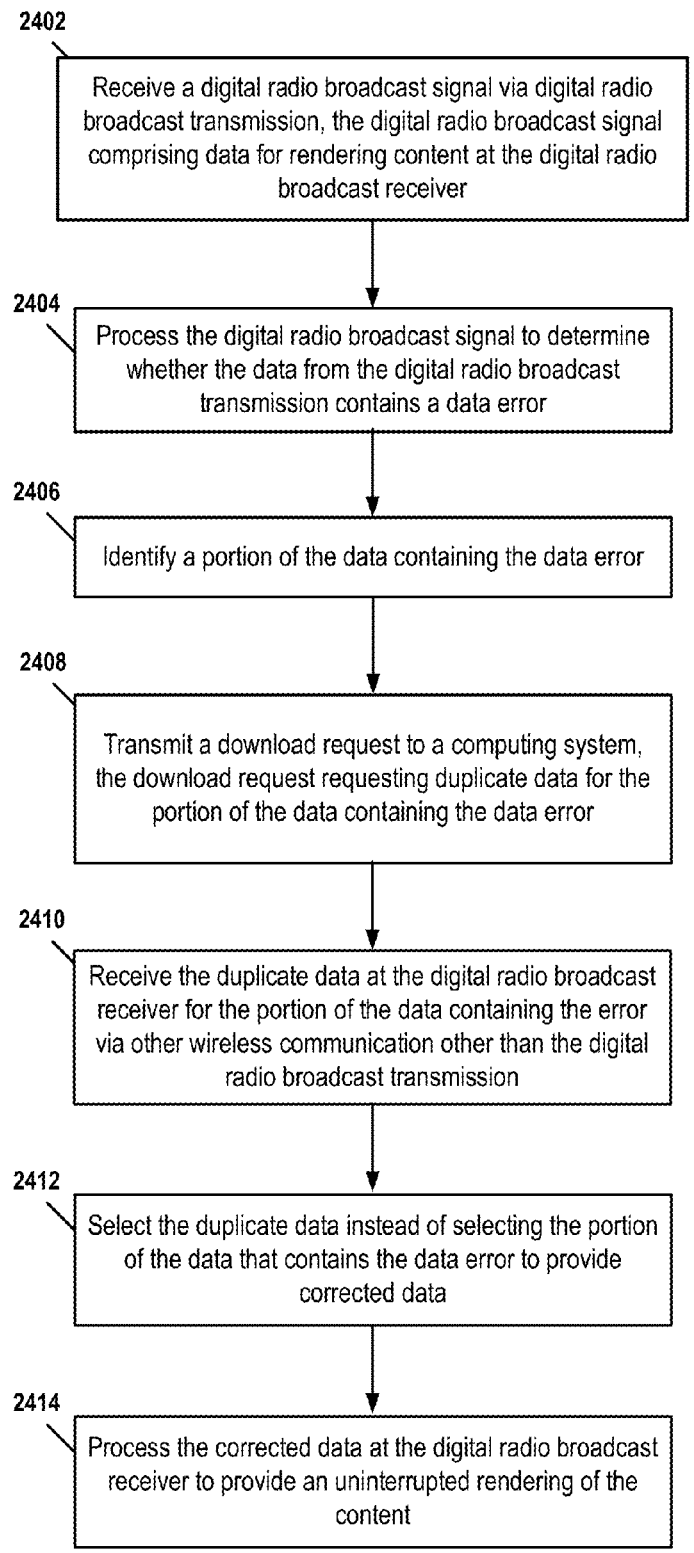
FIG. 21 is a flowchart depicting steps of an example computer-implemented method for rendering content at a digital radio broadcast receiver system.

FIG. 21 is a flowchart depicting steps of an example computer-implemented method for rendering content at a digital radio broadcast receiver system. At 2402, a digital radio broadcast signal is received via digital radio broadcast transmission. The digital radio broadcast signal comprises data for rendering content at the digital radio broadcast receiver. At 2404, the digital radio broadcast signal is processed to determine whether the data from the digital radio broadcast transmission contains a data error. At 2406, a portion of the data containing the data error is identified. At 2408, a download request is transmitted to a computing system, where the download request requests duplicate data for the portion of the data containing the data error. At 2410, the duplicate data is received at the digital radio broadcast receiver for the portion of the data containing the error via other wireless communication other than the digital radio broadcast transmission based on the download request. At 2412, the duplicate data is selected instead of selecting the portion of the data that contains the data error to provide corrected data. At 2414, the corrected data is processed at the digital radio broadcast receiver to provide an uninterrupted rendering of the content.

Figure 22:
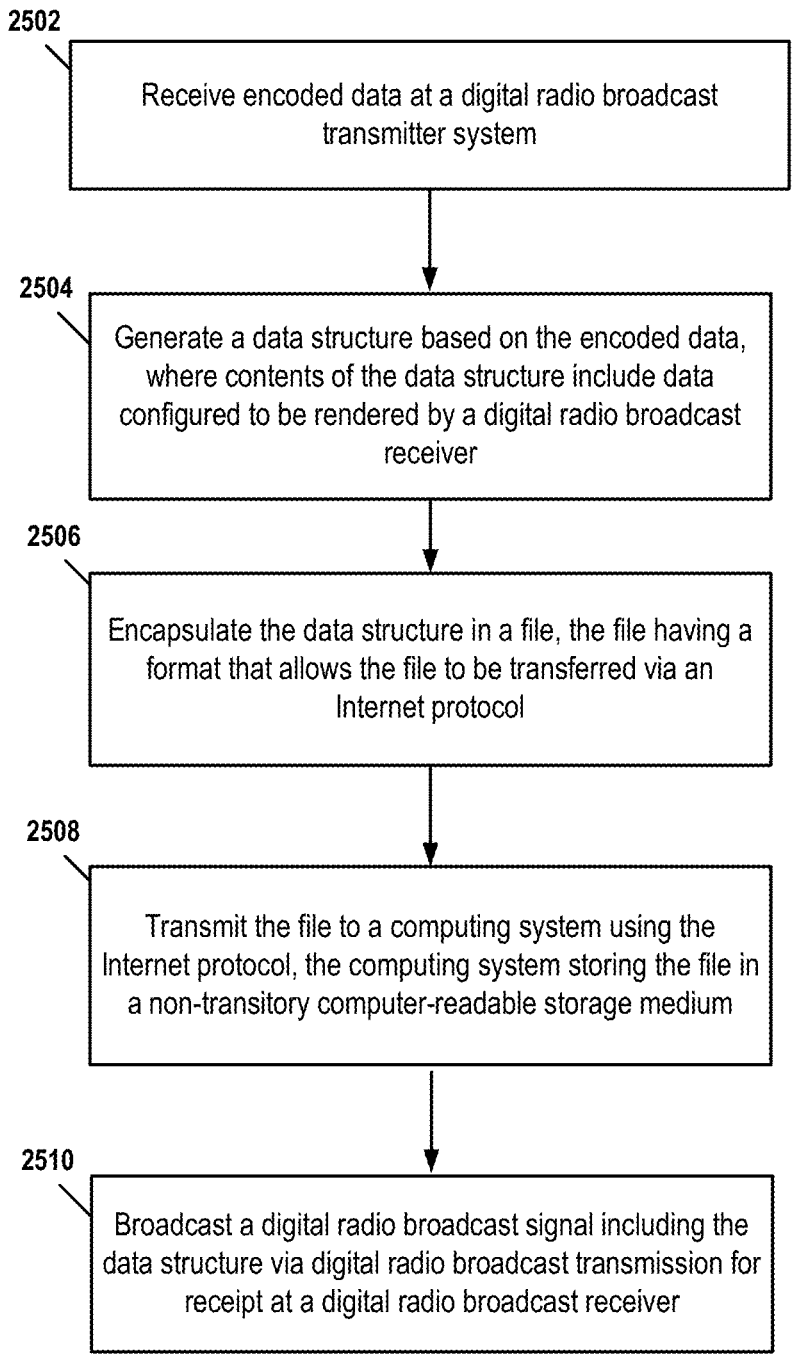
FIG. 22 is a flowchart depicting steps of an example computer-implemented method for communicating data from a digital radio broadcast transmitter system to a digital radio broadcast receiver system.

FIG. 22 is a flowchart depicting steps of an example computer-implemented method for communicating data from a digital radio broadcast transmitter system to a digital radio broadcast receiver system. At 2502, encoded data is received at a digital radio broadcast transmitter system. At 2504, a radio broadcast system format data structure is generated based on the encoded data, based on the radio broadcast system timing units and based on the radio broadcast transmission configuration, where contents of the data structure include data configured to be rendered by a digital radio broadcast receiver. At 2506, the data structure is encapsulated in a file, the file having a format that allows the file to be transferred via an Internet protocol. At 2508, the file is transmitted to a computing system using the Internet protocol, the computing system storing the file in a non-transitory computer-readable storage medium. At 2510, a digital radio broadcast signal including encoded data corresponding to the data structure is broadcasted via digital radio broadcast transmission for receipt at the digital radio broadcast receiver. The digital radio broadcast signal is processed by the digital radio broadcast receiver to determine whether the data from the digital radio broadcast transmission contains a data error. The digital radio broadcast receiver transmits a download request to the computing system if the data contains the data error, where the download request requests the file.

FIGS. 8-22 and the corresponding description above describe exemplary systems and methods for providing an uninterrupted rendering of content at a digital radio broadcast receiver using finite objects (e.g., files) that are downloaded from a server to the receiver. As described above, in these examples the system and method can be implemented without using streaming content transfers from a file server, and instead, gap-filling is implemented using the downloading of finite objects (i.e., file-based segmented content, where each file is a finite object, e.g., of a limited, predetermined size). That is, in these examples, gap filling with small objects of limited, predetermined size can be implemented using wireless Internet communication without using open-ended streaming of content of indeterminate size and/or duration over the Internet. In some of the embodiments described above with reference to FIGS. 8-22, the systems and methods can implement time-limited gap filling, where continuous gaps in an over-the-air digital radio broadcast signal longer than a predetermined amount of time (e.g., 60 seconds) are not filled by duplicate data from a file server. Specifically, when the detection of errors in data units received over-the-air reaches a continuous period equal to the predetermined amount of time, the receiver terminates the over-the-air reception. Consequently, the gap-filling is also terminated, and no additional files are downloaded. In such an example, the receiver can select an analog radio signal corresponding to the program at hand (or another signal) for rendering.

As described below with reference to FIGS. 23-25, in certain other exemplary embodiments, streaming content transfers received via wireless Internet may be used (i) in addition to the file-based gap-filling described above, or (ii) as an alternative to the file-based gap-filling. In such examples, the digital radio broadcast receiver may receive streaming content via wireless Internet communication where the content being streamed may have an indeterminate size and/or duration. In some of these exemplary embodiments, the streaming content transfers may be used in a manner that does not depend on an availability of an over-the-air signal, in contrast to the time-limited gap-filling described above. Consequently, the streaming content transfers may be used, for example, to extend an effective geographic coverage area of a radio station by enabling a receiver to begin receiving the streaming content transfer via the wireless Internet when the receiver leaves the over-the-air coverage area of the radio station. The streaming content transfer may comprise the same data that is broadcasted over-the-air by the radio station. The receiver may render data included in the streaming content transfer, which enables a listener to continue listening to the radio station despite the fact that the over-the-air signal associated with the radio station is not available. Thus, the listener may listen to his or her "local" radio station anywhere that the listener has an Internet connection. In another example, the streaming content transfers are used for gap-filling in a manner similar to that described above with reference to FIGS. 8-22, where the gap-filling may be time-limited and dependent upon the receipt of an over-the-air signal.

In the example systems and methods described herein with reference to FIGS. 8-25, data transmitted via the Internet protocol (e.g., via the wireless Internet) may comprise data formatted according to an HD Radio protocol. That is, where data is formatted in a specified format for transmission by digital radio broadcast transmission to be rendered at a digital radio broadcast receiver, duplicate data transmitted to the receiver by a wireless communication mode other than digital radio broadcasting comprises the same data formatted in the same specified format. Such data formatted according to the HD Radio protocol (which may be referred to herein as "HD-encapsulated data") may be generated by one or more components (e.g., an exciter) of a digital radio broadcast transmitter system and may comprise data intended to be broadcast over-the-air by the digital radio broadcast transmitter system. The HD-encapsulated data transmitted via the Internet protocol may comprise the same data that is broadcast over-the-air by the digital radio broadcast transmitter system. This enables the data to be generated a single time and via a single source and then sent over two different communication platforms, i.e., the over-the-air digital radio broadcast transmission and the Internet transmission. Specifically, in an embodiment, the data to be provided over the two different communication platforms may be generated at a Layer 2 (e.g., channel multiplex layer) of the digital radio broadcast transmitter system. After the generation of the data at the Layer 2, (i) the generated data may be provided as an input to a Layer 1 (e.g., physical layer) of the digital radio broadcast transmitter system, thus enabling the data to be transmitted via the over-the-air digital radio broadcast transmission, and (ii) the same data may also be transmitted via the Internet protocol, thus enabling the data to be received via an Internet receiver. In other words, in this embodiment, the data received at the Internet receiver via the Internet protocol does not come from an alternate source of data (e.g., a separate website, etc.) but rather comes from the same source of data (i.e., the digital radio broadcast transmitter system) as the over-the-air broadcast signal and comprises the same data as the over-the-air broadcast signal. The data sent over the Internet protocol may utilize a same encapsulation as the corresponding data sent via the over-the-air digital radio broadcast transmission.

Figure 23:
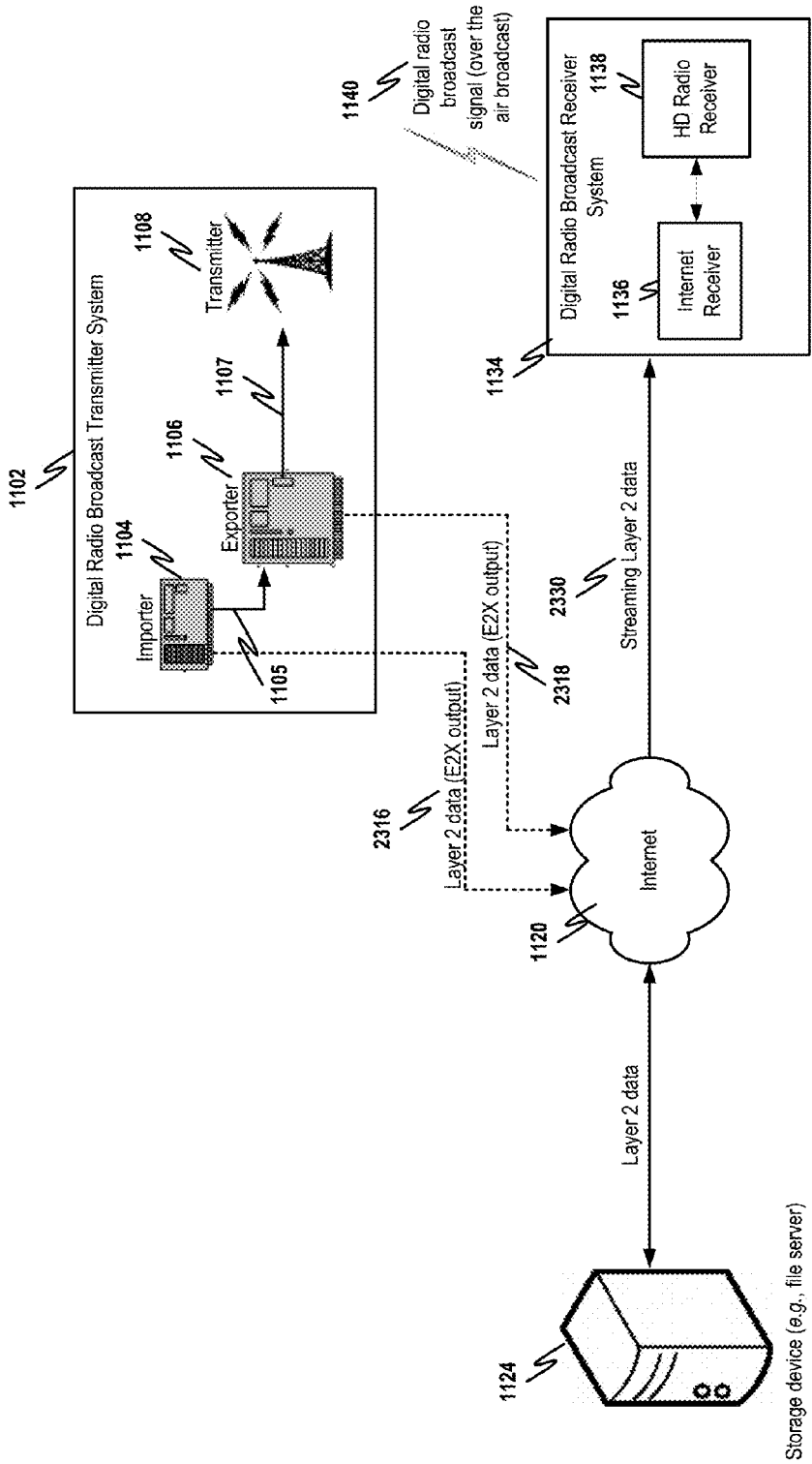
FIG. 23 is a block diagram depicting an example system for providing streaming content transfers via wireless Internet to a digital radio broadcast receiver system.

FIG. 23 is a block diagram depicting an example system for providing streaming content transfers via wireless Internet to a digital radio broadcast receiver system 1134. Similar to the example system described above with reference to FIG. 8, the system of FIG. 23 utilizes two different communication platforms for providing data to the digital radio broadcast receiver system 1134. A first communication platform may be an over-the-air digital radio broadcast transmission, and a second communication medium may be wireless Internet. In FIG. 23, to facilitate the providing of content via the first communication platform, a digital radio broadcast ransmitter system 1102 includes exemplary components that can be used to broadcast an over-the-air, digital radio broadcast signal 1140 to the digital radio broadcast receiver system 1134. These components include the importer 1104, exporter 1106, and transmitter 1108, among other components. The digital radio broadcast receiver system 1134 includes the HD Radio receiver 1138, which is used to receive the digital radio broadcast signal 1140.

The digital radio broadcast receiver system 1134 may further include the Internet receiver 1136, which is used to receive streaming Layer 2 data 2330 via the Internet 1120. To receive such streaming Layer 2 data 2330, the receiver system 1134 may transmit a notification to the storage device 1124. In this regard, the notification may effectively serve as a download request that enables the streaming Layer 2 data 2330 to be received at the receiver system 1134 from the storage device 1124. As noted above, the terminology "notification" and "download request" may be used interchangeably herein, but the notification need not be formatted as a request for information or data. Rather, the notification may take a variety of forms and/or formats and may be anything that is effective to cause a processing of data. Thus, in the example of FIG. 23, the notification need not be formatted as a request for the streaming Layer 2 data 2330 from the storage device 1124, and rather, the notification may be anything that causes the processing of the streaming Layer 2 data 2330 (e.g., processing that enables the streaming content transfer of the Layer 2 data 2330 from the storage device 1124 to the receiver system 1134). In an embodiment, the receiver system 1134 may include a mobile phone, and the mobile phone may execute a mobile software application program (e.g., a mobile app). The transmitting of the notification and the receiving of the streaming Layer 2 data 2330 may be performed based on user input received via the mobile software application program.

The Layer 2 data 2330 may comprise Layer 2 PDUs generated by a channel multiplex layer of the transmitter system 1102 and may comprise the same data that is included in the digital radio broadcast signal 1140. To implement the delivery of the streaming Layer 2 data 2330 in this manner, the digital radio broadcast transmitter system 1102 may process content (e.g., content from a content provider, such as the content provider 1110 described above with reference to FIG. 8) in a plurality of application layers to produce content that is multiplexed in Layer 2. The Layer 2 information may comprise Layer 2 PDUs that are formatted according to an HD Radio protocol. An inter-component communications protocol at the digital radio broadcast transmitter system 1102 allows hardware at the transmitter system 1102 (e.g., the importer 1104, exporter 1106, exgine, etc.) to send the Layer 2 information over a network (e.g., the Internet 1120).

Using the inter-component communications protocol, the digital radio broadcast transmitter system 1102 sends Layer 2 data 2316, 2318 (e.g., Layer 2 PDUs), also referred to as E2X output, over the Internet 1120 to the storage device 1124. The data included in the Layer 2 data 2316, 2318 originates from the content provider and is based on audio and/or data that are intended to be broadcast over-the-air by the transmitter 1102. The Layer 2 data 2316, 2318 can include bundled modem frames that are transmitted using the same bandwidth (e.g., 96 kbps-144 kbps) as is used for over-the-air transport. In addition, the system can employ framing and formatting of the Layer 2 data 2316, 2318 that is the same as that used for over-the-air transmission from the transmitter system 1102. The transmission of the Layer 2 data 2316, 2318 over the Internet 1120 may use, for example, Transmission Control Protocol/Internet Protocol (TCP/IP) or User Datagram Protocol (UDP).

In an example, all audio and/or data that is broadcast over-the-air via the transmitter system 1102 is also uploaded from the transmitter system 1102 to the storage device 1124 in the Layer 2 data 2316, 2318. The storage device 1124 makes this data available for downloading over the Internet 1120 via a streaming content transfer. This is illustrated in FIG. 23, which shows the digital radio broadcast receiver system 1134 receiving the streaming Layer 2 data 2330 from the storage device 1124 via the Internet 1120. In the examples of FIGS. 23-25, the Layer 2 data uploaded to the storage device 1124 may be purged from the storage device 1124 after any suitable time period (e.g., 10 seconds, 20 seconds, 30 seconds, or another time period). Thus, in an example, given Layer 2 data (e.g., a particular Layer 2 PDU) is only available for downloading from the storage device 1124 for a limited period of time, as determined based on the purging of the Layer 2 data from the storage device 1124. As noted above, to receive such streaming Layer 2 data 2330, the receiver system 1134 may transmit a download request to the storage device 1124. In an example, the streaming Layer 2 data 2330 comprises a bit stream of unmodulated HD Radio Layer 2 data, with the bit stream of unmodulated HD Radio Layer 2 data representing a plurality of digitally-encoded contents and control information formatted according to the HD Radio protocol.

In one embodiment, the streaming Layer 2 data 2330 is used for gap-filling in a manner similar to the file-based gap filling described above with reference to FIGS. 8-22. Thus, in this embodiment, the receiver system 1134 may receive the digital radio broadcast signal 1140 via digital radio broadcast transmission, where the digital radio broadcast signal 1140 includes data in a specified format (e.g., data formatted according to an HD Radio protocol, which may include HD Radio modem frames or HD Radio modem blocks) for rendering content at the digital radio broadcast receiver 1140. The receiver system 1134 may process the digital radio broadcast signal 1140 to determine whether the data from the digital radio broadcast transmission contains a data error (e.g., a decoding error that prevents the data from being decoded properly, without errors). If such a data error is detected, the receiver system 1134 may transmit a notification (e.g., a download request) to the computing system 1124, where the notification may be effective to cause the processing of Layer 2 data 2330 to be transmitted via wireless Internet to the receiver system 1134. In this example, the Layer 2 data 2330 may be "duplicate data" that permits the content to be rendered at the receiver system 1134 without the data error. The Layer 2 data 2330 may be received at the digital radio broadcast receiver 1134 without the error via the wireless Internet based on the notification, and the received Layer 2 data 2330 may include the data in the specified format of the digital radio broadcast signal 1140 transmitted by the digital radio broadcast transmitter system 1102. The receiver system 1134 may select the Layer 2 data 2330 received via the wireless Internet instead of selecting the data received by digital radio broadcast transmission that contains the data error so as to provide corrected data. The corrected data may be processed at the digital radio broadcast receiver 1134 to provide an uninterrupted rendering of the content. In this embodiment, the streaming Layer 2 data 2330 may thus act as a gap filler when the data from the broadcast signal 1140 includes the data error.

As described above, the receiver system 1134 may transition between rendering data of the broadcast signal 1140 and rendering the streaming Layer 2 data 2330. In some embodiments, after transitioning to rendering the streaming Layer 2 data 2330, the receiver system 1134 may further be configured to transition back to rendering data of the broadcast signal 1140. The receiver system 1134 may transition back to rendering data of the broadcast signal 1140 based on a determination, for example, that the broadcast signal 1140 no longer includes data errors. Thus, in an example, while rendering content based on the streaming Layer 2 data 2330 received via the wireless Internet, the receiver system 1134 may monitor the digital radio broadcast signal 1140 that is received at the receiver system 1134. The receiver system 1134 may make a determination that a quality of the digital radio broadcast signal 1140 is sufficient to render content at the receiver system 1134. Based on the determination, the receiver system 1134 may resume rendering of content based on data received via the digital radio broadcast transmission instead of data received via the wireless Internet.

When transitioning between rendering data of the broadcast signal 1140 and rendering the streaming Layer 2 data 2330, the transitions may be seamless and not detectable by a human user. To provide the uninterrupted rendering of content at the receiver system 1134, one or more of the techniques described above with reference to FIGS. 14-17 may be used. These techniques may include, for example, introducing a delay at the receiver system 1134 (as described above with reference to FIGS. 14 and 15), receiving the data 2230 from the Internet 1120 at the receiver system 1134 prior to receiving the over-the-air broadcast signal 1140 (as described above with reference to FIG. 16), and introducing a delay at the transmitter system 1102 (as described above with reference to FIG. 17). In an example, the streaming Layer 2 data 2330 is used in implementing a time-limited gap filler, where continuous gaps in the over-the-air signal 1140 longer than a predetermined amount of time (e.g., 60 seconds) are not filled by the streaming Layer 2 data 2330. In this example, when the receiver system 1134 detects errors in the broadcast signal 1140, the receiver system 1134 may then implement gap-filling using the streaming Layer 2 data 2330. When the detection of errors in the broadcast signal 1140 reaches a continuous period equal to the predetermined amount of time, the digital radio broadcast receiver system 1134 terminates the reception of the broadcast signal 1140. Consequently, the gap-filling is also terminated, and the digital radio broadcast receiver system 1134 discontinues receipt of the streaming Layer 2 data 2330. In these embodiments, the time-limited gap-filling is triggered by and terminates based on the over-the-air reception of digital radio broadcast signal 1140 and does not depend on the availability of the streaming Layer 2 data 2330. In the example of FIG. 23, the time-limited gap filler is not implemented using the downloading of files (i.e., file-based segmented content, where each file is a finite object). Rather, the time-limited gap filler is implemented using the streaming Layer 2 data 2330, which comprises a streaming content transfer.

In another embodiment, the streaming Layer 2 data 2330 is used to extend an effective geographic coverage area of the transmitter 1102. For example, after the digital radio broadcast receiver system 1134 leaves an over-the-air coverage area of the transmitter 1102, the receiver system 1134 may begin to receive the streaming Layer 2 data 2330 via the wireless Internet. The receiver system 1134 may be determined to have left the over-the-air coverage area, for example, based on the receiver system 1134 no longer being able to receive the digital radio broadcast signal 1140 or based on a detection of errors in the broadcast signal 1140 (e.g., as described above with reference to FIGS. 8, 9, 11, and 13) reaching a continuous period equal to a predetermined amount of time. The streaming Layer 2 data 2330, which may comprise the same data that is included in the digital radio broadcast signal 1140, may be rendered at the receiver system 1134, thus enabling, for example, a listener to continue listening to a radio station associated with the transmitter system 1102 despite the fact that the broadcast signal 1140 is not available to the receiver system 1134.

In an embodiment, after the receiver system 1134 is determined to have left the over-the-air geographic coverage area, a user of the receiver system 1134 may be prompted (e.g., via a display screen of the receiver system 1134) to begin receiving the streaming Layer 2 data 2330 via the wireless Internet. If the user answers affirmatively, the receiver system 1134 begins to download and render the streaming Layer 2 data 2330. In another embodiment, the receiver system 1134 begins to download and render the streaming Layer 2 data 2330 automatically when the receiver system 1134 is determined to have left the over-the-air coverage area, without prompting the user. In either of these embodiments, when receipt of the over-the-air broadcast signal 1140 terminates, the receiver system 1134 may determine an exact point in the content at which the over-the-air broadcast signal 1140 was lost. Consequently, the receiver system 1134 may begin to receive the streaming Layer 2 data 2330 that corresponds to the exact point in the content at which the over-the-air signal 1140 was lost. To receive such streaming Layer 2 data 2330, the receiver system 1134 may transmit a download request to the storage device 1124, where the download request may include an indication of the point in the content at which the over-the-air signal 1140 was lost. Thus, for example, the receiver system 1134 may ensure that the listener does not miss any portion of a radio program or song to which he or she was listening.

In some embodiments, when transitioning between rendering data of the broadcast signal 1140 and rendering the streaming Layer 2 data 2330, the transition may be seamless and not detectable by a human user. To provide the uninterrupted rendering of content at the receiver system 1134, one or more of the techniques described above with reference to FIGS. 14-17 may be used. Thus, for example, the receiver system 1134 may utilize a delay (e.g., as described above with reference to FIG. 17), such that when the receiver system 1134 leaves the over-the-air coverage area, the receiver system 1134 is able to begin receiving and rendering the streaming Layer 2 data 2330 without producing a detectable gap in the rendered content.

In another example, the receiver system 1134 may begin to receive the streaming Layer 2 data 2330 prior to leaving the over-the-air geographic coverage area of the transmitter system 1102. Thus, in this example, receipt of the streaming Layer 2 data 2330 may begin before the over-the-air signal 1140 is lost at the receiver system 1134. For example, the receiver system 1134 may determine that the receiver system 1134 is near a boundary (e.g., an edge) of the over-the-air coverage area of the transmitter system 1102 and/or that the receiver system 1134 will likely be exiting the over-the-air coverage area. The receiver system 1134 may make this determination based on, for example, global positioning system (GPS) coordinates of the receiver system 1134 and GPS coordinates of the transmitter system 1102. In an example, the transmitter system 1102 may broadcast its geographic location in latitude/longitude coordinates within the digital radio broadcast signal 1140, and the receiver system 1134 may receive and use this information in making the determination described above. For example, based on the geographic location of the transmitter system 1102, the receiver system 1134 may determine the over-the-air coverage area of the transmitter system 1102. Based on the over-the-air coverage area and the GPS coordinates of the receiver system 1134, the receiver system 1134 may calculate a distance between the receiver system 1134 and a boundary of the over-the-air coverage area. If the calculated distance is less than a threshold distance, the receiver system 1134 may make the determination that the receiver system 1134 is near the boundary of the over-the-air coverage area of the transmitter system 1102 and/or that the receiver system 1134 will likely be exiting the over-the-air coverage area.

In another example, the digital radio broadcast receiver 1134 may be configured to monitor (e.g., continuously monitor) signal strength of the digital radio broadcast signal 1140 as well as track the location of the receiver 1134, e.g., via a built in GPS unit or based on GPS data from a proximate device. A processing system of the digital radio broadcast receiver 1134 may collect the GPS location of the receiver 1134 at any point in time and the signal strength of a particular station being received at that point in time, and may send this information back to the computing system 1124 via wireless communication. The computing system 1124 may receive such information regarding signal strength, station, and location information from numerous digital radio broadcast receivers and may aggregate that information to generate a signal strength map for particular stations as a function of geographic location. The information for the signal strength map can be updated by the computing system 1124 on an ongoing basis so as to aggregate information over periods of days, weeks, months or longer. To the extent that changes are made to the broadcast transmission equipment or operating parameters, signal strength map data that is deemed obsolete may be purged by the computing system 1124 so as to provide an updated signal strength map. This signal strength map information can be downloaded by digital radio broadcast receivers via wireless communication over the Internet 1120 and stored in the digital radio broadcast receivers. In some examples, the digital radio broadcast receiver 1134 can use the information of the stored signal strength map to anticipate when a vehicle should anticipate loss of signal based on current position (as well as possibly vehicle speed and/or trajectory) and historical signal strength for the present location in order to make a decision to switch from digital radio broadcast reception for a given station to receiving duplicate content via wireless transmission other than digital radio broadcast transmission. For example, for a given present location, a processing system of the digital radio broadcast receiver 1134 can check whether the historical signal strength for the station being received is below a threshold value, and if so, the processing system can cause the receiver 1134 to switch to receiving duplicate content by wireless transmission other than digital radio broadcast transmission. As another example, the processing system could additionally base that decision on whether the present vehicle speed and trajectory is expected to place the vehicle (for an upcoming predetermined distance, e.g., of 0.1 miles, 0.2, miles, 0.5 miles, etc.) in a region of greater signal strength or lesser signal strength. If the former, the processing system can maintain reception via digital radio broadcast transmission, whereas if the latter, the processing system can switch the receiver's reception to duplicate data received via wireless transmission other than digital radio broadcast transmission.

After making the determination that the receiver system 1134 is near a boundary of the over-the-air coverage area of the transmitter system 1102 and/or that the receiver system 1134 will likely be exiting the over-the-air coverage area, the receiver system 1134 may (i) inform the user that the receiver system 1134 is near the edge of the over-the-air geographic coverage area and/or that the receiver system 1134 will likely be exiting the over-the-air coverage area, and (ii) prompt the user to begin receiving the streaming Layer 2 data 2330 via the wireless Internet. If the user answers affirmatively, the receiver system 1134 may begin to receive and render the streaming Layer 2 data 2330. To receive the streaming Layer 2 data 2330, the receiver system 1134 may transmit a download request to the storage device 1124. In another embodiment, the receiver system 1134 may begin to download and render the streaming Layer 2 data 2330 automatically and without prompting the user. When transitioning between rendering data of the broadcast signal 1140 and rendering the streaming Layer 2 data 2330, the transition may be seamless and not detectable by a human user.

In an example, the broadcast signal 1140 may include an IP address or uniform resource locator (URL) of the storage device 1124. The receiver system 1134 may use the IP address or URL to initiate downloading of the streaming Layer 2 data 2330 from the storage device 1124. For example, the receiver system 1134 may transmit download requests to receive the streaming Layer 2 data 2330 to the IP address or URL specified in the broadcast signal 1140. The inclusion of the IP address or URL in a broadcast signal generated by an over-the-air transmitter is described above with reference to FIG. 12.

Although examples described above include, for example, receiving and rendering of the streaming Layer 2 data 2330 based on the receiver system 1134 leaving the over-the-air coverage area or based on the receiver system 1134 being near a boundary of the over-the-air coverage area, in other examples, the use of the streaming Layer 2 data 2330 is entirely unrelated to the reception of the broadcast signal 1140. Thus, a listener may be able to listen to his or her "local" radio station anywhere that the listener can receive the streaming Layer 2 data 2330 (e.g., anywhere the user has an Internet connection). When the streaming Layer 2 data 2330 is used at the receiver system 1134, a display or user interface of the receiver system 1134 may provide a "look" and "feel" to the user that is substantially the same as when the content is being rendered from the broadcast signal 1140. In an example, a user may select a preset station and/or broadcast frequency at the receiver system 1134, and if the receiver system 1134 is not able to receive an over-the-air broadcast signal based on the selection, the receiver system 1134 may automatically begin to download and render streaming Layer 2 data associated with the selection. The user need not know an IP address or URL associated with the streaming Layer 2 data, and from a standpoint of the user, the experience may be indistinguishable from situations where the over-the-air broadcast signal is available. To enable the automatic downloading of the streaming Layer 2 data based on the user's selection, the receiver system 1134 may utilize one or more lookup tables, for example. The one or more lookup tables may be used to identify an appropriate storage device or file server to which a download request should be transmitted, where the download request requests the streaming Layer 2 data associated with the user's selection.

Additionally, although examples above describe first rendering data of the broadcast signal 1140 and then transitioning to rendering the streaming Layer 2 data 2330, in other examples, the receiver system 1134 first renders the streaming Layer 2 data 2330 and then transitions to rendering the broadcast signal 1140. Thus, a listener may initially listen to the radio station associated with the transmitter system 1102 via the streaming Layer 2 data 2330 (e.g., by selecting a station preset or broadcast frequency at the receiver system 1134, as described above), and when the receiver system 1134 enters the over-the-air coverage area of the transmitter system 1102, the receiver system 1134 may begin to receive and render data of the broadcast signal 1140. When transitioning between rendering the streaming Layer 2 data 2330 and rendering the data of the broadcast signal 1140, the transition may be seamless and not detectable by a human user.

In an example, the Internet receiver 1136 is used to receive other data in addition to the streaming Layer 2 data 2330. For example, the Internet receiver 1136 may be used to download a list of radio stations and associated broadcast frequencies. Each radio station of the list may be associated with one or more digital radio broadcast signals that are available to the receiver system 1134 based on a location of the receiver system 1134. For example, based on GPS coordinates of the receiver system 1134, the Internet receiver 1136 may download the list of radio stations and associated broadcast frequencies via the Internet 1120. The list of radio stations may be downloaded from the storage device 1124 or from another storage device based on a notification (e.g., a download request) transmitted from the receiver system 1134, where the notification may include the GPS coordinates of the receiver system 1134. The use of the Internet receiver 1136 to download the list of radio stations may obviate the need for the receiver system 1134 to build the list of stations based on data received over-the-air by the HD Radio receiver 1138.

In other examples, the Internet receiver 1136 may be used to download information from the Internet 1120 that is related to content rendered at the receiver system 1134. For example, based on the digital radio broadcast signal 1140 (e.g., PSD information of the signal 1140) and/or the streaming Layer 2 data 2330, the receiver system 1134 may determine a subject matter of the content rendered at the receiver system 1134, a name of a person associated with the content (e.g., an artist, producer, etc.), a song title associated with the content, or an album title associated with the content. Subsequently, a notification (e.g., a download request) may be transmitted from the receiver system 1134 to a computing system (e.g., the storage device 1124 or a different storage device), where the notification requests data that is related to the determined subject matter, name, song title, or album title. The data that is related to the determined subject matter, name, song title, or album title may comprise various data available via the Internet 1120 (e.g., URL-based content), such as information related to merchandise, information related to concert tickets, an image, a video, or biographical information. The data may be received at the Internet receiver 1136 via wireless Internet based on the notification. Further, the received data may be rendered at the receiver system 1134 in a manner that is synchronized (e.g., time aligned) with the content rendered at the receiver system 1134. Thus, for example, an image of an artist downloaded via the Internet receiver 1136 may be displayed at the receiver system 1134 during a period of time in which a song by the artist is being rendered at the receiver system 1134.

FIG. 23 illustrates the use of streaming content transfers received via wireless Internet as an alternative to the file-based content transfers described above with reference to FIGS. 8-22. By contrast, FIG. 24 illustrates exemplary use of streaming content transfers in addition to the file-based content transfers. Thus, as illustrated in the example of FIG. 24, the digital radio broadcast receiver system 1134 may be configured to receive both streaming Layer 2 data 2330 and L2IP encapsulated files 2432 via the Internet 1120. The streaming Layer 2 data 2330 and L2IP encapsulated files 2432 may comprise the same data that is included in the digital radio broadcast signal 1140. To make the data 2330 and files 2432 available to the receiver system 1134, the transmitter system 1102 may process content from a content provider (e.g., the content provider 1110 described above with reference to FIG. 8) to produce Layer 2 data (e.g., Layer 2 PDUs) and L2IP encapsulated files 2416, 2418. The generation of the Layer 2 data at the transmitter system 1102 is described above with reference to FIG. 23, and the generation of the L2IP encapsulated files at the transmitter system 1102 is described above with reference to FIGS. 10A and 10B. The Layer 2 data and L2IP encapsulated files 2416, 2418 are uploaded via the Internet 1120 to the storage device 1124. The storage device 1124 makes the Layer 2 data and L2IP files available for downloading by the receiver system 1134. To receive the Layer 2 data and L2IP files, the receiver system 1134 may transmit one or more notifications (e.g., download requests) to the storage device 1124.

The L2IP encapsulated files 2432 received at the receiver system 1134 may be used to implement gap-filling using one or more of the methods described above with reference to FIGS. 8-22. Some of these methods may implement a time-limited gap filler, as described above. When the over-the-air digital radio broadcast signal 1140 and the L2IP encapsulated files 2432 are both unavailable, the streaming Layer 2 data 2330 may be downloaded and rendered at the receiver system 1134. Thus, in an example, the over-the-air digital radio broadcast signal 1140 is rendered at the receiver system 1134 if this signal 1140 is available and determined to not contain one or more data errors. If the receiver system 1134 determines that the over-the-air digital radio broadcast signal 1140 is unavailable or contains the one or more data errors, data from the L2IP encapsulated files 2432 may be rendered in place of rendering the data from the broadcast signal 1140. The use of the L2IP encapsulated files 2432 in this manner is described above with reference to FIGS. 8-22. If the receiver system 1134 determines (i) that the broadcast signal 1140 is unavailable or contains the one or more data errors, and (ii) that the L2IP encapsulated files 2432 are unavailable, then the streaming Layer 2 data 2330 may be downloaded and rendered at the receiver system 1134. To download the Layer 2 data 2330, the receiver system 1134 may transmit a notification (e.g., a download request) to the storage device 1124. The L2IP encapsulated files 2432 may be unavailable, for example, in embodiments where the time-limited gap filler is used and the detection of errors in the broadcast signal reaches a continuous period equal to a predetermined amount of time. In transitioning between rendering data from the broadcast signal 1140, the L2IP encapsulated files 2432, and/or the streaming Layer 2 data 2330, the transitions may be seamless and not detectable by a human user. Techniques described above with reference to FIGS. 14-17 may be used to enable the seamless transitions.

As described above with reference to FIG. 23, the Internet receiver 1136 may be used to download information from the Internet 1120 that is related to content rendered at the receiver system 1134. For example, based on the digital radio broadcast signal 1140, the streaming Layer 2 data 2330, and/or the L2IP encapsulated files 2432, the receiver system 1134 may determine a subject matter of the content rendered at the receiver system 1134, a name of a person associated with the content, a song title associated with the content, or an album title associated with the content. Based on the determined subject matter, name, song title, or album title, a notification (e.g., a download request) may be transmitted from the receiver system 1134 to a computing system. Requested data may be received at the Internet receiver 1136 via wireless Internet based on the notification.

Where available, analog audio received at the receiver system 1134 can be automatically blended to fill gaps in MPS audio of the broadcast signal 1140. Thus, in the example of FIG. 24, the receiver system 1134 may transition between rendering (i) data of the broadcast signal 1140, (ii) the analog audio, (iii) data of the L2IP encapsulated files 2432, and (iv) the streaming Layer 2 data 2330. Using these different sources, the receiver system 1134 may provide an uninterrupted rendering of content to a user. In transitioning between rendering data from these different sources, the transitions may be seamless and not detectable by a human user.

In an embodiment, to achieve the seamless transitions, an "audio watermark" timing mechanism may be used. The audio watermark may comprise, for example, time markings added to original audio as the original audio is being encoded (e.g., where the encoding is performed to enable the original audio to be transmitted via the transmitter system 1102). Because the broadcast signal 1140, analog audio, L2IP encapsulated files 2432, and Layer 2 data 2330 may be generated at the transmitter system 1102 based on the encoded audio, the time markings may also be present in the broadcast signal 1140, analog audio, L2IP encapsulated files 2432, and Layer 2 data 2330. In time aligning portions of the content that are generated based on these different sources, the receiver system 1134 may utilize the time markings. The audio watermark timing mechanism may be utilized in any of the embodiments described herein with reference to FIGS. 23-25 to achieve seamless transitions.

Figure 24:
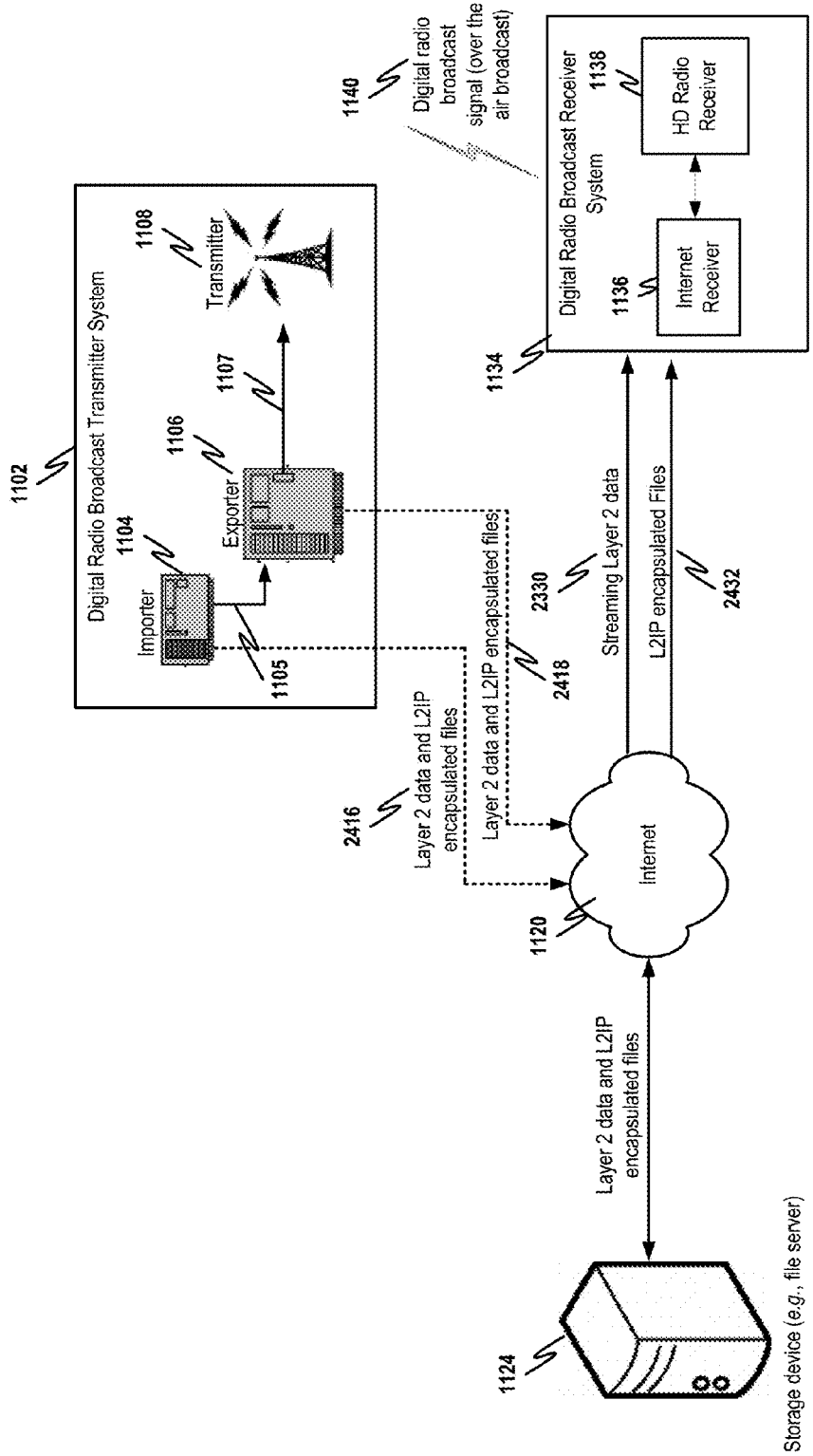
FIG. 24 is a block diagram depicting an example system for providing both streaming content transfers and file-based content transfers via wireless Internet to a digital radio broadcast receiver system.
Figure 25:
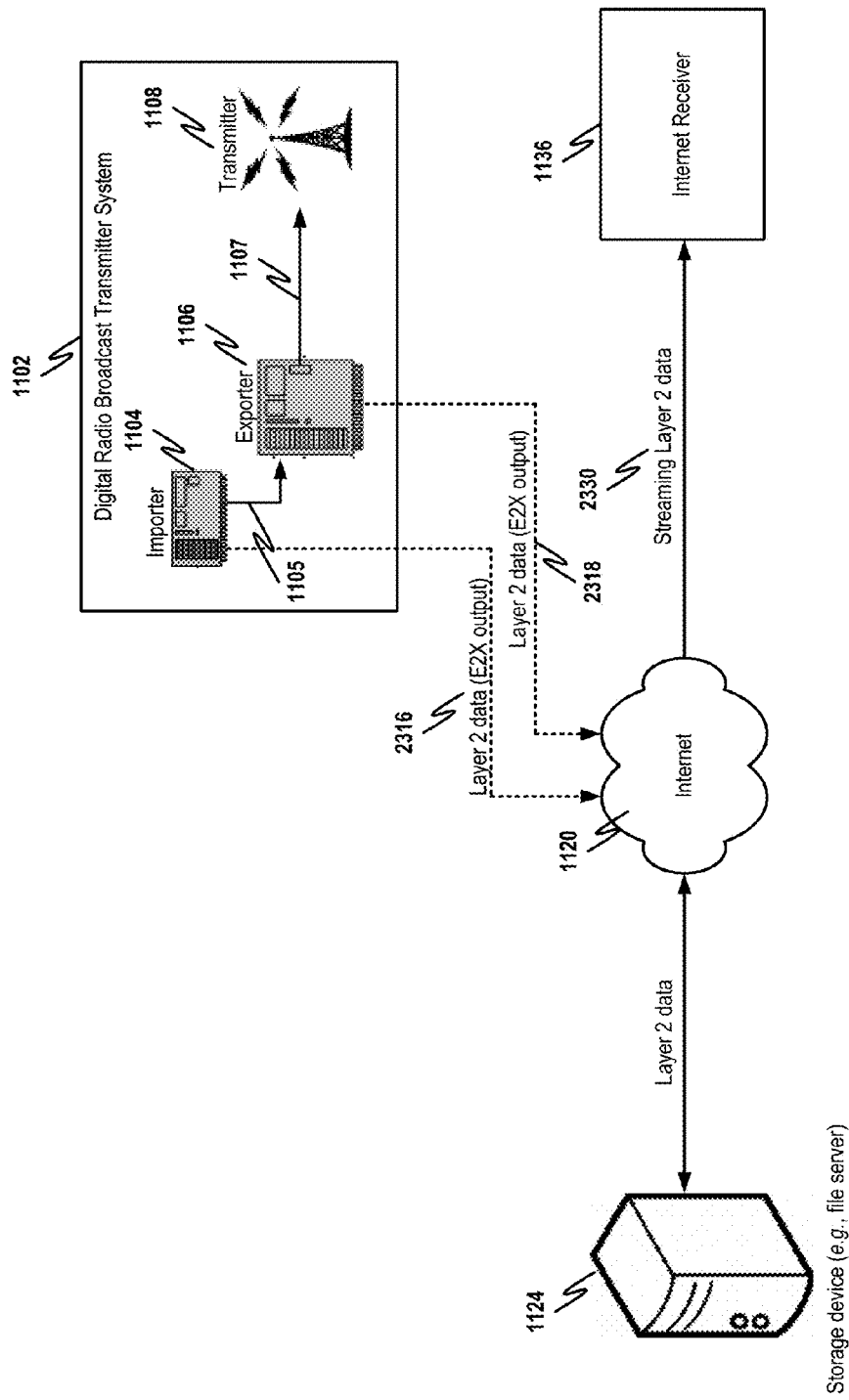
FIG. 25 is a block diagram depicting an example system for providing streaming Layer 2 data to an Internet receiver.

FIGS. 23 and 24 illustrate a digital radio broadcast receiver system 1134 that includes the HD Radio receiver 1138 for receiving the over-the-air broadcast signal 1140. By contrast, in the system of FIG. 25, an HD Radio receiver is not utilized, and instead, content is distributed to the Internet receiver 1136 solely over the Internet 1120. The Internet receiver 1136 includes an input configured to receive the streaming Layer 2 data 2330 from the storage device 1124 via the Internet 1120. To receive the Layer 2 data 2330, the Internet receiver 1134 may transmit a notification (e.g., a download request) to the storage device 1124. In an example, the streaming Layer 2 data 2330 may comprise a bit stream of unmodulated HD Radio Layer 2 data, and the bit stream may represent a plurality of digitally-encoded contents and control information formatted according to an HD Radio protocol. The HD Radio protocol used in formatting the Layer 2 data 2330 may be the protocol described in U.S. Patent Application Publication No. 2013/0265918, which is incorporated herein by reference in its entirety. The streaming Layer 2 data 2330 may be taken from Layer 2 (i.e., the multiplex layer) of the layered signal processing in the digital radio broadcast transmitter system 1102 and may comprise Layer 2 PDUs. An example of the layered signal processing that may be used in the transmitter system 1102 is described in U.S. Pat. No. 8,041,292, which is incorporated herein by reference in its entirety.

The Internet receiver 1136 includes processing circuitry that decodes the streaming Layer 2 data 2330 to generate an audio signal that is used to produce an audio output from a transducer, such as a speaker. The processing circuitry may further decode the streaming Layer 2 data 2330 to generate information that can be shown on a user display or graphical user interface. In addition, the processing circuitry may receive user input from the graphical user interface, and respond to that user input, for example, by extracting requested information from the streaming Layer 2 data 2330 based on the input data. The processing circuitry of the Internet receiver 1136 may include, for example, the processing elements of FIG. 12 of U.S. Pat. No. 8,041,292, which is incorporated herein by reference in its entirety.

The information generated based on the streaming Layer 2 data 2330 that may be shown on the user display or graphical user interface may include radio station call letters for a radio station associated with the transmitter system 1102; a slogan of the radio station; a logo of the radio station; the HD channel that is currently being accessed by the user (e.g., "HD1," "HD2," etc.); a song title and artist associated with the audio signal generated based on the streaming Layer 2 data 2330; a news stream (e.g., text of a news headline that may scroll across the user display or graphical user interface, stock information, etc.); and a plurality of buttons that may allow the user to (i) select a different HD channel, (ii) to tag the received content; (iii) to request traffic information; (iv) to request weather information; and (v) to request gas prices. When the user presses one of these buttons, the processing circuitry of the Internet receiver 1136 retrieves the requested content or information from the received data 2330 and produces an appropriate output for the speaker and/or user interface.

Other controls implemented via the user display or graphical user interface allow the user to begin receiving streaming Layer 2 data of a different radio station, increase or decrease the volume of the audio output, select between main or secondary programs of the radio station associated with the transmitter system 1102, respond to received data, utilize an electronic program guide, or utilize a store-and-replay functionality of the Internet receiver 1136, for example. Such controls may be implemented using buttons, switches, and other activation mechanisms, either alone or in combination with a software-implemented graphical user interface.

The Internet receiver 1136 may include a processor that unbundles the streaming Layer 2 data 2330 and processes upper layers of audio/data transports. Application specific modules can be provided to support CCU traffic, BTC apps, etc. The Internet receiver 1136 may utilize, for example, an upper layer processor to manage modem frame demultiplexing and audio/data transports. Additionally, the Internet receiver 1136 may include a software application that unbundles these services into a graphical user interface that looks like a typical HD Radio receiver. This allows a user to identify bundled applications such as multicast audio, station identifications, journal line news, traffic/weather, synchronized album art, and synchronized PSD. Although FIGS. 23-25 and the corresponding description herein illustrate the transmission and receipt of Layer 2 information via the Internet 1120, in other examples, the technique is applied at different layers of the system.

While the disclosure has been described in detail and with reference to exemplary embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method for rendering content at a digital radio broadcast receiver system, the method comprising:

receiving a digital radio broadcast signal via digital radio broadcast transmission, the digital radio broadcast signal comprising data in a specified format for rendering content at the digital radio broadcast receiver;

processing the digital radio broadcast signal to determine whether the data from the digital radio broadcast transmission contains a data error and identifying a portion of the data containing the data error;

transmitting a first notification to a computing system, the first notification being effective to cause the processing of duplicate data for the portion of the data containing the data error, receiving the duplicate data at the digital radio broadcast receiver for the portion of the data containing the error via other wireless communication other than the digital radio broadcast transmission based on the first notification, wherein the duplicate data comprises the data in the specified format of the digital radio broadcast signal transmitted by the digital radio broadcast transmitter system; and selecting the duplicate data instead of selecting the portion of the data that contains the data error to provide corrected data, and processing the corrected data at the digital radio broadcast receiver to provide an uninterrupted rendering of the content.

2. The method of claim 1, wherein the content is an audio program, wherein the data from the digital radio broadcast transmission comprises audio data, wherein the digital radio broadcast signal includes program data identifying the audio program, and wherein the duplicate data is received without receiving data via the other wireless communication for the entire audio program.

3. The computer-implemented method of claim 1, wherein the duplicate data includes a first data structure that is generated by the digital radio broadcast transmitter system, and wherein an identical copy of the first data structure is broadcast by the digital radio broadcast transmitter system for receipt at the digital radio broadcast receiver.

4. The computer-implemented method of claim 3 comprising:

downloading the first data structure from a file server via an Internet protocol, wherein the first data structure is encapsulated in a file to facilitate the downloading of the first data structure via the Internet protocol.

5. The computer-implemented method of claim 1 comprising:

determining, from the digital radio broadcast signal, a subject matter of the content, a name of a person associated with the content, a song title associated with the content, or an album title associated with the content;

transmitting a second notification to a second computing system, the second notification effective to cause processing of second data comprising content that is related to the determined subject matter, name, song title, or album title; and receiving the second data at the digital radio broadcast receiver via the other wireless communication based on the second notification.

6. The computer-implemented method of claim 5, wherein the content that is related to the determined subject matter, name, song title, or album title comprises information related to merchandise, information related to concert tickets, an image, a video, or biographical information.

7. The computer-implemented method of claim 1 comprising:

receiving, via the other wireless communication, data comprising a list of radio stations and associated broadcast frequencies, wherein each radio station of the list is associated with one or more digital radio broadcast signals that are available to the digital radio broadcast receiver based on a location of the digital radio broadcast receiver.

8. The computer-implemented method of claim 7, wherein the list of radio stations and associated broadcast frequencies is not generated by the digital radio broadcast receiver based on data received via the digital radio broadcast transmission.

9. The computer-implemented method of claim 1, wherein the duplicate data is included in one or more files stored at the computing system, wherein the first notification includes data that identifies the one or more files, and wherein the receiving of the duplicate data at the digital radio broadcast receiver includes:

downloading the one or more files based on the first notification, each of the one or more files including data for rendering approximately 1.5 seconds of audio output, wherein the one or more files do not comprise a portion of a streaming content transfer.

10. The computer-implemented method of claim 1 comprising:

storing the duplicate data in a non-transitory computer-readable storage medium, wherein the non-transitory computer-readable storage medium is included in a baseband processor of the digital radio broadcast receiver.

11. The computer-implemented method of claim 10 comprising:

removing the duplicate data from the non-transitory computer-readable storage medium after the processing of the corrected data.

12. The computer-implemented method of claim 1, wherein the receiving of the duplicate data comprises:

downloading the duplicate data from a file server via a wireless Internet service.

13. The computer-implemented method of claim 12, wherein the downloading of the duplicate data from the file server utilizes an Internet protocol, and wherein the Internet protocol is Hypertext Transfer Protocol (HTTP), Hypertext Transfer Protocol Secure (HTTPS), File Transfer Protocol (FTP), or File Transfer Protocol Secure (FTPS).

14. The computer-implemented method of claim 12, wherein the digital radio broadcast receiver system includes i) the digital radio broadcast receiver configured to receive the digital radio broadcast signal, and ii) an Internet receiver configured to download the duplicate data from the file server via the wireless Internet service.

15. The computer-implemented method of claim 14, wherein the digital radio broadcast receiver system comprises i) an automotive receiver including the digital radio broadcast receiver, and ii) a mobile phone including the Internet receiver.

16. The computer-implemented method of claim 15 comprising:

transferring the duplicate data from the mobile phone to the automotive receiver including the digital radio broadcast receiver.

17. The computer-implemented method of claim 14, wherein the digital radio broadcast receiver system comprises a mobile phone that includes the digital radio broadcast receiver and the Internet receiver.

18. The computer-implemented method of claim 17, wherein the mobile phone executes a mobile software application program, and wherein the transmitting of the first notification and the receiving of the duplicate data are performed based on user input received via the mobile application.

19. The computer-implemented method of claim 1, wherein the duplicate data does not comprise a portion of a streaming content transfer.

20. The computer-implemented method of claim 1, wherein the digital radio broadcast signal includes an Internet Protocol (IP) address of the computing system, and wherein the first notification is transmitted to the computing system using the IP address.

21. The computer-implemented method of claim 1 comprising:
determining one or more signal quality measures of the digital radio broadcast signal, the one or more signal quality measures indicating a reception quality of the digital radio broadcast signal, wherein the determining of whether the data from the digital radio broadcast transmission contains the data error is performed based on the one or more signal quality measures.

22. The computer-implemented method of claim 21, wherein one or more signal quality measures are generated by a physical layer of the digital radio broadcast receiver and by a channel de-multiplexing layer of the digital radio broadcast receiver.

23. The computer-implemented method of claim 1, wherein the digital radio broadcast signal includes a filename corresponding to a file including the duplicate data, and wherein the first notification includes the filename.

24. The computer-implemented method of claim 1, wherein the data error is a decoding error indicating that the portion of the data cannot be decoded by the digital radio broadcast receiver without error.

25. The computer-implemented method of claim 1 comprising:
tuning into a station using the digital radio broadcast receiver, the station being associated with the digital radio broadcast transmitter; and
receiving a station identifier from the digital radio broadcast transmitter based on the tuning into the station; and
generating the first notification based on the station identifier, wherein the first notification is effective to request one or more files associated with the station to which the digital radio broadcast receiver is tuned.

26. The computer-implemented method of claim 1, wherein a plurality of files including data are downloaded from the computing system based on the first notification.

27. The computer-implemented method of claim 1, wherein the content rendered at the digital radio broadcast receiver comprises a first portion based on the digital radio broadcast signal and a second portion based on the duplicate data, and wherein a transition between the first portion and the second portion is not detectable by a human user.

28. The computer-implemented method of claim 27 comprising:
time aligning the first and second portions to cause the transition to be undetectable, wherein the time aligning is based on one or more audio watermarks included in the digital radio broadcast signal and the duplicate data.

29. A digital radio broadcast receiver system configured to render content, the digital radio broadcast receiver system comprising:
a processing system; and
a memory coupled to the processing system, wherein the processing system is configured to execute steps comprising:
receiving a digital radio broadcast signal via digital radio broadcast transmission, the digital radio broadcast signal comprising data in a specified format for rendering content at the digital radio broadcast receiver;
processing the digital radio broadcast signal to determine whether the data from the digital radio broadcast transmission contains a data error and identifying a portion of the data containing the data error;
transmitting a first notification to a computing system, the first notification effective to cause processing of duplicate data for the portion of the data containing the data error,
receiving the duplicate data at the digital radio broadcast receiver for the portion of the data containing the error via other wireless communication other than the digital radio broadcast transmission based on the first notification, wherein the duplicate data comprises the data in the specified format of the digital radio broadcast signal transmitted by the digital radio broadcast transmitter system; and
selecting the duplicate data instead of selecting the portion of the data that contains the data error to provide corrected data, and processing the corrected data at the digital radio broadcast receiver to provide an uninterrupted rendering of the content.

30. An article of manufacture comprising a non-transitory computer readable storage medium having computer program instructions for rendering content at a digital radio broadcast receiver system, said instructions when executed adapted to cause a processing system to execute steps comprising:
receiving a digital radio broadcast signal via digital radio broadcast transmission, the digital radio broadcast signal comprising data in a specified format for rendering content at the digital radio broadcast receiver;
processing the digital radio broadcast signal to determine whether the data from the digital radio broadcast transmission contains a data error and identifying a portion of the data containing the data error;
transmitting a first notification to a computing system, the first notification effective to cause processing duplicate data for the portion of the data containing the data error,
receiving the duplicate data at the digital radio broadcast receiver for the portion of the data containing the error via other wireless communication other than the digital radio broadcast transmission based on the first notification, wherein the duplicate data comprises the data in the specified format of the digital radio broadcast signal transmitted by the digital radio broadcast transmitter system; and
selecting the duplicate data instead of selecting the portion of the data that contains the data error to provide corrected data, and processing the corrected data at the digital radio broadcast receiver to provide an uninterrupted rendering of the content.

31. A computer-implemented method for rendering content at a digital radio broadcast receiver system, the method comprising:
receiving a digital radio broadcast signal via digital radio broadcast transmission, the digital radio broadcast signal comprising data in a specified format for rendering content at the digital radio broadcast receiver;
processing the digital radio broadcast signal to determine whether the data from the digital radio broadcast transmission contains a data error;
transmitting a first notification to a computing system, the notification being effective to cause the processing of duplicate data to be transmitted via other wireless communication other than the digital radio broadcast transmission for rendering the content, the duplicate data permitting the content to be rendered without the data error, receiving the duplicate data at the digital radio broadcast receiver without the error via the other wireless communication based on the first notification, wherein the duplicate data comprises the data in the specified format of the digital radio broadcast signal transmitted by the digital radio broadcast transmitter system; and selecting the duplicate data received via the other wireless communication without the error for rendering at the receiver instead of selecting the data received by digital radio broadcast transmission that contains the data error so as to provide corrected data, and processing the corrected data at the digital radio broadcast receiver to provide an uninterrupted rendering of the content.

32. The computer-implemented method of claim 31 comprising:

monitoring the digital radio broadcast signal received at the digital radio broadcast receiver while rendering the content based on the duplicate data received via the other wireless communication;

making a determination that a quality of the digital radio broadcast signal is sufficient to render content at the digital radio broadcast receiver; and resuming rendering of content based on data received via digital radio broadcast transmission instead of data received via the other wireless transmission based on the determination.

33. The computer-implemented method of claim 31, wherein the duplicate data comprises a portion of a streaming content transfer.

34. The computer-implemented method of claim 33, wherein the streaming content transfer comprises a bit stream of unmodulated HD Radio Layer 2 data, the bit stream of unmodulated HD Radio Layer 2 data representing a plurality of digitally-encoded contents and control information formatted according to an HD Radio protocol.

35. The computer-implemented method of claim 34, wherein the bit stream of unmodulated HD Radio Layer 2 data is generated by a channel multiplexing layer of the digital radio broadcast transmitter that transmits the digital radio broadcast signal.

36. The computer-implemented method of claim 31 comprising:

determining that the digital radio broadcast signal is not available to the digital radio broadcast receiver;

transmitting a second notification to the computing system based on the determination that the digital radio broadcast signal is not available to the digital radio broadcast receiver, the second notification effective to cause a streaming content transfer that comprises a bit stream of unmodulated HD Radio Layer 2 data, the HD Radio Layer 2 data comprising same data that is included in the digital radio broadcast signal;

receiving the streaming content transfer at the digital radio broadcast receiver via the other wireless communication based on the second notification;

processing the streaming content transfer at the digital radio broadcast receiver to recover digitally-encoded contents included in the HD Radio Layer 2 data; and generating an output at the digital radio broadcast receiver based on one or more of the digitally-encoded contents.

37. The computer-implemented method of claim 36, wherein the bit stream of unmodulated HD Radio Layer 2 data is generated by a channel multiplexing layer of the digital radio broadcast transmitter that transmits the digital radio broadcast signal.

38. The computer-implemented method of claim 36, wherein the digital radio broadcast signal becomes not available to the digital radio broadcast receiver based on the digital radio broadcast receiver leaving a geographic coverage area of the digital radio broadcast transmitter that broadcasts the digital radio broadcast signal.

39. The computer-implemented method of claim 36 comprising:

determining, from the HD Radio Layer 2 data, a subject matter of the digitally-encoded contents, a name of a person associated with the digitally-encoded contents, a song title associated with the digitally-encoded contents, or an album title associated with the digitally-encoded contents;

transmitting a third notification to a second computing system, the third notification effective to cause processing of second data comprising content that is related to the determined subject matter, name, song title, or album title; and receiving the second data at the digital radio broadcast receiver via the other wireless communication based on the third notification.

40. The computer-implemented method of claim 39, wherein the content that is related to the determined subject matter, name, song title, or album title comprises information related to merchandise, information related to concert tickets, an image, a video, or biographical information.

41. The computer-implemented method of claim 31 comprising:

determining whether the digital radio broadcast receiver is within a boundary region of a geographic coverage area associated with the digital radio broadcast transmitter that broadcasts the digital radio broadcast signal;

transmitting a second notification to the computing system based on a determination that the digital radio broadcast receiver is within the boundary region, the second notification effective to cause a streaming content transfer that comprises a bit stream of unmodulated HD Radio Layer 2 data, the HD Radio Layer 2 data comprising same data that is included in the digital radio broadcast signal;

receiving the streaming content transfer at the digital radio broadcast receiver via the other wireless communication based on the second notification;

processing the streaming content transfer at the digital radio broadcast receiver to recover digitally-encoded contents included in the HD Radio Layer 2 data; and generating an output at the digital radio broadcast receiver based on one or more of the digitally-encoded contents.

42. The computer-implemented method of claim 41, wherein the determining whether the digital radio broadcast receiver is within the boundary region comprises:

receiving an indication of a geographical location of the digital radio broadcast transmitter, the indication being included in the digital radio broadcast signal;

determining the geographic coverage area associated with the digital radio broadcast transmitter based on the indication of the geographical location;

determining, using a global positioning system, a geographical location of the digital radio broadcast receiver; and determining whether a distance between the boundary of the geographic coverage area and the geographical location of the digital radio broadcast receiver is smaller than a threshold distance.

43. The computer-implemented method of claim 31 comprising:
determining that the digital radio broadcast receiver is likely to exit a coverage area associated with the digital radio broadcast transmitter that broadcasts the digital radio broadcast signal;
transmitting a second notification to the computing system based on the determination that the digital radio broadcast receiver is likely to exit the coverage area, the second notification effective to cause a streaming content transfer that comprises a bit stream of unmodulated HD Radio Layer 2 data, the HD Radio Layer 2 data comprising same data that is included in the digital radio broadcast signal;
receiving the streaming content transfer at the digital radio broadcast receiver via the other wireless communication based on the second notification;
processing the streaming content transfer at the digital radio broadcast receiver to recover digitally-encoded contents included in the HD Radio Layer 2 data; and
generating an output at the digital radio broadcast receiver based on one or more of the digitally-encoded contents.

44. A computer-implemented method for communicating data from a digital radio broadcast transmission system to a digital radio broadcast receiver system, the method comprising:
receiving encoded data at a digital radio broadcast transmitter system;
generating a data structure based on the encoded data, wherein contents of the data structure include data configured to be rendered by a digital radio broadcast receiver;
encapsulating the data structure in a file, the file having a format that allows the file to be transferred via an Internet protocol;
transmitting the file to a computing system using the Internet protocol, the computing system storing the file in a non-transitory computer-readable storage medium;
broadcasting a digital radio broadcast signal including the data structure via digital radio broadcast transmission for receipt at the digital radio broadcast receiver;
receiving a first notification from the digital radio broadcast receiver, the first notification being indicative that the encoded data from the digital radio broadcast transmission contains a data error; and
sending the file to the digital radio broadcast receiver via other wireless communication other than the digital radio broadcast transmission to provide duplicate data in place of the encoded data of the digital radio broadcast transmission that contains the data error.

45. The computer-implemented method of claim 44, wherein the encoded data comprises encoded audio, and wherein the contents of the data structure include audio data.

46. The computer-implemented method of claim 44, wherein the computing system is associated with an Internet Protocol (IP) address, and wherein the digital radio broadcast signal includes the IP address of the computing system.

47. The computer-implemented method of claim 44, wherein the file does not comprise a portion of a streaming content transfer.

48. The computer-implemented method of claim 44, wherein the generating of the data structure and the encapsulating of the data structure are performed by an importer or an exporter of the digital radio broadcast transmitter system.

49. The computer-implemented method of claim 44, wherein the digital radio broadcast transmitter system receives the encoded data from a radio station, and wherein the encoded data comprises audio from a live audio feed or from pre-recorded audio.

50. The computer-implemented method of claim 44, wherein the transmitting of the file to the computing system includes:
uploading the file to the computing system via the Internet protocol, the computing system comprising a file server, wherein the Internet protocol is Hypertext Transfer Protocol (HTTP), Hypertext Transfer Protocol Secure (HTTPS), File Transfer Protocol (FTP), File Transfer Protocol Secure (FTPS), or Web Distributed Authoring and Versioning (WebDAV).

51. The computer-implemented method of claim 44, wherein the data included in the file comprises data for rendering approximately 1.5 seconds of audio output.

52. The computer-implemented method of claim 44, wherein the contents of the file include a content identifier, the content identifier identifying one or more contents of the file.

53. A digital radio broadcast transmission system comprising:
a computing system;
a digital radio broadcast transmitter system including a processing system; and
a memory coupled to the processing system, wherein the processing system is configured to execute steps comprising
receiving encoded data at a digital radio broadcast transmitter system,
generating a data structure based on the encoded data, wherein contents of the data structure include data configured to be rendered by a digital radio broadcast receiver,
encapsulating the data structure in a file, the file having a format that allows the file to be transferred via an Internet protocol,
transmitting the file to the computing system using the Internet protocol, the computing system storing the file in a non-transitory computer-readable storage medium,
broadcasting a digital radio broadcast signal including the data structure via digital radio broadcast transmission for receipt at the digital radio broadcast receiver;
the computing system configured to receive a first notification from the digital radio broadcast receiver, the first notification being indicative that the encoded data from the digital radio broadcast transmission contains a data error; and
the computing system configured to process the file for transmission to the digital radio broadcast receiver via other wireless communication other than the digital radio broadcast transmission to provide duplicate data in place of the encoded data of the digital radio broadcast transmission that contains the data error.

54. An article of manufacture comprising a non-transitory computer readable storage medium having computer program instructions for communicating data from a digital radio broadcast transmission system to a digital radio broadcast receiver system, said instructions including first instructions which when executed are adapted to cause a processing system of a digital radio broadcast transmitter system to execute steps comprising:
receiving encoded data at a digital radio broadcast transmitter system;

generating a data structure based on the encoded data, wherein contents of the data structure include data configured to be rendered by a digital radio broadcast receiver;

encapsulating the data structure in a file, the file having a format that allows the file to be transferred via an Internet protocol;

transmitting the file to a computing system using the Internet protocol, the computing system storing the file in a non-transitory computer-readable storage medium; and broadcasting a digital radio broadcast signal including the data structure via digital radio broadcast transmission for receipt at the digital radio broadcast receiver;

the instructions including second instructions which when executed are adapted to cause the computing system to execute steps comprising:

receiving a first notification from the digital radio broadcast receiver, the first notification being indicative that the encoded data from the digital radio broadcast transmission contains a data error;

processing the file for transmission to the digital radio broadcast receiver via other wireless communication other than the digital radio broadcast transmission to provide duplicate data in place of the encoded data of the digital radio broadcast transmission that contains the data error.

* * * * *